United States Patent Office 3,565,881

Patented Feb. 23, 1971

1

3,565,881

FIBER-REACTIVE, HEAVY METAL-CONTAINING FORMAZANE DYESTUFFS

Paul Dussy, Munchenstein, Hubert Meindl, Riehen, near Basel, and Hans Ackermann, Bottmingen, Switzerland, assignors to J. R. Geigy A.G., Basel, Switzerland No Drawing. Continuation-in-part of application Ser. No. 632,173, Apr. 20, 1967. This application Jan. 28, 1969, Ser. No. 794,791

Claims priority, application Switzerland, Apr. 22, 1966, 5,876/66; Jan. 29, 1968, 1,328/68

Int. Cl. C09b 45/00, 45/48

U.S. Cl. 260—147 19 Claims

ABSTRACT OF THE DISCLOSURE

Fiber-reactive, heavy metal-containing formazane dyes which are characterized by being substituted at the carbon atom in meso-position in the formazane bridge by the radical of a monoazo dyestuff are provided; these new dyes when free from acid dissociating, salt-forming water-solubilizing groups and metallized with a heavy metal are useful for dyeing lacquers, varnishes, spinning masses of acetyl cellulose and synthetic polyamides; the new dyes which contain water-solubilizing groups and are metallized with a heavy metal atom are useful in the dyeing and printing of leather, paper and natural and synthetic polypeptide fiber materials including wool, silk, nylon and polyurethane fibers; dyes of the above-mentioned latter subclass which bear one or two fiber-reactive groupings are especially useful in dyeing cellulosic fibers. In those compounds in which this fiber reactive substituent is a pyrimidyl radical containing at least one fluorine atom, these dyes are further distinguished by their high reactivity; the dyeings or printings obtained therewith are very stable vis-a-vis acid or alkaline hydrolysis and exhibit very good fastness to light, milling and wet treatments.

This application is a continuation-in-part of our pending patent application, Ser. No. 632,173 filed Apr. 20, 1967, now abandoned.

BACKGROUND OF THE INVENTION

(1) Field of the invention

The present invention concerns new, heavy, metal-containing formazane dyes having novel shades, intermediates useful in processes for the production of these dyes, methods of dyeing and printing textile and synthetic organic plastic materials of all types with the aid of these dyes, as well as the materials dyed with the new dyes.

(2) Description of the prior art

Because of their good fastness to light and the purity of their shades, heavy metal-containing formazane dyestuffs have become of increased interest. Copper-containing formazane dyestuffs, all of which produce more or less reddish- to greenish- blue dyeings, are particularly valuable. Up to the present it has not been possible to widen the range of colours except at the cost of purity of the shades and the fastness to light.

To our knowledge, no farmazane dyes have ever been produced wherein an azo dyestuff radical (D) is linked to the central carbon atom of the typical

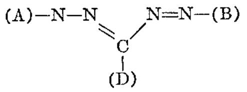

formazane bridge.

2

Formazane dyes which contain an azo dyestuff radical linked to the bridge as one or the other of the moieties (A) and (B) are known to be inferior in light fastness to the corresponding formazane dyes in which (A) and (B) are free from substituents that would make them azo dyestuff radicals.

Moreover, it was not possible in the past to attain in azo dyestuffs, especially of green or olive shades, the purity and brilliancy found in green or olive anthraquinone dyes, and at the same time the generally excellent fastness properties and especially the superior light fastness of the latter.

SUMMARY OF THE INVENTION

The invention provides, in a first aspect, heavy metal-containing formazane azo dyestuffs of the formula

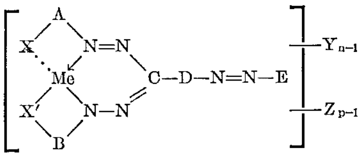

(I)

in which formula:

each of A and B represents the radical of a diazo component which contains X or X′ in o-position to the azo or hydrazo bond, respectively, each of X and X′ represents a radical of a metallized substituent, but X can also be hydrogen, of D and E, one represents the radical of a diazo component and the other that of a coupling component, so that —D—N=N—E represents a monoazo dyestuff radical, Y represents a fiber-reactive group bound to A, B or E, Z represents an acid dissociating, salt forming, water-solubilising group, Me represents a heavy metal of the atomic numbers 24–30,

*n* represents a positive whole number of at most 3, and

*p* represents a positive whole number of at most 6,

Thus, at least one of the radicals A and B, namely B, preferably however both, contain, in o-position to the azo or hydrazo bond, a metallisable group or a group which can be converted into such substituent essential for the metal complex formation.

The term "metallisable group" as used in this specification means a group which is capable of being converted to a bridging group forming a complex bond with a heavy metal atom such as copper, nickel, chromium or cobalt, with which the dyestuff or dyestuff moiety bearing said metallisable group reacts to form a metal complex dye.

The heavy metal-containing formazane azo dyestuffs obtained according to the invention can be used for the dyeing and printing of textile and plastic materials of all types, in pure green, olive, grey, brown, raisin or violet shades.

Especially the green and olive shades equal in purity and/or brilliancy those of green or olive anthraquinone dyes and are of very good fastness properties. In particular, they are very fast to light, which is unique in green or olive formazane dyes.

The dyestuffs according to the invention are distinguished by their great colour strength and/or by their pure shades.

Formazane azo dyestuffs according to the invention which are free from water-solubilising groups and especially those which are also free from fibre-reactive groups, are useful for the dyeing of plastics of all types such as lacquers, varnishes or spinning masses made from acetyl cellulose or synthetic polyamides.

The heavy metal-containing formazane azo dyestuffs according to the invention which contain water-solubilising groups such as carboxylic or phosphonic acid groups and/or, mainly, sulphonic acid groups and are free from or contain also from one to two fiber-reactive groups, are dark powders which, in the form of their alkali metal salts have very good water-solubility. They are suitable for the dyeing and printing of leather, paper and fibre materials, particularly natural or synthetic polypeptide fibre materials such as wool, silk, nylons and polyurethane fibres.

The strongly coloured dyeings obtained with these dyestuffs according to the invention in the aforesaid shades especially on the aforesaid polypeptide fibres and, if they contain fibre-reactive groups, also on cellulosic fibres, are distinguished in particular by very good fastness to light and rubbing and excellent wet fastness properties such as good fastness to washing, alkali, milling and perspiration. In addition, the dyeings are level and have unexpectedly great stability to boiling.

Dyestuffs according to the invention which contain a sulphonic acid group, a lower alkylsulphonyl or a sulphamoyl group, have very good affinity to wool and fibre materials having dyeing-behaviour similar thereto, and they draw practically completely onto such materials not only from a pronouncedly acid bath (pH 3–4), but even from a neutral to weakly acid bath. The water solubility of such dyestuffs can be increased by admixture of anion active or non-ionogenic wetting or dispersing agents or of diluents.

For the dyeing of protein fibre material, the new dyestuffs are used advantageously in a weakly acid, e.g. weakly acetic acid bath. Often the addition of compounds containing basic nitrogen, e.g. polyquaternary ammonium compounds, is indicated. When dyestuffs containing fibre-reactive groupings are used in dyeing these protein fibres, the dyeing is after-treated advantageously with acid binding agents such as ammonia or hexamethylenetetramine.

Formazane azo dyes according to the invention which contain one or two fibre-reactive groupings and from two to five sulphonic acid groups per molecule have, especially in the form of their alkali metal salts, very good water solubility and are particularly suitable for the dyeing and printing of natural and regenerated cellulose material such as staple fibre, jute, ramie, hemp and, above all, cotton.

Preferably cellulosic fibre material is dyed with the fibre-reactive dyestuffs according to the invention by the exhaustion process, i.e. by introducing the cellulosic material to be dyed in a high liquor to goods ratio into a dyebath of slightly raised temperature which bath contains an acid binding agent and, optionally, also neutral salts such as sodium chloride or sodium sulphate; then gradually heating the dyebath to temperatures of 40 to 100° C. and completing the dyeing process at this temperature. If desired, the neutral salts which accelerate the drawing of the dyestuff, can be added to the bath only after it has attained the actual dyeing temperature.

The new reactive dyestuffs are chemically bound to the fibre by the treatment with acid binding agents. After being soaped to remove unfixed dyestuff, the resulting cellulose dyeings have excellent wet fastness. In spite of the increased substantivity of the dyestuffs according to the invention on the substrate, unfixed dyestuff can be very easily and completely washed out, thus fulfilling one of the essential prerequisites for good wet fastness properties of cellulose dyeings attained with reactive dyestuffs.

Although the amount of reactive dyestuff according to the invention which is fixed on the fibre is large, unfixed dyestuff is easily washed out and the dyeings are stable to the usual synthetic resin finishes.

Apart from the above-mentioned exhaustion method, cellulosic fibre material can also be impregnated, e.g. padded or printed, for instance at a low temperature of about 20 to 50° C., with an optionally thickened solution of fibre-reactive dyestuff according to the invention and then the dyestuff is fixed by treatment with an acid binding agent. Examples of such agents are sodium carbonate, potassium carbonate, di- and tri-sodium phosphate, sodium hydroxide solution and, at temperatures of over 50° C., also potassium or sodium bicarbonate. Instead of subjecting the impregnated materials to an alkaline after-treatment, in many cases the acid binding agent, preferably in the form of alkali carbonates, can be added to the impregnating liquors or printing pastes and the dyeing can then be developed by heating or steaming for a short time to temperatures of over 100° to 160° C. or by storing for a longer time at room temperature. In this process, the addition of hydrotropic agents to the printing pastes and impregnating liquors is of advantage, e.g. the addition of urea in amounts of 10 to 200 g. per litre of dye liquor or paste.

Metal-free formazanes analogous to the formazanes of Formula I but containing no complexing metal atom, and in which metallisable groups take the place of X′ and if X is not hydrogen, also of the latter, are useful as intermediates in the production of the metal complex dyes of Formula I. Similarly, formazanes analogous to those of Formula I in which the alkaline earth metal atom, e.g. magnesium or calcium, takes the place of the heavy metal atoms, are useful as intermediates for the same purpose.

DETAILED DESCRIPTION OF THE INVENTION AND OF PREFERRED EMBODIMENTS THEREOF

More in detail, the invention provides formazane azo dyes of Formula I in which formula:

each of A and B represents a divalent carbocyclic or heterocyclic aromatic radical which contains the substituent X or X′ in ortho-position to the azo or to the hydrazo bridge, respectively, and has preferably one of the ortho-positions to the respective bridge occupied by hydrogen, X′ represents the radical of a substituent capable of complex bonding to a heavy metal atom, and X represents the same as X′ or hydrogen.

The metallized group symbolised by X or X′ is derived, for example, from a phenolic hydroxyl group, a carboxyl group, an amino group or an acidically dissociating amino or imino group, e.g. a sulphamoyl group or an imino group which belongs to a fused heterocycle, or each of which can be substituted by the radical of an organic sulphonic acid. Examples of substituents which can be converted into metallisable groups are lower, optionally substituted, alkoxy groups such as the methoxy, ethoxy, carboxymethoxy or carboxyethoxy group, also bis-(sulphonic acid amide) groups or acyloxy groups, which, on completion of diazotisation and coupling, can easily be saponified to form organo-sulphonylamide or hydroxyl groups. Examples of radicals A and B containing, in a suitable position, acid imide groups which belong to fused heterocycles are the 4-benzimidazolyl and 4-benzotriazolyl radicals.

Radicals A and B which contain a group X or X′ capable of forming the metal complex, belong, preferably, to the series of aromatic carbocycles; these can be uncondensed mono- or poly-nuclear carbocycles or they can be fused with other carbocycles or with heterocycles. A and B are preferably radicals of an o-hydroxyphenyl and o-carboxyphenyl or o-hydroxynaphthyl and o-carboxynaphthyl compound which can contain other ring substituents usual in azo dyestuffs.

Radicals A which do not contain a group capable of forming the metal complex, belong to the carbocyclic aromatic or to the heterocyclic aromatic series; it can be mono- or poly- nuclear, not fused or fused. In addition to radicals of aminobenzene, aminonaphthalene, aminodiphenyl compounds, etc. usual in the production of azo dyestuffs, preferably 5- to 6-membered aromatic nitrogen rings can be used as hetero rings, e.g. pyrazole, imidazole, triazole, tetrazole, oxazole, thiazole, oxadiazole, thiadiazole rings not fused or fused with carbocycles or other heterocycles; the above rings can be substituted.

As both D and E can be the radical of either a diazo or a coupling component, when E is the radical of a diazo component —E—$NH_2$, D represents the radical of a coupling component, and vice versa.

As radical of a coupling component; D can be, e.g. a mononuclear or polynuclear, homocyclic or mixed homo-heterocyclic aryl radical coupled in o- or p-position to a hydroxyl or an amino group. In the most simple case, D can be a hydroxyphenylene or aminophenylene radical, e.g. a 2-hydroxy-1,5-phenylene, a 2,4-dihydroxy-1,5-phenylene or a 3-amino-1,4-phenylene radical having, preferably, a formazyl group in the 1-position. However, D can also be, e.g. an aminonaphthylene or hydroxynaphthalene radical.

As radical of a diazo component, D is preferably an optionally sulphonated 1,3- or 1,4-phenylene radical, optionally also a naphthylene radical or an arylaminocarbonyl radical having a formazyl group bound to the carbonyl group; in such radicals the aryl radical is preferably mononuclear, but can also be polynuclear and fused or unfused.

As radical of a coupling component, E represents, e.g. a radical of the benzene or naphthalene series coupled in o- or p-position to a hydroxyl or amino group, or the radical of an enolic coupling component of the hetero series, e.g. a pyrazolonyl, quinolonyl, a 5-aminopyrazol-4-yl radical, a malonyl urea radical, a pyrimidinyl radical or the radical of an acylacetamidoaryl compound.

As radical of a diazo component, E is preferably a phenyl radical, optionally also a naphthyl radical, or a mixed carbo-heterocyclic aryl radical or a heterocyclic aryl radical.

Fibre-reactive groups Y are bound to carbon atoms of the moieties A, B or E, optionally by way of an amino group, and each group contains at least one substituent which can be split off, removing thereby from the remainder of Y the electron pair bound to that substituent, or it contains at least one C—C— polybond at which addition of suitable groups of the fibre-molecule can take place.

In fibre-reactive, particularly cellulose-reactive dyestuffs according to the invention, moieties A, B or E bear, as reactive groups Y of the above-mentioned type having a substituent which can be split off, e.g. aromatic nitrogen heterocycles containing, preferably, more than one ring nitrogen atom, which heterocycles have at least one or more mobile halogen atoms, preferably chlorine but also fluorine and bromine, or an ammonium group instead of halogen as substituents of ring nitrogen atoms. These heterocycles are bound to the aromatic structure of A, B or E either by way of bridging members such as oxygen, sulphur, preferably however, by way of the imine, a lower alkyl imine, a carbonyl amide or a ureido group, or when E is naphthyl, also directly. The following are mentioned as such fibre-reactive substituents Y: the 2,4-dichloro-1,3,5-triazinyl-6 radical, the 2-chloro-4-amino-, 2-chloro-4-lower alkoxy-, 2-chloro-4-phenylamino-, 2-chloro-4-sulphophenylamino-1,3,5-triazinyl-6 radical, 2,4-dichloropyrimidyl-6 radical, 2,4,5-trichloropyrimidyl-6 radical, 2,4-dichloro-5-cyano-, 2,4-dichloro-5-alkyl-, 2,4-dichloro-5-aryl- or 2,4-dichloro-5-arylsulphonyl- or 2,4-dichloro-5-bromo-pyrimidyl-6 radical, a 2-chloro- or 2-bromo-pyrimidyl-5- or -6-carbonyl radical having further halogen in the 4-, 6- or 4,6-position or having an inert substituent, e.g. a lower alkyl or a phenyl group in the one position and halogen in the other, or having two inert substituents in these positions, a 2,3-dichloroquinoxaline-6-carbonyl or -6-sulphonyl radical, 3,8-dichloro- or 3,8-dibromo-phthalazine-5-carbonyl radical or 2,4-dichloroquinazoline-6- or -7-carbonyl radical, a 4,5-dichloro-6-pyridazonyl-1- alkanoyl or 4,5-dichloro-6-pyridazonyl-1-phenylcarbonyl radical, 2-chloro- or 2-sulpho-benzothiazole- or -oxazole-6- or -7-carbonyl or -sulphonyl radical, a nitrophenyl radical containing mobile halogen, preferably fluorine or also chlorine in o- or p-position to the nitro group, e.g. correspondingly substituted benzoyl or benzene sulphonyl radical. Also reaction products of these fibre-reactive groups containing mobile halogen can be used which then have at least one ammonium substituent which can be split off, e.g. an N-pyridinium, N-trialkylammonium, an N-triethylene-di-ammonium or an asymmetrical N-dialkyl hydrazinium group. Other fibre-reactive groups having a component which can be split off together with the pair of bonding electrons are $\alpha$- and $\beta$-halogenalkanoyl and $\alpha$- and $\beta$-halogenalkenoyl groups. The acroyl, methacroyl and propiol group are given as examples of fibre-reactive —C—C— polybonds to which addition can be made. These fibre-reactive groups mentioned preferably form the acyl radical of amide substituents and can be present instarting materials or introduced into end products, e.g. by substituents of amino groups.

Finally, also the esters of strong acids of $\beta$-hydroxyalkyl sulphonyl and sulphamide compounds can be used, e.g. the $\beta$-hydroxyalkylsulphonyl sulphates and $\beta$-hydroxyalkylsulphamoyl sulphates, $\beta$-chloro- or $\beta$-bromo-alkylsulphonyl groups and $\beta$-chloro- or $\beta$-bromo-alkylsulphamoyl groups etc. which with the action of acid binding agents form vinylsulphonyl compounds capable of addition.

An acid dissociating, salt forming, water solubilising groups corresponding to Z, the dyestuffs according to the invention preferably contain sulphonic acid groups, in addition also phosphonic acid groups or carboxyl, disulphimide or monoester groups of polybasic acids, e.g. sulphate groups. Z can also have more than one of these meanings in the dyestuff molecule.

In addition to these essential substituents, the dyestuffs can contain other substituents usual in azo dyestuffs, preferably as ring substituents, e.g. halogen such as fluorine, chlorine or bromine; alkyl such as methyl, ethyl, isopropyl, tert. butyl, tert. amyl or diisobutyl; alkoxy such as methoxy, ethoxy, propoxy, butoxy; phenoxy; phenylthio; arylsulphonyloxy; alkylsulphonyl and arylsulphonyl; acyl; sulphonic and carboxylic acid amide groups having a primary, secondary or tertiary amide group and aliphatic, araliphatic, alicyclic, aromatic-homocyclic or aromatic-heterocyclic N-substituents; nitro; cyano; primary, secondary or tertiary amino groups; acylamide groups such as acetyl-, chloracetyl-, bromopropionyl, chloracroyl-, bromacroyl-, benzoyl-, methylsulphonyl, ethylsulphonyl-, chloromethylsulphonyl-, benezenesulphonyl- and methylbenzene sulphonyl-amid groups; substituted alkyl groups e.g. perfluoroalkyl groups such as trifluoromethyl; also alkoxyalkyl, acyloxyalkyl, cyanoalkyl, carboxyalkyl groups, these latter preferably as N-substituents. All carbocyclic aryl components of these substituents can also be substituted in this way. The same is, naturally, true of the starting materials.

In preferred dyestuffs falling under Formula I,

A represents a benzene or naphthalene radical substituted in o-position to the azo bridge attached thereto by the radical X and otherwise unsubstituted, apart from substitution by Y and/or Z, or further substituted by substituents which do not elongate the resonance system of the dyestuff molecule; or a benzothiazolyl-(5), benzopyrazolyl-(3) quinazolinyl-(6) or triazolyl-(5) radical which radicals are linked to the azo bridge via their 5-, 3-, 6- and 5-positions, respectively, X being hydrogen, benzene nuclei of these radicals being without further substituents, apart from Y and/or Z, or bearing further substituents which do not elongate the resonance system of the dyestuff molecule, especially bromine, chlorine, lower alkyl, lower alkoxy and/or nitro groups;

B is a radical of the benzene or naphthalene series bearing the substituent X′ in ortho-position to the hydrazo bridge and being otherwise unsubstituted, apart from either substituent Y or substituent Z, or substituted further by substituents which do not elongate the resonance system of the dyestuff molecule;

X represents —O—, —NH— or hydrogen,

X′ represents —O—, —COO—, —NH—,

—N—SO$_2$—R wherein R represents a phenyl radical which is unsubstituted, apart from substituent Z, or further substituted by substituents which do not elongate the resonance system of the dyestuff molecule, or R represents lower alkyl;

D represents a radical of the benzene or naphthalene series, or a benzimidazole-(6) radical linked in 6-position to the azo bridge connecting D and E and in 2-position to the carbon atom in meso-position in the formazane bridge. Benzene and naphthalene nuclei in D are either otherwise unsubstituted apart from a substituent Z, or they are further substituted by substituents which do not elongate the resonance system of the dyestuff molecule, especially chlorine, bromine, hydroxy, lower alkoxy or lower alkyl;

E represents a benzene, naphthalene, 5-aminopyrazolyl-(4), 1-phenyl-5-hydroxy-pyrazolyl-(4), 2,4-dihydroxy-pyrimidinyl-(5), 2,4,6-trihydroxy-pyrimidinyl-(5) or 2,4 - dihydroxy-6-methyl-pyrimidinyl-(5) radical, which radical is either unsubstituted or substituted by Y or Z or both, and/or it is substituted by other substituents which do not elongate the resonance system of the dyestuff molecule.

In valuable green and olive dyestuffs, E, as radical of a coupling component, preferably represents the radical of a so-called yellow component, i.e. for example a hydroxybenzene or aminobenzene radical, or a 5-amino- or 5-hydroxy-pyrazol-4-yl radical, an acylacetamidophenyl radical or a malonyl urea radical. The radical of a corresponding diazo component is then, preferably, a phenyl or also a naphthyl radical.

When E is a benzene radical, preferred substituents, apart from Y and Z, are hydroxyl, lower alkyl, lower alkoxy, chlorine, bromine, nitro, lower alkanoylamino, benzoylamino, the benzoyl nucleus of which is unsubstituted or further substituted by substituents which do no elongate the resonce system of the dyestuff molecule, mesyloxy, tosyloxy, lower alkyl sulphonyl, phenylsulphonyl, sulphamyl and sulphamyl substituted by lower alkyl.

Most preferred because of their good accessibility and particularly satisfactory dyeing properties are the dyestuffs of the formula

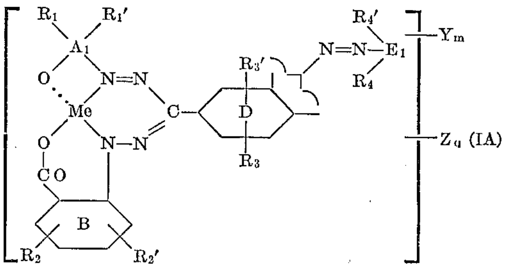

(IA)

wherein:

$A_1$ represents phenylene or naphthylene, the adjacent azo bridge and the —O- - - bridge being linked to $A_1$ in ortho-position relative to each other, $E_1$ represents phenyl, naphthyl, 1-phenyl- or 1-naphthyl-5-amino-pyrazolyl-(4), 1-phenyl- or 1-naphthyl-5-hydroxy-pyrazolyl-(4), acetoacetic phenylamide or acetoacetic naphthylamide, the 3-posiiton of the pyrazolyl rings being substituted by methyl or carboxy, each of $R_1$ and $R_2$ represents hydrogen, chlorine, bromine, lower alkyl, nitro, lower alkanoylamino, benzoylamino, lower alkylsulphonyl, arylsulphonyl, especially phenylsulphonyl, sulphamoyl or N-lower alkyl-substituted sulphamoyl, each of $R_1'$ and $R_2'$ represents hydrogen, chlorine, bromine or lower alkyl;

and each of $R_2$ and $R_2'$ can also be lower alkoxy, with the proviso that if ring B contains a substituent Y, $R_2$ and $R_2'$ are both hydrogen, each of $R_3$ and $R_3'$ represents hydrogen, chlorine, bromine, lower alkoxy, lower alkyl or hydroxy, each of $R_4$ and $R_4'$ represents hydrogen, chlorine, bromine, lower alkyl, lower alkoxy, nitro, lower alkanoylamino, benzoylamino, lower alkylsulphonyl, arylsulphonyl, especially phenylsulphonyl, sulphamoyl or N-lower alkyl-substituted sulphamoyl, hydroxy, mesyloxy or tosyloxy, each of $R_4$ and $R_4'$ being linked to a carbon atom which is a ring member of a benzene or naphthyl nucleus in $E_1$,

*m* represents 1 or 2,

Y represents an aromatic nitrogen heterocycle containing, preferably, more than one ring nitrogen atom, which heterocycle has at least one or more mobile halogen atoms, preferably chlorine, but also fluorine and bromine, which heterocycle is bound to the aromatic structure of $A_1$, B or E by way of an imino, a lower alkyl-imino, a carbonyl-amido or a ureido bridge; or Y represents an $\alpha$- or $\beta$-halogenalkanoyl or an $\alpha$- or $\beta$-halogenalkenoyl group bound to the aromatic structure of $A_1$, B or E by way of an imino or a lower alkyl-imino bridge,

*q* represents a number ranging from 2 to 5,

Z represents a carboxyl group or a sulphonic acid group, at least two Z representing sulphonic acid groups, and Me represents the same as in Formula I, but preferably copper.

Optimal dyeing properties are found in dyestuffs according to the invention which fall under the Formula IA in which $A_1$ represents phenylene, Me represents copper and Y represents 2,4-dichloropyrimidyl, 2,4,5-trichloropyrimidyl, di-chloro-triazinyl or mono-chloro-triazinyl substituted further by amino, lower alkyl-amino or a phenylamino or a naphthylamino group wherein the aromatic rings can bear one or several of the groups Z, lower alkoxy, phenoxy, nitrophenoxy, 2,4-dichloro-pyrimidine-5- or -6-carbonylamido, or 2-chloro- or 2-sulpho-benzothiazole-5- or -6-carbonylamido, or 2,3-dichloro-quinoxaline-6-carbonylamido or -sulphonylamido, or 2,4-dichloroquinazoline-6- or -7-carbonylamido.

Dyestuffs according to the invention are obtained (a) when the diazo compound of an amine of general Formula II $$X_a-A-NH_2 \qquad (II)$$

is coupled with, as coupling component, a new intermediate of general Formula III*a*

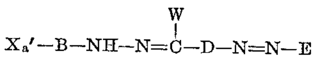

(III*a*)

wherein W is hydrogen or a substituent which can be replaced by azo coupling and $X_a$ and $X_a'$ represent metallisable groups or substituents which can be converted into metallisable groups, and the radicals A, B, D and E together contain at most 5Z and 2Y as substituents, the latter only in A, B or E, to form a formazane azo dyestuff of the general Formula IV

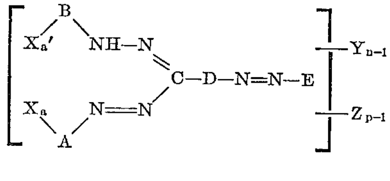

(IV)

wherein $X_a$ and $X_a'$ have the meanings given in Formulae II and III*a* and the other symbols have the meanings given in Formula I and, simultaneously or subsequently reacting the formazane azo dyestuff obtained of Formula IV with agents introducing heavy metal Me, to form a dyestuff of Formula I.

As diazo components A of Formula II not containing a metallisable group in o-position, any desired diazotisable, primary aromatic amines of the carbocyclic or heterocyclic series can be used. As examples are mentioned: aminobenzene and its mono- or di-sulphonic and carboxylic acids; amino benzenes and aminobenzene sulphonic acids substituted by alkyl, alkoxy, phenoxy, halogen, nitro, cyano, trifluoromethyl, acetylamino, haloalkanoylamino and/or benzoylamino; aminodiphenylamine sulphonic acids, aminodiphenyl sulphones and aminophenylalkyl sulphones and their sulphonic acids; aminobenzenes and aminobenzene sulphonic acids substituted by 6-methylbenzothiazolyl-2, benzotriazolyl-1, benzotriazolyl-2, naphthotriazolyl-2 or benzimidazolyl-2; aminonaphthalenes, particularly aminonaphthalene mono-, di- or tri-sulphonic acid, which can be further substituted, e.g. by hydroxyl, nitro or acylamino groups such as acetylamino, benzoylamino or arylsulphonylamino, phenylamino, phenylureido or arenotriazolyl groups; aminostilbene sulphonic acids such as 4-aminostilbene-4′-nitro-2,2′-disulphonic acid, 4-aminostilbene-4′-acylamino-2,2′-disulphonic acid or 4-aminostilbene-4′-naphthotriazolyl-2,2′-disulphonic acid, 2-amino-6-methyl-benzothiazole, 6-amino-quinazoline, 2-aminothiazole or 5-aminobenzothiazole.

For the production of metallisable azo dyestuffs, advantageously the usual o-hydroxyamino-benzene and -naphthalene and o-aminocarboxyl-benzene and -naphthalene compounds are used as diazo components A of Formula II containing a metallisable group in o-position. As examples are mentioned: 2-hydroxy-1-aminobenzenes or 2-hydroxy-1-aminobenzene-3-, -4-, -5- or -6-sulphonic acids or 2-aminobenzene-1-carboxylic acids or sulphonated 2-aminobenzene-1-carboxylic acids, e.g., 2-aminobenzene-1-carboxylic acid-5-sulphonic acid mono-substituted by alkyl, alkoxy, halogen, nitro, alkylsulphonyl, acylamide, sulphamide, N-alkylsulphamide or N-cycloalkyl-sulphamide; also optionally further substituted, particularly sulphonated, o-aminonaphthalene carboxylic acids such as 2-aminonaphthalene-3-carboxylic acid, 2-amino-3-carboxynaphthalene-6-sulphonic acid and -6,8-disulphonic acid, 2-hydro-1- or 3-aminonaphthalene sulphonic acids, 1-hydroxy-2-aminonaphthalene sulphonic acids such as 2-hydroxy-1-aminonaphthalene-4-sulphonic acid and the derivatives thereof nitrated sulphonated in the 6-position. Examples of diazo components having an acyclic or cyclic substituent in the o-position containing an acid imide group or with a fused heterocycle having an adjacent acid imide group are: 2-aminobenzimidazole, 2-(2′-aminophenyl)-benzimidazole, 4-aminobenzotriazole, 7-aminoindazole, 5-amino-triazole or 3-aminobenzopyrazole; all these can contain inert C-ring substituents usual in azo dyestuffs mentioned in Formula I.

As diazo components of Formula II having a substituent in the o-position which can be converted into a metallisable group can be mentioned: 1-aminobenzene-2-bis-(alkyl- or arylsulphonyl)-imides as well as ring-substituted derivatives thereof, e.g. 1-aminobenzene-2-bis-(4′-methylbenzenesulphonyl)-imide as well as the corresponding 4- or 5-chloro, -alkoxy, -alkylsulphonyl, -cyano, -trifluoromethyl or -methyl compounds which can be diazotised, coupled, and, under mild alkaline conditions, saponified to form the corresponding metallisable o-toluene sulphonylamidobenzene azo dyestuffs. Also o-lower alkoxyarylamines can be used which are subjected to a dealkylating metallisation.

As diazo components of Formula II which contain a fibre-reactive substituent, those easily accessible are, e.g. 4- or 5-(2′,4′-dichloro-s-triazinyl-6′-amino-, 4- or 5-(2′- chloro-4′-sulphophenylamino-s-triazinyl-6′-amino)-, 4- or 5-[2′,5′,6′-trichloropyrimidyl-(4′)-amino]-, 4- or 5-(2′,3′-dichloroquinoxaline-6′-carbonylamino)-, 4- or 5-(3′,8′-dichlorophthalazine-5′-carbonylamino)-, 4- or 5-(2′,4′-dichloro-quinazoline-6′- or 7′-carbonylamino)-, 4- or 5-(4′,5′-dichloropyrazine-6′-on-1′-yl)-β-propionylamino-2-aminobenzene-1-sulphonic acid, -5- or -6-amino-2-chloro- or -2-sulphobenzothiazole- or -oxazole, 6-amino-2-dichloroquinazoline as well as the corresponding derivatives of 4,4′-diaminodiphenyl-3-sulphonic acid, also β-(3- or 4-aminobenzenesulphonyl)-ethyl sulphates and 3- or 4-amino-(β-sulphato-alkylsulphamido)-benzene compounds which can have ring substituents such as halogen and lower alkyl groups.

Coupling components of general Formula III*a* can be produced by various methods. They are obtained, e.g. when a diazotisable aminoaryl aldehyde $$O{=}CH{-}D{-}NH_2$$

is diazotised and coupled with a coupling component EH and then the azo dyestuff obtained is condensed with an aryl hydrazine of formula $X_a'{-}B{-}NH{-}NH_2$ to form the aryl hydrazone of Formula III*a*. Or an aminoaryl aldehyde $O{=}CH{-}D{-}NH_2$ can first be condensed with an aryl hydrazine of the formula $X_a'{-}B{-}NH{-}NH_2$, then the aminoaryl hydrazone obtained can be diazotised and coupled with a coupling component EH to form the aryl hydrazone of Formula III*a*. In these processes, D is the radical of a diazo component, E is the radical of a coupling component and $X_a'{-}B$ is the radical of a diazo component the diazonium compound of which is not coupled but reduced by the usual methods, e.g. with salts of sulphurous acid whilst saponifying the N-sulphonic acids formed as intermediates with strong mineral acid or with alkali stannites, to form the aryl hydrazine used above.

Suitable aryl hydrazines of formula $$X_a'{-}B{-}NH{-}NH_2$$

are, e.g. 2-hydroxy-5-sulphophenylhydrazine, 2-carboxy-4-sulphophenylhydrazine, 2-carboxy-4-chlorophenylhydrazine, 2-carboxy-4-nitrophenylhydrazine, 2-carboxy-4-methoxyphenylhydrazine, 2-hydroxy-5-methyl-3-sulphophenylhydrazine, 2-hydroxy-3,5-di-sulphophenylhydrazine, 2-hydroxy-5-nitrophenylhydrazine, 2-hydroxy-5-chlorophenylhydrazine and 2-hydroxy-5-bromophenylhydrazine-3-sulphonic acid.

Aminobenzaldehydes are preferably used as the diazotisable aminoaryl aldehydes which serve for introducing nucleus D into the dyestuff molecule. They are obtained from known nitrobenzaldehydes by reduction, under normal conditions, with hydrogen activated by nickel catalysts or also by reduction according to Béchamp, of the addition product of nitrobenzaldehyde and sodium bisulphite. m-Aminobenzaldehyde, p-aminobenzaldehyde, 3-amino-4-methyl-benzaldehyde, 3-amino-4- or -6-sulphobenzaldehyde, 3-amino-4-chlorobenzaldehyde, 3-amino-4-hydroxy-benzaldehyde, 3-amino-6-hydroxy-benzaldehyde, 5-amino-2-chlorobenzaldehyde, 3-amino-4-methoxy-benzaldehyde, 4-amino-3-chlorobenzaldehyde and 5-amino-3-chloro-benzaldehyde are suitable starting materials. Also polynuclear and heterocyclic aminoaldehydes can be used, e.g. naphthaldehydes such as 3-hydroxy-naphth-2-aldehyde, 4-hydroxy-naphth-1-aldehyde or 4-hydroxy-6-nitro-naphth-1-aldehyde, or 6-aminobenzimidazole-2-aldehyde. The latter is obtained from 4-acylamino-1,2-diaminobenzene by condensation with dichloroacetic acid and saponification of the 2-dichloromethyl-6-acetamido-benzimidazole obtained. Advantageously it is used in the form of the salt which has been isolated with acids.

The aminoaryl aldehydes or aminoaryl hydrazones are diazotised in mineral acid solution and coupled with any coupling components E—H desired. To attain green dyestuffs, they are preferably coupled with so-called "yellow components," e.g. with an aminobenzene compound coupling in a p-position to an amino group, which are preferably used in the form of the phenylaminomethane sulphonic acids and, after the coupling, are saponified to form the free amino compound, with phenols coupling in o- or p-position to the hydroxy group, e.g. o- or p-alkyl phenols, with acyl acetic acid arylamides, with 5-hydroxypyrazoles or 5-aminopyrazoles, particularly with optionally further substituted 1-phenyl-3-methyl-5-hydroxy- or 1 - phenyl - 3 - methyl - 5 - amino-pyrazoles such as 1-[3'-(2'',3''-dichloroquinoxaline-6''-carbonylamino) - phenyl]-3-methyl-5-pyrazolone or -3-carboxy-5-pyrazolone, with dialkyl dihydroresorcinols, acetoacetic anilides such as acetoacetylaminobenzene, 1-acetoacetylamino-benzene-3-sulphonic acid, 1-acetoacetylamino-4-bromo-benzene-2- or -3-sulphonic acids, with malonyl hydrazides, malonyl ureas, which afford trihydroxypyrimidyl radicals as E, 2,4-dihydroxyquinolines, etc.

However, in order to attain subdued shades they are also coupled with naphthols, naphthol sulphonic acids, aminonaphthalenes and their sulphonic acids, e.g. I acid, H acid or K acid, as well as with acylamido naphthols, amino and acylamido naphthol sulphonic acids such as 2β - chlorocrotonylamido-5-hydroxynaphthalene - 7 - sulphonic acid, with 2,3-hydroxynaphthoyl-(3)-anilides, e.g. 1 - (2'-hydroxy-3'-naphthoylamide)-benzene-4'-sulphonic acid.

Thedyestuffs obtained from diazotised aminoaryl aldehydes are condensed with aryl hydrazines $$X_a'—B—NH—NH_2$$

to form the hydrazone of Formula III*a*. The hydrazines $$X_a'—B—NH—NH_2$$

can be derived from aromatic amines of the benzene and naphthalene series having the ring substituents usual in diazo components, which substituents do not elongate the resonance system of the dyestuff, especially halogen (chlorine or bromine), lower alkyl, lower alkoxy, nitro, lower alkylsulphonyl, lower alkanoylamino or sulphonic acid group, and which amines, in particular, can be o-carboxy- and o-hydroxyl-substituted. The condensation to form the hydrazone III*a* is performed very easily, optionally by heating in aqueous or organic solution. The dyestuffs obtained from diazotised aminoaryl hydrazones form the hydrazones of Formula III*a* direct.

Compounds of Formula III*a* are also obtained by coupling a hydroxyaryl aldehyde or aminoarylaldehyde which is capable of coupling with the diazonium compound of an amine E—$NH_2$, if desired acylating the amino group and then condensing the azo dyestuff obtained with an aryl hydrazine of formula $X_a'$—B—NH—$NH_2$ to form the aryl hydrazone of Formula III*a*. Herein E is the radical of a diazo component and D is the radical of a coupling component.

As hydroxy- or amino-aryl-aldehydes capable of coupling, there are suitable: 3-bromo-5-amino-benzaldehyde, 3-aminobenzaldehyde, salicylaldehyde, resorcylaldehyde, 4-hydroxybenzaldehyde, the acetoacetylamino benzaldehydes obtained from aminobenzaldehydes and diketene, e.g. 3- or 4-acetoacetylamino-benzaldehyde, 2- or 4-sulpho-5-acetoacetylamino-benzaldehyde, 2- or 4-chloro-, 2,4-dichloro-, 2-bromo-, 4-ethoxy-, 2-methoxy-, and 4-ethyl-5-acetoacetylamino-benzaldehyde.

The compounds defined in Formula II or corresponding diazonium compounds are suitable as diazo components obtained by diazotising an amine E—$NH_2$.

To produce metallisable dyestuffs, diazoamino compounds having metallisable groups are coupled with coupling components coupling in a position adjacent to metallisable groups.

If W in coupling components of general Formula III*a* represents a substituent replaceable by azo coupling, then it is the formyl or carboxyl group or a substituent which can be converted into the carboxyl group such as cyano, carboxylic acid ester or carboxylic acid amide group. Such coupling components in which W is a replaceable substituent other than hydrogen are obtained, e.g. by coupling a diazonium compound of an amine of formula $X_a'$—B—$NH_2$ with an amino or nitroarylmethylene or —methine compound which, on completion of the coupling, still contains a carboxyl group or a substituent which can be converted thereinto at the methine-C atom, e.g. with an amino- or nitrophenylformyl-acetic acid ester, then, optionally, reducing the nitroazo dyestuff obtained to the corresponding aminoazo dyestuff, diazotising this, coupling with a coupling component EH and, if necessary, then performing the conversion of a substituent which can be converted into a carboxyl group.

The coupling of the diazonium compound of amines of Formula II, $X_a$—A—$NH_2$ with the hydrazones of Formula III*a* to form formazanes of Formula IV is performed by known methods, advantageously in the presence of an agent introducing metal, e.g. agents introducing calcium, magnesium, zinc or copper, preferably in a weakly acid to weakly alkaline medium and at a temperature of 0 to about 40° C. If alkaline earth metals are used, then they can be very easily replaced by a heavy-metal Me from the formazane complex formed, e.g. by simply heating in an aqueous or organic solution containing the heavy metal salt.

As agents introducing a heavy metal Me, with which the metal-free formazane compounds of Formula IV are converted by known methods into their heavy metal complexes of Formula I, the usual, advantageously water-soluble, simple or complex salts of heavy metals of the atomic numbers 24 to 30 of organic or inorganic acids are used. By this are meant the water-soluble chromium, cobalt, nickel, zinc, manganese and, mainly, the copper salts of mineral acids or low fatty acids such as copper sulphate or copper acetate. The heavy metal salts of mineral acids are used advantageously in the presence of a mineral acid buffering agent. Such agents are, in particular, alkali hydroxides or carbonates or alkali metal salts of low fatty acids such as alkali acetates, or alkali metal salts of polybasic oxygen acids of phosphorus, or ammonia or tert. nitrogen bases such as pyridine bases. Optionally, the complex salts of these metals can also be used whereby the groups bound in complex linkage may be contained in the end product. The agent introducing heavy metal is used in at least equimolecular amounts so that at least one atom of heavy metal is present per mol of dyesuff. Usually the metallisation is completed at room temperature; often, however, light heating, e.g. to about 80° C. is necessary. Without complexing agent, the metallisation is advantageously performed at a pH of 4 to 8, whilst in the presence of complexing agents such as tartaric or citric acid, it is preferably performed at a pH between about 8 and 14.

The formazane azo dyestuffs containing heavy metal obtained according to the invention are worked up and isolated by the usual methods. In some cases, crude products are purified by dissolving and recrystallising.

Particularly valuable, easily accessible, fibre-reactive heavy metal-containing formazane azo dyestuffs according to the invention which are distinguished by good dyeing properties are formazane azo dyestuffs of Formula I in which *n* is 2 or 3 and which contain 2 to 5 sulphonic acid groups. In the preferred class of fibre-reactive dyestuffs of Formula I, Me is copper, A, B and D are radicals of the benzene series, E is a radical of the benzene, pyrazole or acetoacetic phenylamide series, X' is the COO— group and X is an oxygen bridge, it being possible for one of the radicals A, B or E to contain the reactive group Y optionally bound by way of an amino group.

These particularly interesting reactive dyestuffs are obtained, e.g. by using the starting components mentioned above with reactive substituents, or by subsequent reaction of dyestuffs containing acylatable amino groups with acylating agents introducing reactive radicals such as with poly-N-heterocycles containing several mobile chlorine atoms, with carboxylic acid chlorides containing halogen polyazine rings, with carboxylic acid halides containing mobile chlorine, etc.

A modification of the process according to the invention for the production of new, heavy metal-containing formazane azo dyestuffs of Formula I, consists in coupling the diazo compound of an amine of Formula II with a coupling component of general Formula III*b*.

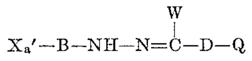 (III*b*)

wherein:

- W represents hydrogen or a substituent which can be replaced by azo coupling, and
- Q represents a diazotisable amino group or a substituent which can be converted into a diazotisable amino group and wherein $X_a$ and $X_a'$ in Formula II and III*b* represent metallisable group or substituents which can be converted into metallisable groups, to form a formazane dyestuff, simultaneously or subsequently reacting this with agents introducing heavy metal Me, where necessary, converting Q into the primary amino compound, diazotising the latter and coupling the novel diazonium compound of the amino-formazane dyestuff of general Formula V

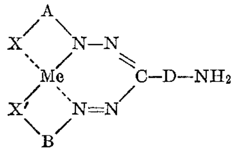 (V)

wherein the symbols A, B, D, Me, X and X′ have the meanings given in Formula I, with a coupling component E—H to form a formazane azo dyestuff of general Formula I, the components II and III*b* being so chosen that A, B, D and E together contain at most 5 Z and 2 Y as substituents, the latter only in A, B and E.

It is surprising that the compounds of Formula V can be diazotised, e.g. in strong hydrochloric acid medium, without decomposition of the heavy metal complex.

Amines of Formula II suitable for this modification of the invention are described in the first process.

Coupling components of general Formula III*b* can be produced by various methods. They are obtained, e.g. by condensing an aminoaryl aldehyde of the formula

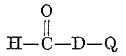

with an aryl hydrazine of formula $X_a'$—B—NH—$NH_2$ to form the aryl hydrazone of Formula III*b*, or by coupling a Q-D-methane or Q-D-methylene compound with a diazonium compound of an amine of formula $$X_a'—B—NH_2$$

and then, optionally, saponifying a substituted carboxylic acid group to the carboxyl group.

D in this process means a diazo component; the remarks given above for D as diazo component apply here. Preferably D is an optionally sulphonated phenylene radical or also an optionally sulphonated naphthylene radical.

Q in the meaning of a substituent which can be converted into a diazotisable primary amino group means, chiefly, the nitro or an acylamino group which can be converted by reduction or saponification into the diazotisable amino group.

As coupling component E—H, naturally the compounds described in the first process are used.

The remarks given in the description of the first process also apply to the coupling and metallisation to form the amino formazane dyestuff of the general Formula V. The diazotisation of the amino formazane dyestuff and the coupling with a coupling component E—H to form the formazane azo dyestuff of general Formula I are performed by the usual diazotisation and coupling methods.

Another modification of the process according to the invention for the production of new, heavy metal-containing formazane azo dyestuffs consists in coupling 2 equivalents of diazo compound of amines of Formula II with a coupling component of Formula III*c*

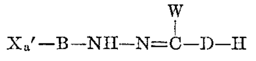 (III*c*)

wherein:

- W represents hydrogen or a substituent which can be replaced by azo coupling, and
- D represents the radical of a coupling component, and
- wherein $X_a$ and $X_a'$ represent metallisable groups or substituents which can be converted into metallisable groups, and
- B and D together contain at most one Y and 5Z as substituents, to form a dyestuff of Formula IV wherein $X_a'$—B is identical with E and the other symbols have the meanings given above, and simultaneously or subsequently reacting the dyestuff of Formula IV with agents introducing heavy metal Me to form a formazane azo dyestuff of general Formula I wherein $X_a'$—B is identical with E.

Amines of Formula II suitable for this embodiment of the invention are described in the first process.

Coupling components of general Formula III*c* can be produced by various methods. They are obtained, e.g. by condensing an aryl aldehyde of formula

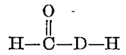

with an aryl hydrazine of formula $X_a'$—B—NH—$NH_2$ to form the aryl hydrazone of Formula III*c*, or by coupling an H—D-methine or H—D-methylene compound with a diazonium compound of an amine of formula $$X_a'—B—NH_2$$

and then, optionally, saponifying a substituted carboxylic acid group to the carboxyl group.

In this process, D represents a coupling component; the remarks given above for D as coupling component apply here. In the most simple case, D can be an amino- or hydroxy-phenyl radical, e.g. a 3-amino-1-phenyl, 2-hydroxy-1-phenyl or a 2,4-dihydroxy-1-phenyl radical.

The conditions given in the description in the first process apply to the coupling and metallisation to form the formazane azo dyestuff of general Formula I.

In a second aspect the invention provides fiber-reactive, heavy metal-containing formazane dyes which contain as a fiber-reactive grouping a pyrimidyl group which contains at least one mobile fluorine atom; these formazane dyes fall under the general Formula I*a*.

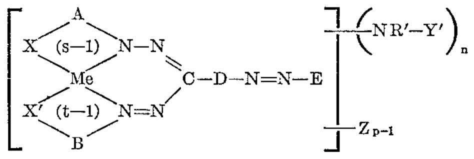 (Ia)

In this Formula I*a*:

- A and B each denote the radical of a diazo component, which contains X resp. X′ in the o-position to the nitrogen bond,
- X and X′ each denote the radical of a metal-binding substituent, preferably one X the —COO group and the other X oxygen,
- D and E denote alternatively each the radical of a diazo or of a coupling component,
- Me denotes a heavy metal of the atomic numbers 24 to 30,
- Y′ denotes a pyrimidyl radical which contains at least one mobile fluorine atom, and may be still further substituted, R' denotes hydrogen or a lower alkyl group, Z denotes a salt-forming, water-solubilizing group exhibiting acid dissociation in water,

*n* denotes a positive integer not exceeding 2,

*p* denotes a positive integer not exceeding 6, and

*s* and *t* denote 1 or 2, with the proviso that the sum $s+t$ is at least 3, and the substituent $\text{-}(NR'-Y')_n$ is bound to A, B or E.

As substituent essential to the metal linkage at least one of the radicals A and B, particularly A, but preferably both, contains in the o-position to the nitrogen bond, a metal-binding substituent X or X'. This substituent is, for example, derived from a phenolic hydroxyl group, a carboxyl group, an amino group or an amido or amino group exhibiting acid dissociation, e.g. a sulphamoyl or imido group, which belong to a heterocycle condensed on. This substituent can also be derived from substituents which are convertible into metallizable groups. Examples of such are lower alkoxy groups which may or may not be substituted, such as the mehoxy, ethoxy, carboxymethoxy or carboxyethoxy group, further di-(sulphonic acid amide) groups or acyloxy groups, which after diazotizing and coupling can be easily saponified to organosulphamoyl resp. hydroxyl groups. As radicals A and B including imido groups, in suitable position, exhibiting acid dissociation, which belong to heterocyclics condensed on, the 4-benzoimidazolyl and the 4-benzotriazolyl radicals may be named by way of example.

If the radicals A and/or B include a metal-binding substituent X or X' they preferably belong to the series of the aromatic homocyclics which may be mono- or polynuclear uncondensed or may be condensed with further homocyclics or with heterocyclics. In the first place, this is the radical of an o-hydroxyphenyl or o-carboxy-phenyl resp. o-hydroxynaphthyl or o-carboxynaphthyl compound, which may have further ring substituents usual in azo dyes.

Where the radical A or B does not have a metal-binding substituent it may belong to the homo- as well as to the heterocyclic-aromatic series; it may be mono- or polynuclear, uncondensed or condensed. Besides radicals of aminobenzene, aminonaphthalene, aminodiphenyl compounds commonly used in the preparation of azo dyes, preferred hetero rings contemplated are 5- to 6-membered aromatic nitrogen rings, e.g. pyrazole, imidazole, triazole, tetrazole, oxazole, thiazole, oxadiazole or thiadiazole rings which may be uncondensed or condensed, respectively substituted with homo or other hetero rings.

Since D and E each denote alternatively the radical of a diazo component or a coupling component, D is the radical of a coupling component if E represents the radical of a diazo component ($E-NH_2$), and vice versa.

As radical of a coupling component, D may be, for example, a mono- or polynuclear, homocyclic or mixed homoheterocyclic arylene radical which is coupled in the o- or p-position to a hydroxyl or an amino group. In the simplest case, D may be a hydroxyphenylene or aminophenylene radical, e.g. a 2-hydroxy-1,5-phenylene radical, a 2,4-dihydroxy-1,5-phenylene radical or a 3-amino-1,4-phenylene radical with the formazyl group preferably in the 1-position. D may likewise be, however, an amino- or hydroxy-naphthylene radical, for example.

As radical of a diazo component, D is preferably a 1,3- or 1,4-phenylene radical which may or may not be sulphonated, optionally also a naphthylene radical or an arylaminocarbonyl radical with the formazyl group bonded to the carbonyl groups; in radicals of this type the aryl radical preferably is mono-nuclear, although it may alternatively be polynuclear condensed or polynuclear uncondensed.

As radical of a coupling component, E denotes, for example, a radical of the benzene or naphthalene series coupled in the o- or p-position to a hydroxyl or amino group, the radical of an enolic coupling component of the hetero series, e.g. a pyrazolyl, quinolyl, 5-aminopyrazol-4-yl, mlaonyl-urea or pyrimidyl radical, or also the radical of an acylacetamidoaryl compound.

As radical of a diazo component, E preferably is a phenyl, optionally also a naphthyl radical of a mixed homo-heterocyclic or a heterocyclic aryl radical.

The two radicals D and E may include, in the o-position to the nitrogen bond, metallizable substituents, including those listed up further above, or such ones which under oxidizing coppering conditions can be easily converted into two-bond oxgen, such as, for example, hydrogen or the sulphonic acid group.

Where E comprises a benzene radical, the same way contain, besides the substituents $\text{-}(NR'-Y')_n$ and Z, if present, other substituents such as, for example, the hydroxyl group, a lower alkyl group, a lower alkoxy group, the nitro group, a lower alkylamino and benzoylamino group or halogens, such as chlorine or bromine, whereby the benzoyl radical may be unsubstituted or further substituted by substituents which do not extend the resonance system of the dye molecule, such as the methylsulphonyl group, toluylsulphonyl group, lower alkylsulphonyl group, phenylsulphonyl group and the unsubstituted and lower alkyl-substituted sulphamoyl group.

In valuable green dyes, E denotes, as radical of a coupling component, preferably the radical of a so-called yellow component, i.e., for example, a hydroxy- or aminophenyl radical, further a 5-amino or 5-hydroxypyrazol-4-yl radical, an acyl-acetamidophenyl radical or a malonylurea radical. The radical of a corresponding diazo component is then, preferably, a phenyl or also a naphthyl radical.

The fibre-reactive, particularly cellulose-reactive formazane dyes of Formula I*a* contain in A, B or E the defined pyrimidyl amino radical $(NR'-Y')_n$ wherein R' in the meaning of a lower alkyl group, denotes e.g. the methyl or ethyl group. Preferably R' denotes hydrogen.

The pyrimidyl radical Y' if this pyrimidylamino group $\text{-}(NR'-Y')_n$ advantageously includes 1 or 2 mobile fluorine atoms, and it may be substituted by further monovalent substituents. Examples of usable further monovalent substituents are halogens, such as chlorine, bromine or fluorine, nitro or cyano groups; hydrocarbon groups, especially lower alkyl groups or phenyl groups, alkyl groups, optionally substituted by halogen, e.g. the trifluoromethyl group or the chloromethyl group, ether groups, especially lower alkoxy groups or phenoxy groups which preferably may be negatively ring-substituted, thioether groups, particularly lower alkylthio groups, lower alkylsulphonyl groups, optionally N-mono- or N,N-disubstituted carboxylic acid or sulphonic acid amide groups, carboxylic acid ester groups, especially lower alkoxycarbonyl groups or amino groups derived from ammonia or from a primary or secondary amine, such as the amino, methylamino, ethylamino, N,N-dimethylamino, N,N-diethylamino or phenylamino group.

Preferably, Y' denotes a pyrimidyl radical of the formula

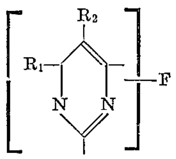

Therein:

$R_1$ denotes hydrogen or halogen, a lower alkyl radical which may or may not be substituted by halogen, an aryl radical, particularly a phenyl radical, a carboxylic acid amide group, a lower carboxylic acid ester group, or the cyano group, and $R_2$ is the same as $R_1$ or denotes a sulphonic acid amide group, a lower alkylsulphonyl group or the nitro group.

If now $R_1$ and/or $R_2$ denote halogen, such halogen is bromine, particularly, however, fluorine or chlorine; if it denotes a lower alkyl radical, such lower alkyl radical preferably is the methyl radical; if it denotes a lower alkyl radical, substituted by halogen, such substituted lower alkyl radical is a monochloromethyl, difluoromethyl or trifluoromethyl radical, for example; and if it denotes a carboxylic acid ester group, it denotes e.g. the carboxylic acid methyl or carboxylic acid ethyl ester group.

Where $R_2$ denotes a lower alkylsulphonyl group, such alkylsulphonyl group is, for example, the methylsulphonyl group or the ethylsulphonyl group.

The pyrimidyl radical of the above formula is derived, for example, from the following pyrimidines:

2,5-dichloro-4,6-difluoro-pyrimidine,
2,5-dibromo-4,6-difluoropyrimidine,
2,4-difluoropyrimidine,
2,4-difluoro-5-chloropyrimidine,
2,4-difluoro-5-cyanopyrimidine,
2,4-difluoro-5-methylpyrimidine,
2,4-difluoro-5-trifluoromethyl-pyrimidine,
2,4-difluoro-5-nitropyrimidine,
2,4-difluoro-5-phenylpyrimidine,
2,4-difluoro-5-sulphamoylpyrimidine,
2,4-difluoro-5-carbamoyl-pyrimidine,
2,4-difluoro-5-methylsulphonyl-pyrimidine,
2,4-difluoro-5-ethylsulphonyl-pyrimidine,
2,4-difluoro-5-carboxylic-acid-methyl-ester-pyrimidine,
2,4-difluiro-6-chloro-pyrimidine,
2,4-difluoro-6-bromo-pyrimidine,
2,4-difluoro-6-methyl-pyrimidine,
2,4-difluoro-6-cyano-pyrimidine,
2,4-difluoro-6-phenyl-pyrimidine,
2,4-difluoro-6-trifluoromethyl-pyrimidine,
2,4-difluoro-6-carbamoyl-pyrimidine,
2,4-difluoro-6-carboxylic-acid-methyl-ester-pyrimidine,
2,4-difluoro-5,6-dichloro-pyrimidine,
2,4-difluoro-5-chloro-6-methyl-pyrimidine,
2,4-difluoro-5-chloro-6-phenyl-pyrimidine,
2,4-difluoro-5-chloro-6-difluoromethyl-pyrimidine,
2,4-difluoro-5-chloro-6-trifluoromethyl-pyrimidine,
2,4-difluoro-5-chloro-6-carboxylic-acid-methyl-ester-pyrimidine,
2,4-difluoro-5,6-dibromo-pyrimidine,
2,4-difluoro-5-bromo-6-methyl-pyrimidine,
2,4-difluoro-5-bromo-6-trifluoromethyl-pyrimidine,
2,4,5-trifluoro-6-methyl-pyrimidine,
2,4-difluoro-5-nitro-6-chloro-pyrimidine,
2,4-difluoro-5-methyl-6-chloro-pyrimidine,
2,4,6-trifluoro-5-trifluoromethyl-pyrimidine,
2,4,6-trifluoro-pyrimidine,
2,4,6-trifluoro-5-chloro-pyrimidine,
2,4,6-trifluoro-5-bromo-pyrimidine,
2,4,6-trifluoro-5-nitro-pyrimidine,
2,4,6-trifluoro-5-cyano-pyrimidine,
2,4,6-trifluoro-5-methyl-pyrimidine,
2,4,6-trifluoro-5-chloromethyl-pyrimidine,
2,4,6-trifluoro-5-difluoromethyl-pyrimidine,
2,4,6-trifluoro-5-carbamoyl-pyrimidine,
2,4,6-trifluoro-5-carboxylic-acid-methyl-ester-pyrimidine,
2,4,6-trifluoro-5-carboxylic-acid-ethyl-ester-pyrimidine,
2,4,6-trifluoro-5-methylsulphonyl-pyrimidine, and
2,4,5,6-tetrafluoro-pyrimidine.

Furthermore, also reaction products of those fibre-reactive pyrimidines containing mobile halogen, which then include at least one separable amonium substitutent, e.g. an N-pyridinium, N-tri-alkylammonium, an N-triethylene-diammonium or an asymmetric N-dialkyl-hydrazinium group, may be employed.

Especially preferred pyrimidines are 2,4,6-trifluoro-pyrimidine and 2,4,6-trifluoro-5-chloro-pyrimidine.

As salt-forming, water-solubilizing groups exhibiting acid dissociation in water, corresponding to Z, the formazan dyes according to the invention of Formula I*a* contain preferably sulphonic acid groups, but besides also phosphonic acid groups, carboxy groups, disulphamide groups or monoester groups of polybasic acids, such as, for example, sulphate or phosphate groups. Alternatively, Z may have, in the dye molecule, also different ones of those meanings.

In addition to those essential substituents $(NR'—Y')_n$ and Z, the formazane dyes of Formula I*a* may include further substitutents as they are commonly found in azo dyes, preferably as ring substitutents, for example, halogen, such a fluorine, chlorine or bromine; alkyl groups, such as the methyl, ethyl, iso-propyl, tert.butyl, tert.amyl or diisobutyl group; alkoxy groups, such as the methoxy, ethoxy, propoxy, butoxy or phenoxy group; phenylthio groups, alkylsulphonyl and arylsulphonyl groups; acyl groups; sulphonic acid amide and carboxylic acid amide groups, with primary, secondary or tertiary amide group and aliphatic, araliphatic, alicyclic, aromatic-homocyclic or -heterocyclic N-substituents; the nitro group; the cyano group; primary, secondary or tertiary amino groups; acylamide groups, such as acetylamide, chloroacetylamide, bromopropionylamide, chloroacroylamide or bromoacroylamide, benzoylamide, methylsulphonylamide, ethylsulphonylamide, chloromethylsulphonylamide, benzenesulphonylamide and methylbenzenesulphonylamide groups; substituted alkyl groups, e.g. perfluoroalkyl groups, such as the trifluoromethyl group; further alkoxyalkyl, acyloxyalkyl, cyanalkyl and carboxyalkyl groups, these latter preferably as N-substituents. All carbocyclic aryl constituents of those substitutents may likewise be substituted in this manner.

The same holds, in an analogous way, for the starting materials.

The fiber-reactive, heavy metal-containing formazane dyes according to the invention of Formula I*a* are obtained by the process described under the first aspect of this invention.

Another mode of carrying out the above-described process in practice which mode is particularly suitable for the preparation of the new formazane dyestuffs of Formula I*a* comprises reacting a heavy metal-containing formazane dye of the general Formula I*a*, wherein Y' in this case denotes hydrogen with a pyrimidine compound which contains more than one mobile fluorine atom and may be still further substituted, to form a fiber-reactive, heavy metal-containing formazane dye of the general Formula I*a*.

Suitable pyrimidine compounds for this embodiment of the invention are the pyrimidines named in the description of the second aspect.

The working-up and isolation of the fibre-reactive, heavy metal-containing formazane dyes of formula I*a* obtainable in accordance with the invention is accomplished by conventional methods. If desired, the crude products are purified by dissolving and allowing to crystallize.

In especially valuable, easily accessible, fibre-reactive heavy metal-containing formazane dyes of Formula I*a* according to the invention, which are distinguished by good dyeing properties, the radicals A, B, D and E contain altogether 2 to 5 sulphonic acid groups as Z, Me denotes copper, A is a phenylene radical optionally substituted by halogen, lower alkyl, lower alkyl sulphonyl or the nitro group, or a naphthylene radical optionally substituted by the nitro group, B is a phenylene radical optionally substituted by halogen, lower alkyl, lower alkyl sulphonyl or the nitro group, E denotes a phenylene radical optionally substituted by halogen, lower alkyl, lower alkoxy, hydroxy, nitro or acylamino group, or a naphthyl radical substituted by hydroxy or arylamino groups, or a diaryl radical or a radical of the acetoacetic-phenylamide series or an optionally substituted pyrazolon-4-radical. X denotes the COO-group, X' denotes the —O-group, and *n* is 1.

Those especially interesting reactive dyes are obtained preferably by reaction of formazane dyes of Formula I*a* wherein Y′ denotes hydrogen with the pyrimidines mentioned at the outlet preferably with 2,4,6-trifluoropyrimidine or 2,4,6-trifluoro-5-chloro-pyrimidine.

The fibre-reactive, heavy metal-containing formazane dyes of Formula I*a* obtainable according to the invention find use for dyeing or printing textile and synthetic materials of all kind. Formazane dyes which are free of water-solubilizing groups may be used, for example, for dyeing synthetic materials of all kind, such as lacquers, varnishes or spinning compositions consisting of acetylcellulose or synthetic polyamides.

The fibre-reactive heavy metal-containing formazane dyes according to the invention which contain water-solubilizing groups, such as e.g. carboxylic acid- or phosphonic acid- and especially sulphonic acid groups and 1 or 2 fibre-reactive groups —NR′—Y′, are dark powders which in the form of their alkali metal salts are very well soluble in water. They are suitable for use in the dyeing or printing of leather, paper and fibrous material, particularly of fibrous material of natural or synthetic polypeptides, such as e.g. wool, silk, nylon and polyurethane fibres. Dyes according to the invention, which comprises a sulphonic acid group, a lower alkylsulphonyl or a sulphamoyl group, exhibit towards wool and fibrous material of similar dyeing behaviour a very good affinity and are absorbed substantially completely already from the neutral to weakly acid bath. The water-solubility of such dyes can still be increased by admixing therewith anion-active or non-ionogenic wetting or dispersing agents or diluting agents.

For the dyeing of proteinic fibrous material, one advantageously employs the new dyes in a weakly acid, for example weakly acetic-acid bath. Frequently, the addition of compounds containing basic nitrogen, e.g. of polyquaternary ammonium compounds is advisable.

Due to the very high fixing rate of the new reactive dyes an alkaline after-treatment of the dyeings and prints on polyamide obtained therewith for improving their wet fastness properties can be dispensed with.

The fibre-reactive formazane dyes of Formula I*a* obtainable according to the invention, when in the form of their alkali metal salts, are very well water-soluble, provided the starting materials are selected so that at least 2 to 5 sulphonic acid groups are present per one dye molecule. These are especially suitable for use in dyeing or printing natural and regenerated cellulose material, such as staple rayon, jute, ramie, hemp, and especially cotton.

Those materials are dyed with the new formazane dyes in accordance with known methods. For example, the cellulose material is impregnated or printed at a low temperature, e.g. 20–50° C., with the, optionally thickened, dye solution, and the dye is then fixed by treatment with acid-binding agents. Examples of such agents which may be employed are sodium carbonate, potassium carbonate, di- and trisodium phosphate, caustic soda solution, also potassium- or sodium bicarbonate when using temperatures above 50° C. Instead of subjecting the impregnated materials to an alkaline after treatment, the acid-binding agent, preferably in the form of alkali carbonates, in many cases can be added already to the impregnating liquors or printing pastes, and the development of the dyeing can then be caused by short heating or steaming to temperatures above 100° C. to 160° C. or by storing at room temperature for a relatively extended period of time. The addition of hydrotropic agents to the printing pastes and impregnating liquors is advantageous in this process, e.g. the addition of urea in amounts of 10 to 200 g. per liter of dye composition.

Advantageously, however, the cellulose material is dyed with the fibre-reactive formazan dyes according to the invention by the exhaustion method, by e.g. introducing the cellulose to be dyed into the dyeing bath containing an acid-binding agent and, if desired, also neutral salts, such as e.g. sodium chloride or sodium sulphate, with dilute dye liquor and at slightly elevated temperature, gradually heating the dyeing bath to temperatures of 40 to 100° C., and bringing the dyeing process to its end at this temperature. If desired, the neutral salts which accelerate the exhaustion of the dye also may be added to the bath only after the dyeing temperature proper has been reached.

By the treatment with acid-binding agents, the new reactive dyes are chemically bonded to the fibre, and particularly the cellulose dyeings, after soaping to remove any unfixed dye, are excellently fast to wetting. Surprisingly, any dye not fixed on the substrate can be easily and completely washed out in spite of the increased substantivity of dyes according to the invention.

The fibre-reactive formazane dyes according to the invention of formula Ia are distinguished by their intensity of colour, in part also by their pure colour tones and particularly by their high reactivity. What is surprising in this respect is that, in spite of the high reactivity of the new formazane dyes, the dyeings and printings obtained therewith are very stable, and further that the dyeings and printings produced therewith exhibit a good stability, particularly when subjected to acid- and alkali hydrolysis. The intensely coloured dyeings produced with the formazane dyes according to the invention on polypeptide- and cellulose fibers are corinth, brown, violet, gray, olive to pure green. They further are distinguished by very good fastness to light and rubbing and excellent fastnesses to wetting, such as e.g. good fastnesses to washing, alkali, milling and perspiration. Moreover, the dyeings are uniform and exhibit an unexpectedly high fastness to injuring effects due to boiling. Finally, formazane dyes according to the invention exhibit a high fixing yield even at low temperatures (10–50° C.); any unfixed dye can be washed out very well, what is one of the essential prerequisites for good fastnesses to wetting, and the dyeings are stable to the conventional synthetic resin finishes.

An aliphatic substituent or aliphatic moiety of a substituent defined as "lower" in this specification or the appended claims means that such substituent or moiety has at most 5 carbon atoms unless expressly stated otherwise.

The following non-limitative examples illustrate the invention further. Temperatures are given therein in degrees centigrade, and percentages are by weight unless expressly stated otherwise.

In these examples, formulae show the free acid forms of the dyestuffs, while in the production as described in the examples the sodium salts or if potassium chloride is used instead of sodium chloride in their preparation the potassium salts are obtained.

EXAMPLE 1

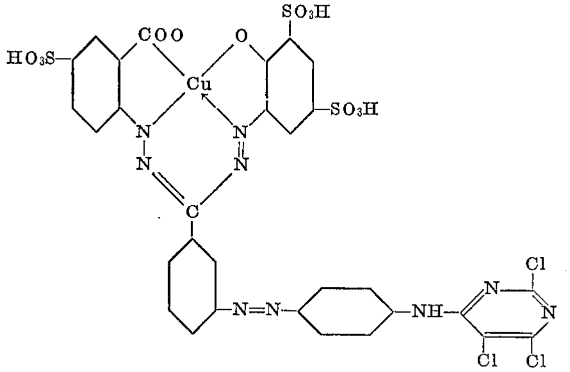

53.3 g. of the aryl hydrazones obtained by condensation of 2-carboxy-4-sulphophenyl hydrazine with 3′-formyl-azobenzene-4-aminomethane sulphonic acid, are dissolved with a neutral reaction in 500 ml. of water and 30 g. of sodium bicarbonate are added. The diazo solution obtained by diazotisation of 26.9 g. of 1-amino-2-hydroxybenzene-3,5-disulphonic acid, and also 100 ml. of a 1-molar aqueous copper sulphate solution are poured into this solution within 1 hour at 20–25°. As soon as the coupling is complete, the temperature is raised to 50–55° and a concentrated aqueous sodium hydroxide solution is added to the solution of the copper complex dyestuff formed until the concentration in the lye is 5%. To saponify the aminomethane sulphonic acid group, the mixture is stirred for 3 hours at 50–55° whereupon the aminoformazane azo dyestuff formed is precipitated by the addition of sodium chloride, filtered off and washed with sodium chloride solution. The filter residue is then dissolved in 500 ml. of 60–65° hot water and 21.8 g. of tetrachloropyrimidine are added. The reaction mixture is stirred for 4–8 hours at 60–65°, the pH being kept at 6.5–7.0 by the addition of a 20% sodium carbonate solution. The reactive dyestuff obtained of the above formula is precipitated with sodium chloride, filtered off, washed with sodium chloride solution and dried in vacuo at 80°.

It is a black powder which dissolves in water with a dark green colour. It dyes cotton and regenerated cellulose fibres from a long liquor in the presence of sodium carbonate as acid binding agent in dark green shades. After a 10 minute treatment with a hot soap solution, the green dyeings are very fast to wet and light.

If the diazo solution alone is added but no copper sulphate solution, and the coupling reaction is performed at a pH of about 11 to 13, the metal free formazane analogous to the above formula is formed and can be salted out and separated by filtration.

It can be subsequently coppered in aqueous solution.

Dyestuffs having similar properties are obtained if, instead of the diazo component used in the example, equivalent amounts of one of the diazo compounds given in column II of the following Table 1 are used, and if, instead of the aryl hydrazone used, equivalent amounts of one of the hydrazones given in columns III and IV of the following Table 1 are used and, if instead of the metal complex-forming or acylating agent, the components given in columns V and VI are used and otherwise the procedure given in the example is followed. Column VII shows the colour of the dyeings obtained on cellulose fibres with the corresponding formazane azo dyestuffs.

The same dyestuff is obtained if the hydrazone prepared by coupling diazotised 1-amino-2-carboxybenzene-4-sulphonic acid with ethyl-3(4'-aminophenylazo)-formyl-acetate and saponifying the ester grouping is coupled with diazotised 1 - amino - 2 - hydroxybenzene - 3,5 - disulphonic acid in the presence of 1 equivalent of copper sulphate and the intermediate is condensed with 2,4,5,6-tetrachloropyrimidine as described in the example above.

TABLE 1

| | Diazo component | Hydrazone from— Hydrazine component | Hydrazone from— Aldehyde component | Complex-forming metal | Acylating agent | Shade on cellulose |
|---|---|---|---|---|---|---|
| Number: 2 | 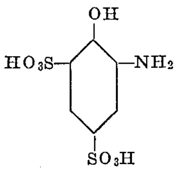 | 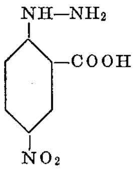 | 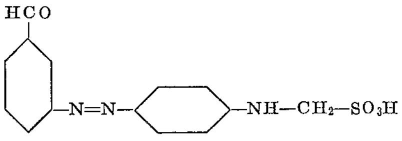 | Cu | 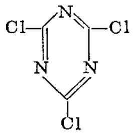 | Green. |
| 3 | 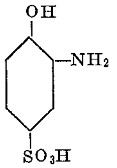 | 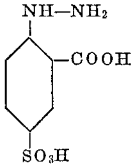 | 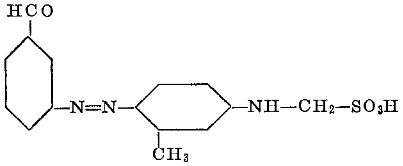 | Cu | 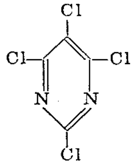 | Do. |
| 4 | 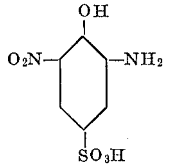 | 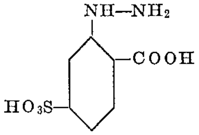 | 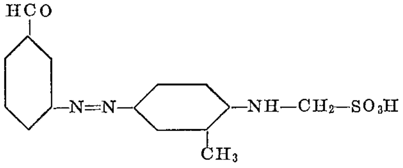 | Cu | 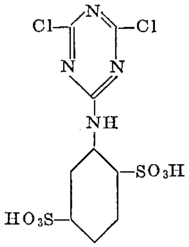 | Do. |

TABLE 1—Continued
| | Hydrazone from— | | | | |
|---|---|---|---|---|---|
| Number: / Diazo component | Hydrazine component | Aldehyde component | Complex-forming metal | Acylating agent | Shade on cellulose |
| 5 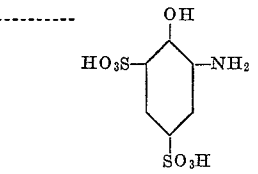 | 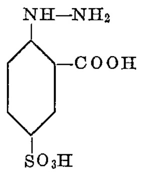 | 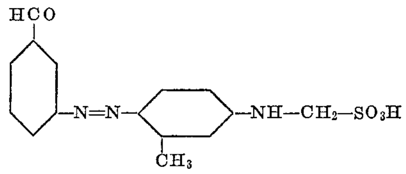 | Cu | 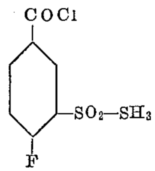 | Green, |
| 6 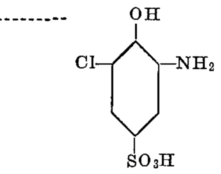 | Same as above | 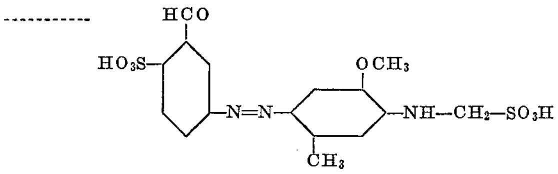 | Cu | 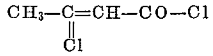 | Do. |
| 7 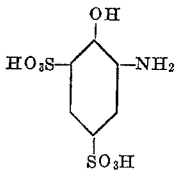 | 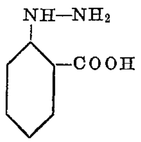 | 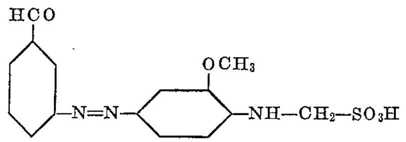 | Cu | 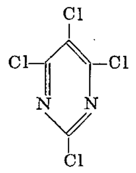 | Do. |
| 8 Same as above | 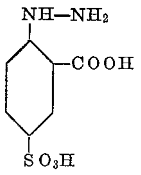 | 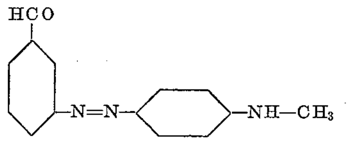 | Cu | 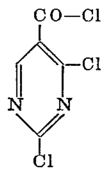 | Do. |
| 9 do | Same as above | 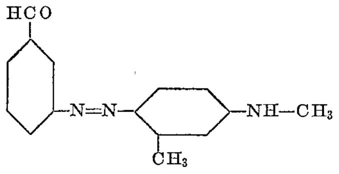 | Cu | 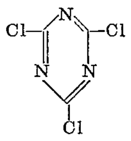 | Do. |
| 10 do | do | 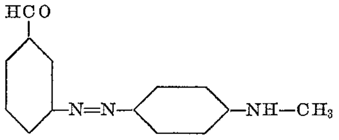 | Cu | 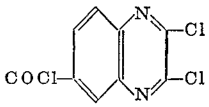 | Do. |

TABLE 1—Continued
| Number | Diazo component | Hydrazone from— Hydrazine component | Hydrazone from— Aldehyde component | Complex-forming metal | Acylating agent | Shade on cellulose |
|---|---|---|---|---|---|---|
| 11 | do | do | 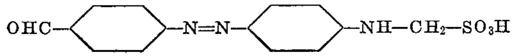 | Ni | 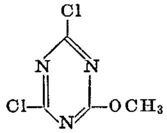 | Brown. |
| 12 | do | 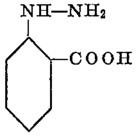 | 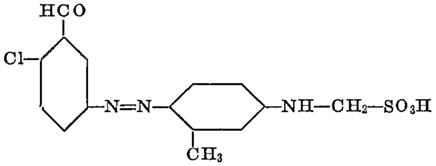 | Co | 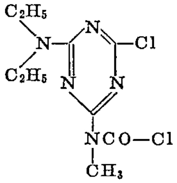 | Green. |
| 13 | 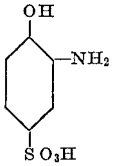 | Same as above | 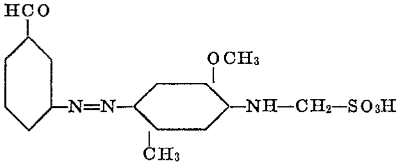 | Cu | 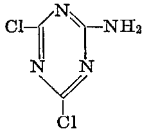 | Do. |
| 14 | Same as above | 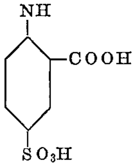 | 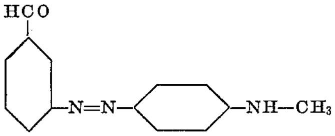 | Cu | $Cl-CO-CH_2-Cl$ | Do. |
| 15 | 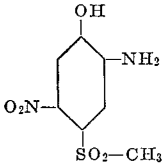 | Same as above | 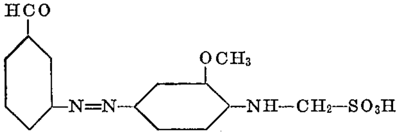 | Cu | 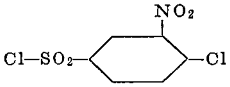 | Do. |
| 16 | 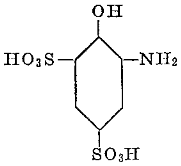 | 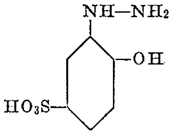 | 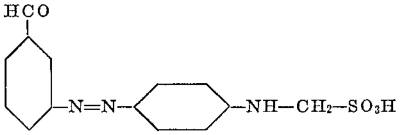 | Cu | 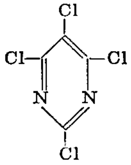 | Do. |

TABLE 1—Continued
| Number | Diazo component | Hydrazone from— Hydrazine component | Aldehyde component | Complex-forming metal | Acylating agent | Shade on cellulose |
|---|---|---|---|---|---|---|
| 17 | 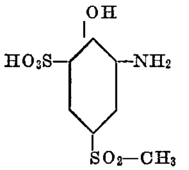 | 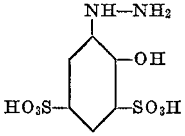 | 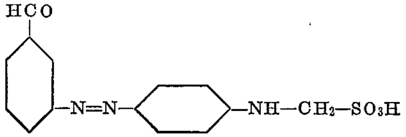 | | 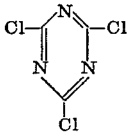 | Green. |
| 18 | 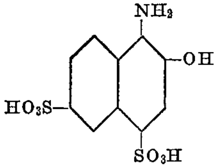 | 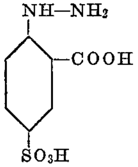 | Same as above | Cu | 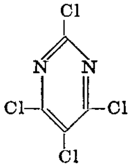 | Do. |
| 19 | 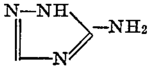 | 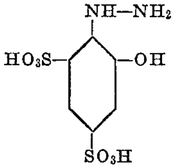 | do | Cu | 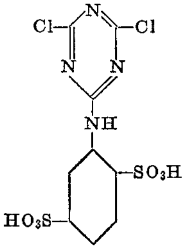 | Do. |
| 20 | 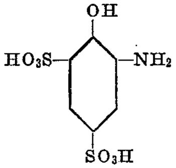 | 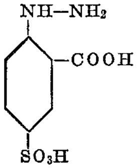 | 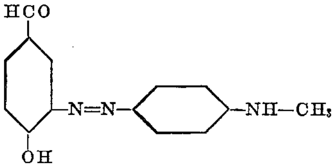 | Cu | 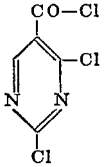 | Do. |
| 21 | 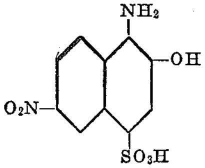 | Same as above | 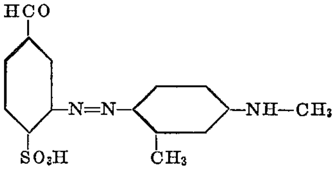 | Cu | 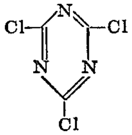 | Olive-green. |

TABLE 1—Continued
| Number | Diazo component | Hydrazone from— Hydrazine component | Aldehyde component | Complex-forming metal | Acylating agent | Shade on cellulose |
|---|---|---|---|---|---|---|
| 22 | 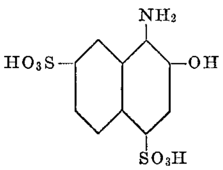 | 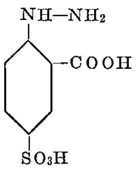 | 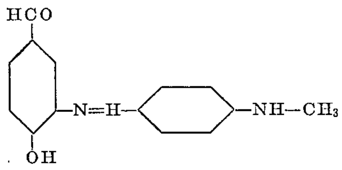 | Cu | 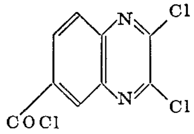 | Olive green. |
| 23 | 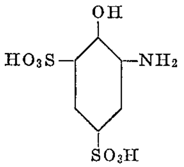 | Same as above | 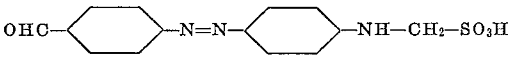 | Ni | 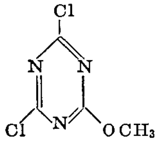 | Brown. |
| 24 | Same as above | 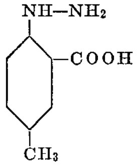 | 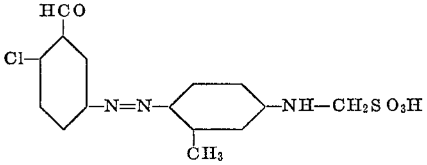 | Cp | 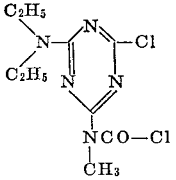 | Green. |
| 25 | 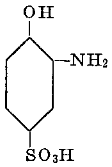 | 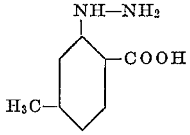 | 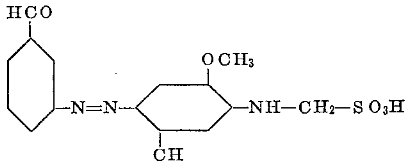 | Cr | 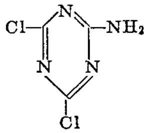 | Do. |
| 26 | Same as above | 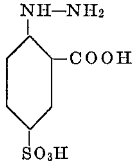 | 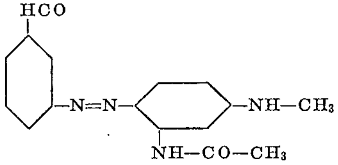 | Cu | $Cl-CO-CH_2Cl$ | Do. |
| 27 | 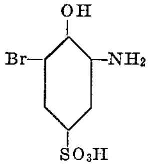 | Same as above | 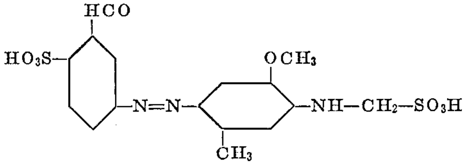 | Cu | 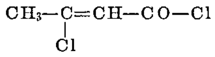 | Do. |

TABLE 1—Continued

| Number | Diazo component | Hydrazone from— Hydrazine component | Aldehyde component | Complex-forming metal | Acylating agent | Shade on cellulose |
|---|---|---|---|---|---|---|
| 28 | 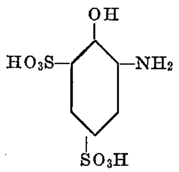 | 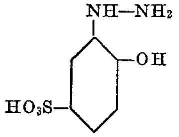 | 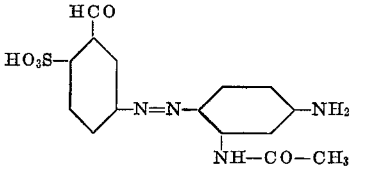 | Cu | 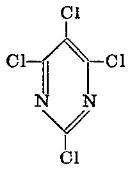 | Green. |
| 29 | 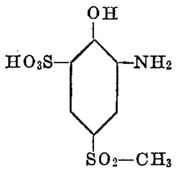 | 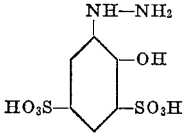 | 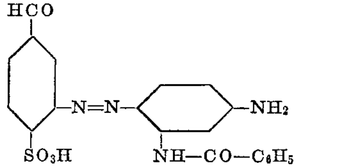 | Cu | 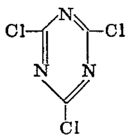 | Do. |
| 30 | 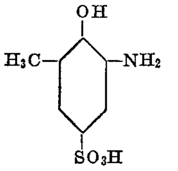 | 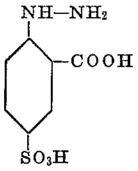 | 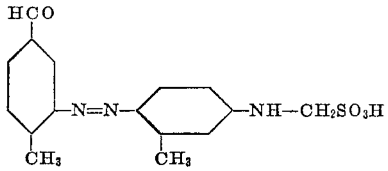 | Cu | 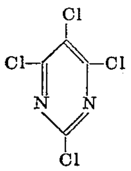 | Do. |

EXAMPLE 31

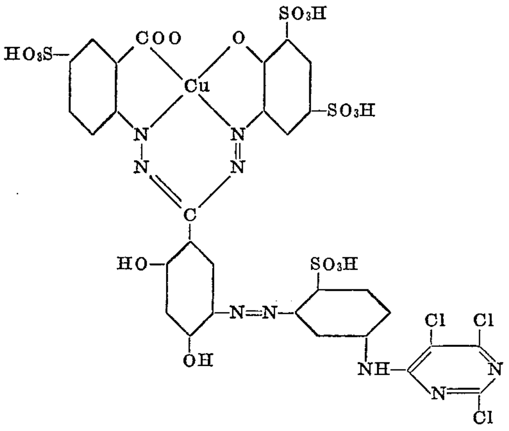

35.2 g. of the arylhydrazone obtained by condensation of 2-carboxyphenyl hydrazine-4-sulphonic acid with 2,4-dihydroxy-benzaldehyde are dissolved in 650 ml. of water. The diazo solution obtained by diazotisation of 23.0 g. of 1-amino-3-acetylaminobenzene-6-sulphonic acid is poured within 1 hour into this solution at 0–5°, the pH being kept at 6–7 by the addition of aqueous sodium carbonate solution. After stirring for 1 hour at 0–5°, the coupling is complete. The diazo solution obtained by diazotisation of 26.9 g. of 1-amino-2-hydroxybenzene-3,5-disulphonic acid, and also 100 ml. of a 1 molar aqueous copper sulphate solution are poured into the solution of the azo dyestuff obtained, the addition being made within 1 hour and the pH being kept at 5.5–6.5 by the addition of an aqueous sodium carbonate solution. As soon as the coupling is complete, the copper complex dyestuff is precipitated with sodium chloride, filtered off and washed with sodium chloride solution. The filter residue is added to 500 ml. of a 10% aqueous sodium hydroxide solution and the mixture is stirred for 5 hours at 90–100°. The pH of the solution is then adjusted to 6.0 with hydrochloric acid, 21.8 g. of tetrachloropyrimidine are added to this solution at 50–60° and the temperature is kept at 60–65° and the pH is maintained at 6.0–6.5 by the addition of 20% sodium carbonate solution, until no more free amino groups can be traced. The reactive dyestuff of the above formula is precipitated with potassium chloride, filtered off, washed with potassium chloride solution and dried in vacuo at 80°. It is a black powder which dissolves in water with a dark blue colour. It dyes cellulose fibres in blue-grey shades which, after soaping for 10 minutes, have very good wet and light fastness properties.

The dyestuff of the above formula is also obtained as follows: 37.9 g. of the monoazo dyestuff produced by coupling diazotised 1-amino-3-acetylaminobenzene-6-sulphonic acid with 2,4-dihydroxy-benzaldehyde, are slurried in 800 ml. of water. After adding 34.4 g. of 2-hydrazino-5-sulphobenzoic acid, the reaction mixture is stirred for another 12 hours at 40–45° at a pH of 4.5–5.5. The hydrazone so produced is reacted as described above with diazotised 1-amino-2-hydroxybenzene-3,5-disulphonic acid and copper sulphate to form the copper complex dyestuff which is then saponified also as described above and condensed with tetrachloropyrimidine.

Dyestuffs having similar properties are obtained if, instead of the components used in the example, equivalent amounts of the components given in the following Table 2 are used and otherwise the procedure described in the example is followed. The last column gives the shades of the dyeings obtained on cellulose fibres with the corresponding formazane azo dyestuffs.

TABLE 2

| Number | Hydrazone from— Hydrazine component | Hydrazone from— Aldehyde component | 1st diazo component | 2d diazo component | Complex-forming metal | Acylating agent | Shade on cellulose |
|---|---|---|---|---|---|---|---|
| 32 | 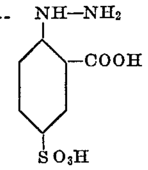 | 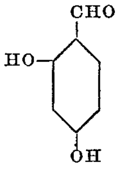 | 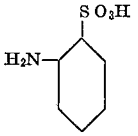 | 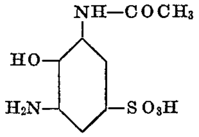 | Cu | 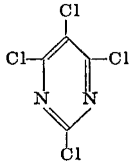 | Blueish grey. |
| 33 | Same as above | 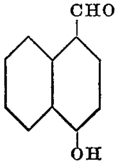 | 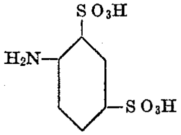 | Same as above | Cu | 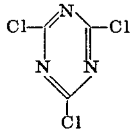 | Grey. |
| 34 | do | Same as above | 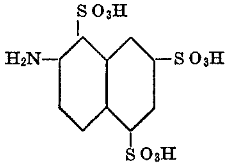 | do | Cu | 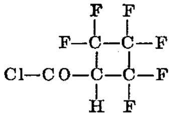 | Do. |
| 35 | do | do | 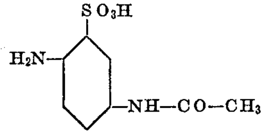 | 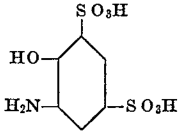 | Ni | 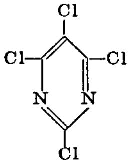 | Raisin. |
| 36 | do | 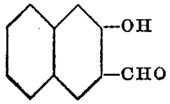 | 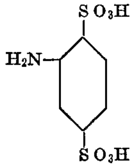 | 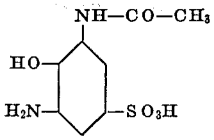 | Cu | 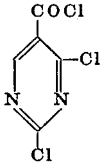 | Grey. |

TABLE 2—Continued
| | Hydrazone from— | | | | | | |
|---|---|---|---|---|---|---|---|
| | Hydrazine component | Aldehyde component | 1st diazo component | 2d diazo component | Complex-forming metal | Acylating agent | Shade on cellulose |
| Number: 37 | 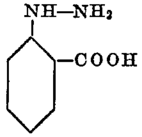 | 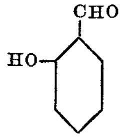 | 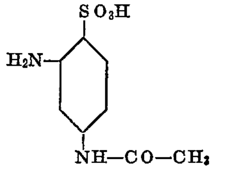 | 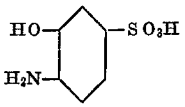 | Cu | 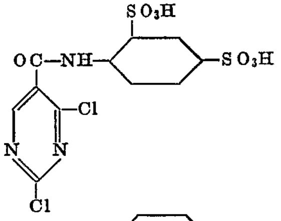 | Grey. |
| 38 | 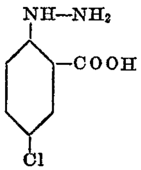 | Same as above |  | 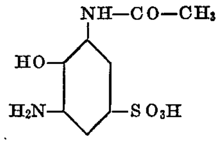 | Cu | 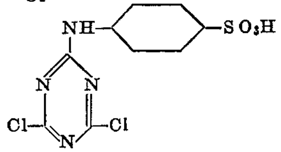 | Do. |
| 39 | 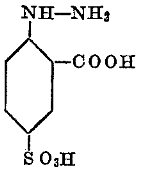 | 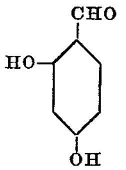 | 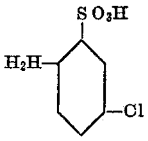 | Same as above | Cu | 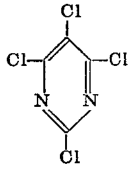 | Do. |
| 40 | Same as above | Same as above | 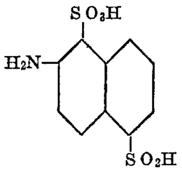 | do | Cu | 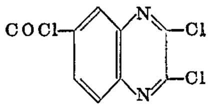 | Do. |
| 41 | do | do | 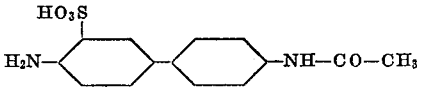 | 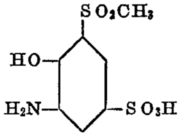 | Cu | 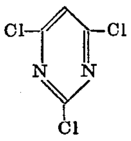 | Do. |

TABLE 2—Continued

| Number | Hydrazone from— Hydrazine component | Aldehyde component | 1st diazo component | 2d diazo component | Complex-forming metal | Acylating agent | Shade on cellulose |
|---|---|---|---|---|---|---|---|
| 42 | 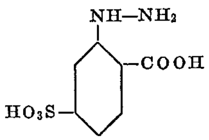 | 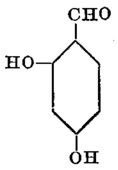 | 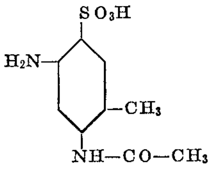 | 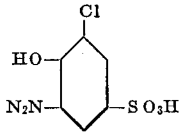 | Cu | 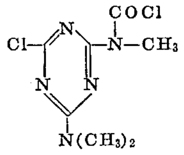 | Grey. |
| 43 | Same as above | 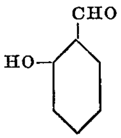 | 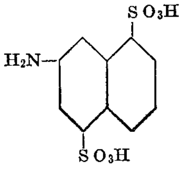 | 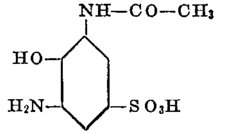 | Ni | 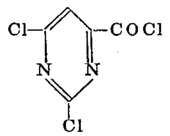 | Raisin. |
| 44 | do | Same as above | 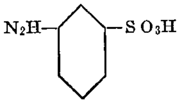 | Same as above | Cu | 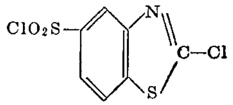 | Grey. |

EXAMPLE 45

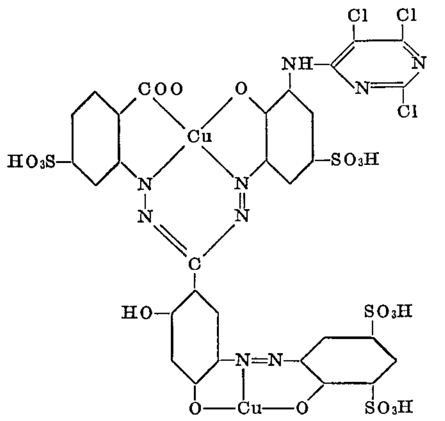

35.2 g. of the aryl hydrazone obtained by condensation of 2-carboxyphenyl hydrazine-5-sulphonic acid with 2,4-dihydroxy-benzaldehyde, are dissolved in 650 ml. of water. The diazo solution obtained by diazotisation of 26.9 g. of 1-amino-2-hydroxybenzene-3,5-disulphonic acid is poured within 1 hour into this solution at 0–5°. The pH of the solution is kept at 7.5–8.5 by the addition of 20% sodium carbonate solution. As soon as the coupling is complete, the azo dyestuff formed is precipitated by the addition of sodium chloride, filtered off and washed with sodium chloride. The filter residue is then added to 600 ml. of water. 200 ml. of a 1 molar aqueous copper sulphate solution are poured in, the pH being kept at 4.0–4.5 by the addition of sodium carbonate solution. After 30 minutes, the diazo solution obtained by diazotisation of 24.6 g. of 1-amino-2-hydroxy-3-acetylaminobenzene-5-sulphonic acid is poured into this mixture within half an hour at pH 5.5—6.5. On completion of the coupling, the azo formazane dyestuff formed is precipitated by the addition of sodium chloride and washed with sodium chloride solution. The filter residue is added to 300 ml. of a 7.5% aqueous sodium hydroxide solution and the solution obtained is stirred for 5 hours at 95–100°. After cooling to 60°, adjusting the pH of the solution to 6.0 with hydrochloric acid and adding 21.8 g. of tetrachloropyrimidine, the mixture is stirred at 60–65°, the pH being kept at 6.0–6.5 by the dropwise addition of 20% sodium carbonate solution. When no more free amino groups can be traced, the reactive dyestuff obtained of the above formula is precipitated by the addition of sodium chloride and dried at 80°. It is a black-brown powder. In the presence of acid binding agents, it dyes cellulose fibres in brown shades which, after soaping for 10 minutes, have very good wet and light fastness properties.

The dyestuff of the above formula is also obtained as follows:

30 g. of sodium acetate and 50 g. of copper sulphate are added to a solution of 63.2 g. of aryl hydrazone in 600 ml. of water. The aryl hydrazone is obtained by condensation of 2-carboxyphenyl hydrazine-5-sulphonic acid with 2,4-dihydroxy - 5 - (2′ - hydroxy - 3′,5′ - disulphophenylazo)-benzaldehyde. A diazo solution is prepared by diazotising 24.6 g. of 1 - amino - 2-hydroxy-3-acetylaminobenzene-5- sulphonic acid and the pH thereof is adjusted to 4.5 with aqueous sodium hydroxide. As soon as the aryl hydrazone, sodium acetate and copper sulphate mixture has completely dissolved, this diazo solution is added thereto at 15–20° within 15 minutes. The reaction mixture is stirred for 2 hours at 15–20° and pH 7.0. The dyestuff is then precipitated by the addition of potassium chloride and sodium chloride and filtered off. The saponification of the acetyl group and the condensation with tetrachloropyrimidine and isolation of the dyestuff of the above formula are performed as described above.

Dyestuffs having similar properties are obtained if, instead of the components used in the example, equivalent amounts of the components given in the following Table 3 are used and otherwise the procedure described in the example is followed. The last column of the table gives the shades obtained on cellulose fibres with the corresponding formazane azo dyestuffs.

TABLE 3

| | Hydrazone from— | | | | | | |
|---|---|---|---|---|---|---|---|
| | Hydrazine component | Aldehyde component | 1st diazo component | 2d diazo component | Complex-forming metal | Acylating agent | Shade on cellulose |
| Number: 46 | 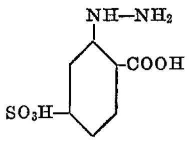 | 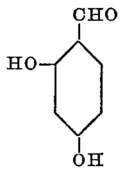 | 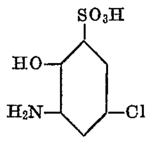 | 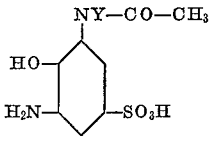 | Cu | 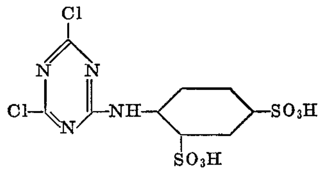 | Brown. |
| 47 | 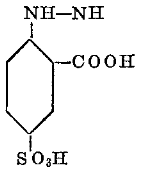 | 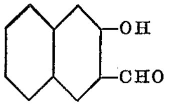 | 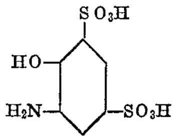 | Same as above | Cu | 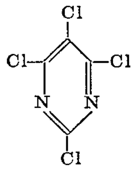 | Raisin. |
| 48 | 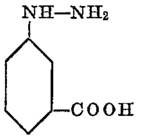 | 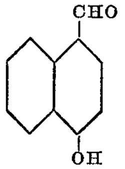 | Same as above | do | Cu | 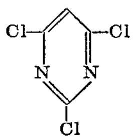 | Do. |
| 49 | 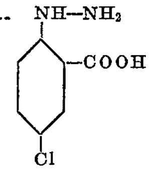 | 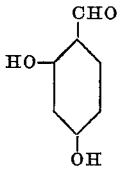 | 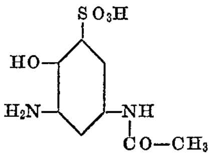 | 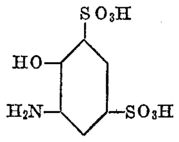 | Cu | 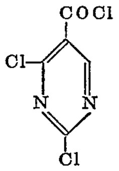 | Brown. |
| 50 | 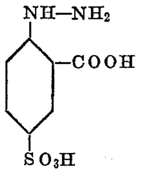 | Same as above | 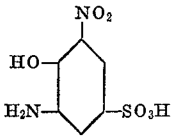 | 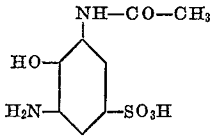 | Cu | 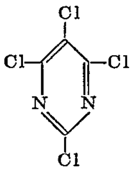 | Do. |

TABLE 3—Continued

| Number | Hydrazone from— Hydrazine component | Aldehyde component | 1st diazo component | 2d diazo component | Complex-forming metal | Acylating agent | Shade on cellulose |
|---|---|---|---|---|---|---|---|
| 51 | 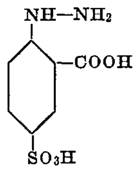 | 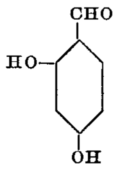 | 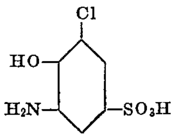 | 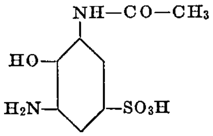 | Cu | 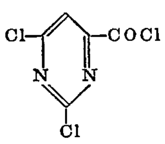 | Brown. |
| 52 | Same as above | Same as above | 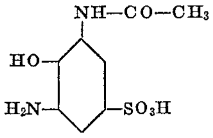 | 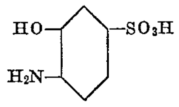 | Cu | 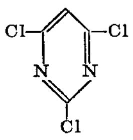 | Do. |
| 53 | do | do | Same as above | 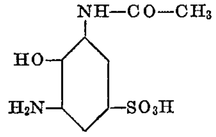 | Cu | 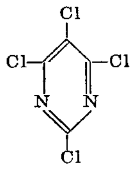 | Do. |

EXAMPLE 54

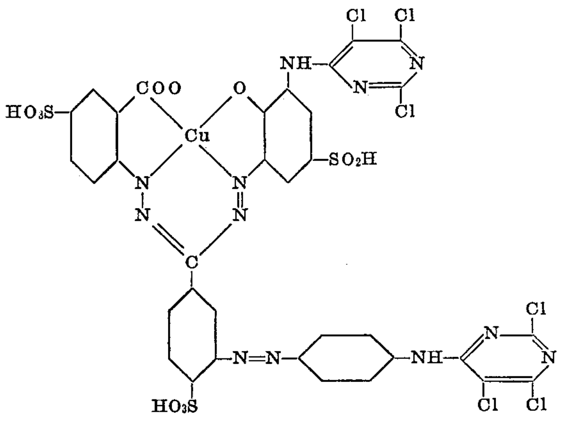

61.3 g. of the aryl hydrazone obtained by condensation of 2-carboxy-4-sulphophenyl hydrazine with 3'-formyl-6'-sulphoazo-benzene-4-aminomethane sulphonic acid, are dissolved with a neutral reaction in 500 ml. of water and 30 g. of sodium bicarbonate are added. The diazo solution obtained by diazotisation of 26.9 g. of 1-amino-2-hydroxybenzene-3-acetylamino-5-sulphonic acid, and also 100 ml. of a 1-molar aqueous copper sulphate solution are poured into this solution within 1 hour at 20–25°. As soon as the coupling is complete, the temperature is raised to 90–95° and a concentrated aqueous sodium hydroxide solution is added to the solution of the copper complex dyestuff formed until the concentration in the lye is 5%. To saponify the acrylamino groups, the mixture is stirred for 3 hours at 90–95° whereupon the diaminoformazane azo dyestuff formed is precipitated by the addition of sodium chloride, filtered off and washed with sodium chloride solution. The filter residue is then dissolved in 500 ml. of 60–65° hot water and 43.6 g. of tetrachloropyrimidine are added. The reaction mixture is stirred for 4–8 hours at 60–65°, the pH being kept at 6.5–7.0 by the addition of a 20% sodium carbonate solution. The reactive dyestuff obtained of the above formula is precipitated with sodium chloride, filtered off, washed with sodium chloride solution and dried in vacuo at 80°.

It is a black powder which dissolves in water with a dark green colour. It dyes cotton and regenerated cellulose fibres from a long liquor in the presence of sodium carbonate as acid binding agent in dark green shades. After a 10 minute treatment with a hot soap solution, the green dyeings are very fast to wet and light.

Dyestuffs having similar properties are obtained if, instead of the diazo component used in the example, equivalent amounts of one of the diazo compounds given in column II of the following Table 4 is used, and if, instead of the aryl hydrazone used, equivalent amounts of one of the hydrazones given in columns III and IV of the following table are used and, if instead of the metal complex-forming or acylating agent, the components given in columns V or VI are used and otherwise the procedure given in the example is followed. Column VII shows the colour of the dyeings obtained on cellulose fibres with the corresponding formazane azo dyestuffs.

TABLE 4
| Number | Diazo component | Hydrazone from— Hydrazine component | Hydrazone from— Aldehyde component | Complex-forming metal | Acylating agent | Shade on cellulose |
|---|---|---|---|---|---|---|
| 55 | 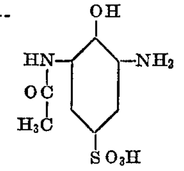 | 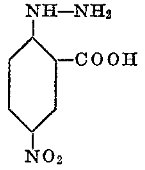 | 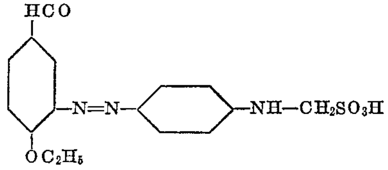 | Cu | 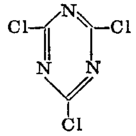 | Green. |
| 56 | 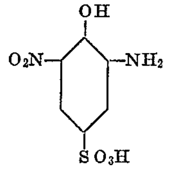 | 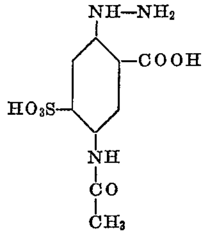 | 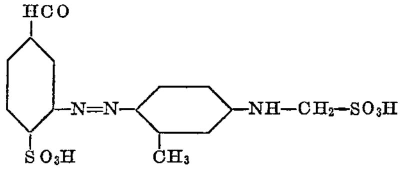 | Cu | 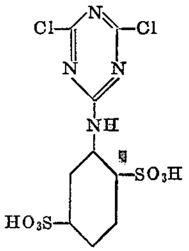 | Do. |
| 57 | 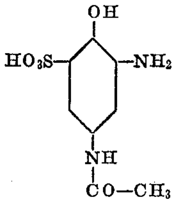 | 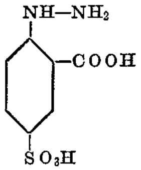 | 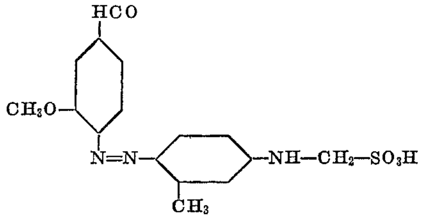 | Cu | 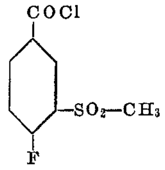 | Do. |
| 58 | 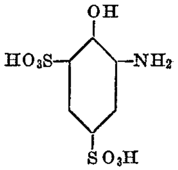 | 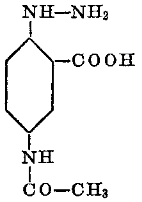 | 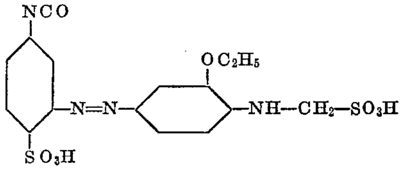 | Cu | 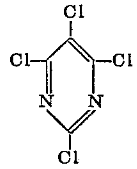 | Do. |
| 59 | 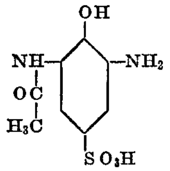 | 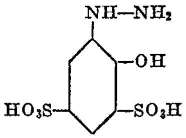 | 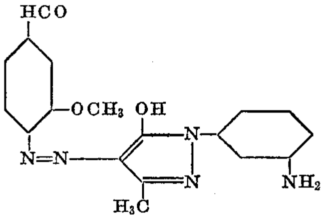 | Cu | 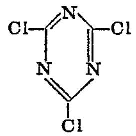 | Olive green. |

EXAMPLE 60

25.5 g. of the hydrazone obtained by condensation of 2-carboxyphenyl hydrazine and 3-aminobenzaldehyde are dissolved in 400 ml. of water with a neutral reaction and the solution is diazotised at 0–5° with 50 ml. of a 10 N hydrochloric acid and 50 ml. of 2 N sodium nitrite solution. The diazo suspension is stirred for 1 hour at 0–5° whereupon the pH is adjusted to 5.0 to 6.0 by the addition of sodium carbonate. 33.4 g. of 1-phenyl-3-methylpyrazol-(5)-one-2',5'-disulphonic acid are sprinkled into this suspension within 1 hour. As soon as no more diazonium compound can be traced, the coupling product obtained is precipitated with sodium chloride, filtered off, the residue is again dissolved in 600 ml. of 20–25° cool water and 30 g. of sodium bicarbonate are added. The diazo suspension obtained by diazotisation of 38.6 g. of 1-amino-2-hydroxy-3-(2',4',5'-trichloropyrimidyl - 6' - amino) - benzene-5-sulphonic acid and also 100 ml. of a 1-molar aqueous copper sulphate solution are then added within 1 hour. After stirring for 2 hours, the coupling is complete whereupon the reactive dyestuff formed is precipitated with sodium chloride, filtered off and washed with sodium chloride solution. After drying in vacuo at 80°, it is a dark powder which dissolves in water with a dark green colour. It is identical to the dyestuff obtained according to Example 79.

If cotton is pad dyed with a solution consisting of 20 g. of the above dyestuff, 20 g. of sodium carbonate, 200 g. of urea and 1000 ml. of water, dried and then given a dry heat treatment at 140° for 5 minutes, then a deep, olive green dyeing is obtained which, after soaping, is very wet and light fast.

EXAMPLE 61

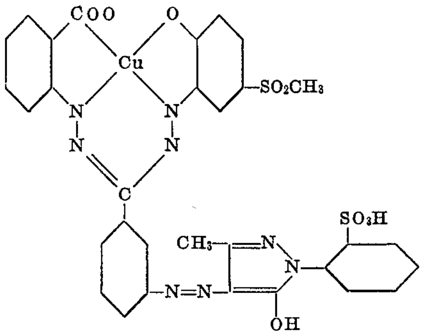

52.0 g. of the hydrazone obtained by condensation of 2-carboxyphenyl hydrazine and 4-(3''-formylphenylazo)-1-phenyl-3-methyl pyrazol-(5)-one-2'-sulphonic acid are dissolved with a neutral reaction in 500 ml. of water of 20–25° and 30 g. of sodium bicarbonate are added. The diazo suspension obtained with 18.7 g. of 1-amino-2-hydroxybenzene-5-methylsulphone and also 100 ml. of a 1-molar aqueous copper sulphate solution are then added dropwise within 1 hour. As soon as the coupling is complete, the pH of the reaction mixture is adjusted to 10–11 by the dropwise addition of aqueous sodium hydroxide and the whole is stirred for 5 hours. The dyestuff formed of the above formula is precipitated by the addition of sodium chloride and dried in vacuo at 80–85°. It is a black powder which dissolves in water with a dark green colour. It dyes wool from a weakly acid bath in pure green shades which have very good wet and light fastness properties.

Dyestuffs having similar properties are obtained if, instead of the hydrazone used in the example, equivalent amounts of one of the hydrazones given in Columns III and IV of the following Table 5 are used and, instead of the diazo component or metallising agent used, equivalent amounts of the components given in Columns II or V respectively are used and otherwise the procedure given in the example is followed. The shades of the dyeings on wool or cotton of the corresponding formazane azo dyestuffs are given in Column VI.

TABLE 5

| | | Hydrazone from— | | | |
|---|---|---|---|---|---|
| Number: | Diazo component | Hydrazine component | Aldehyde component | Complex-forming metal | Shade on wool |
| 62 | 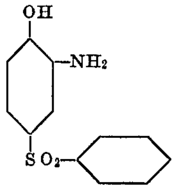 | 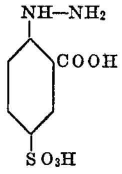 | 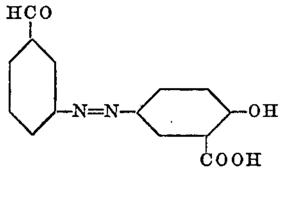 | Cu | Green. |
| 63 | 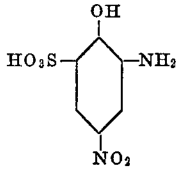 | 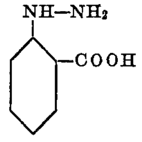 | 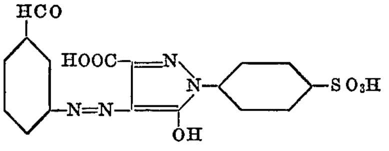 | Ni | Brown. |
| 64 | 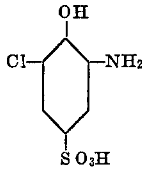 | Same as above | 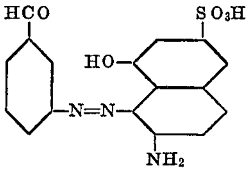 | Cu | Black violet. |

TABLE 5—Continued
| Number | Diazo component | Hydrazone from— Hydrazine component | Hydrazone from— Adehyde coponent | Complex-forming metal | Shade on wool |
|---|---|---|---|---|---|
| 65 | 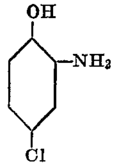 | 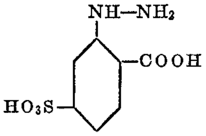 | 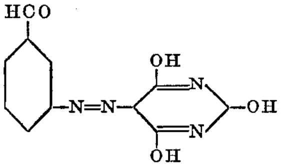 | Co | Green. |
| 66 | 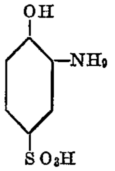 | 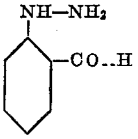 | 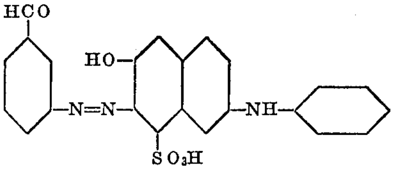 | Cr | Olive green. |
| 67 | 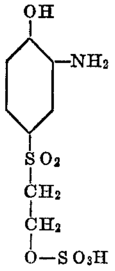 | 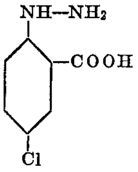 | 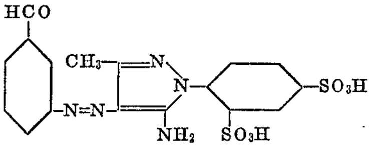 | Cu | Olive green on cotton. |
| 68 | 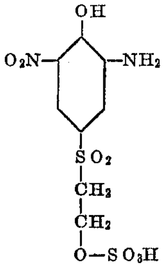 | Same as above | Same as above | Cu | Do. |
| 69 | 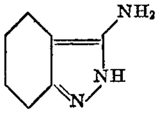 | 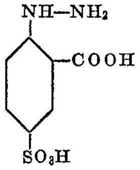 | do | Cu | Olive green. |
| 70 | 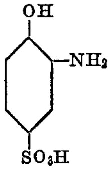 | Same as above | 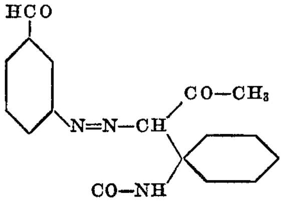 | | |
| 71 | Same as above | do | 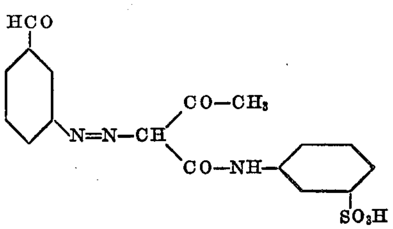 | Cu | Do. |
| | | | | Cu | Do |
| 72 | 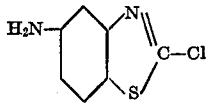 | do | 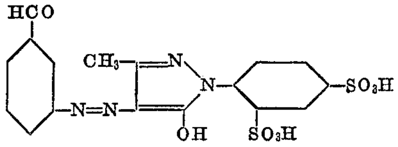 | Cu | Olive green on cotton. |

TABLE 5—Continued

| Number | Diazo component | Hydrazone from— Hydrazine component | Aldehyde component | Complex-forming metal | Shade on wool |
|---|---|---|---|---|---|
| 73 | 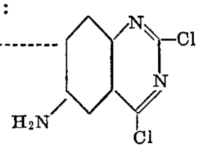 | Same as above | Same as above | Cu | Olive green on cotton. |
| 74 | 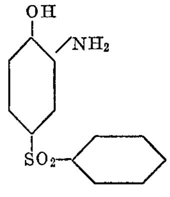 | 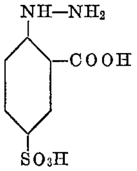 | 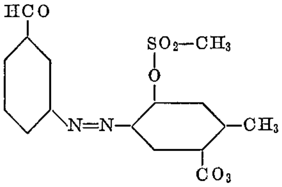 | Cu | Green. |
| 75 | 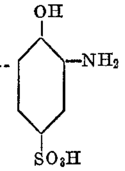 | Same as above | 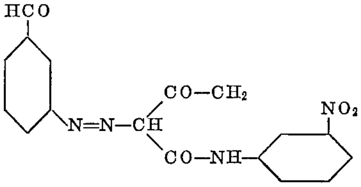 | Cu | Do |
| 76 | Same as above | 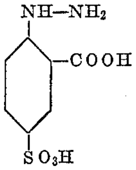 | 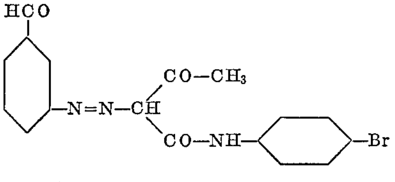 | Cu | Do. |
| 77 | 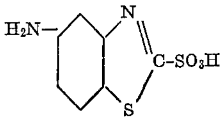 | Same as above | 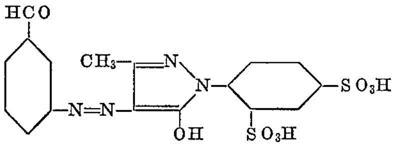 | Cu | Olive green on cotton. |
| 78 | 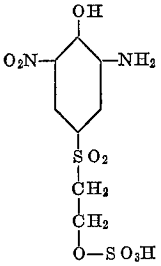 | do | 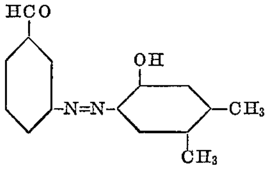 | Cu | Do. |

EXAMPLE 79

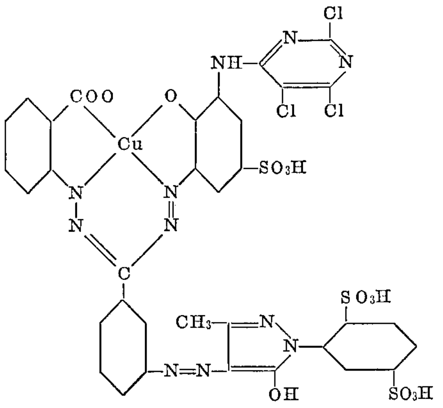

25.5 g. of the aryl hydrazone obtained by condensation of 2-carboxyphenyl hydrazine with 3-aminobenzaldehyde are slurried in 400 ml. of water and 30 g. of sodium bicarbonate are added. The diazo solution obtained by diazotisation of 24.6 g. of 1-amino-2-hydroxy-3-acetylaminobenzene-5-sulphonic acid and also 100 ml. of a 1-molar aqueous copper sulphate solution are poured into this mixture within 1 hour. As soon as the coupling is complete, the copper complex dyestuff obtained is precipitated with sodium chloride, filtered off and washed with sodium chloride solution. The filter residue is then dissolved in 500 ml. of water, 6.9 g. of sodium nitrite are added and, at 0–5°, added dropwise to a solution consisting of 25 ml. of 30% hydrochloric acid and 250 ml. of ice. After stirring the mixture for 1 hour at 0–5°, the diazotisation is complete. The pH of the reaction mixture is then adjusted to 4.5 by the dropwise addition of 20% sodium carbonate solution and the diazo suspension is added dropwise to a solution stirred at 20–25° of 33.4 g. of 1-phenyl-3-methyl-pyrazol-(5)-one-2',5'-disulphonic acid, 200 ml. of water and 20 g. of sodium carbonate. As soon as the coupling is complete, the temperature of the reaction mixture is raised to 95–98° and 5% of the volume of the solution of sodium hydroxide is added to the solution. The whole is stirred for 5 hours at 95–98° and then the dyestuff is precipitated by the addition of sodium chloride. After cooling while stirring at 20–25°, the dyestuff is filtered off, washed with sodium chloride solution and the residue is again dissolved in 500 ml. of 60–65° hot water. After the addition of 21.8 g. of tetrachloropyrimidine, the whole is stirred for 2 hours at 60–65°, the pH of the reaction mixture being kept at 6.0–6.5 by the dropwise addition of 20% sodium carbonate solution. As soon as no more free amino groups can be traced, the reactive dyestuff obtained of the above formula is precipitated with sodium chloride, filtered off, washed with sodium chloride solution and dried in vacuo at 80°. It is a black powder which dissolves in water with a dark green colour. It dyes cellulose fibres in the presence of an acid binding agent in dark olive green shades which, on being soaped for 10 minutes, are very fast to wet and light.

The same dyestuff is obtained when the formyl azo dyestuff, obtained by coupling diazotised 3-aminobenzaldehyde with 1-phenyl-3-methylpyrazol - (5) - one-2',5'-disulphonic acid, is condensed with 2-carboxyphenyl hydrazine, the hydrazone obtained according to Example 1 is coupled with the diazo compound of 1-amino-2-hydroxy-3-acetylaminobenzene - 5 - sulphonic acid in the presence of copper sulphate, then the acetylamino group is saponified and the aminoformazane azo dyestuff is reacted with tetrachloropyrimidine.

The same dyestuff is also obtained when, in the above example, instead of the 100 ml. of 1-molar aqueous copper sulphate solution, the same amount of a 1-molar aqueous magnesium sulphate sodium is used and then the magnesium complex of the aminoformazane dyestuff obtained is heated for 2 hours at 78 to 80° with 100 ml. of a 1-molar aqueous copper sulphate solution.

Dyestuffs having similar properties are obtained if, instead of the components used in the example, equivalent amounts of the components given in the following Table 6 are used and otherwise the procedure given in the example is followed. The last column shows the shade of the dyeings obtained on cellulose fibres with the corresponding formazane azo dyestuffs.

TABLE 6

| | | Hydrazone from— | | | | | |
|---|---|---|---|---|---|---|---|
| Number: | Diazo component | Hydrazine component | Aldehyde component | Coupling component | Complex-forming metal | Acylating agent | Shade on cellulose |
| 80 | 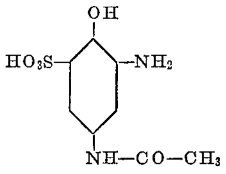 | 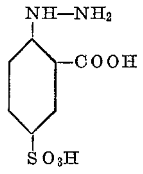 | 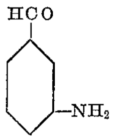 | 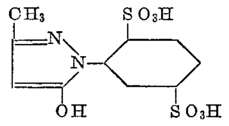 | Cu | 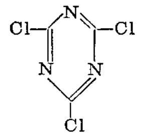 | Olive green. |
| 81 | 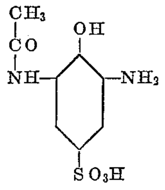 | Same as above | Same as above | Same as above | Cu | 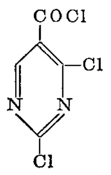 | Do. |
| 82 | Same as above | do | do | 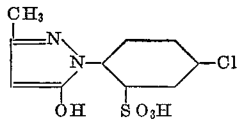 | Cu | 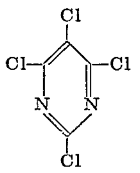 | Do. |
| 83 | do | 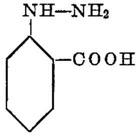 | do | 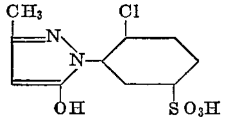 | Cu | 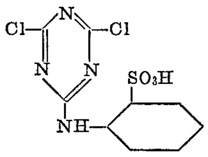 | Do. |

TABLE 6—Continued
| Number | Diazo component | Hydrazone from— Hydrazine component | Hydrazone from— Aldehyde component | Coupling component | Complex-forming metal | Acylating agent | Shade on cellulose |
|---|---|---|---|---|---|---|---|
| 84 | Same as above | 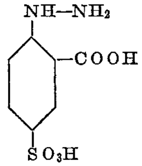 | Same as above | 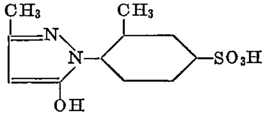 | Cu | 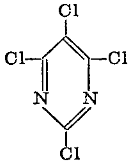 | Olive green. |
| 85 | do | 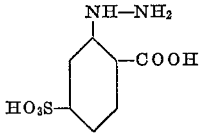 | do | 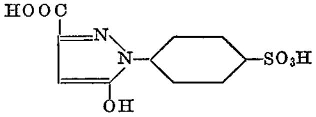 | Cu | 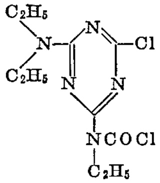 | Do. |
| 86 | 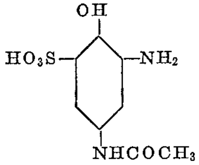 | 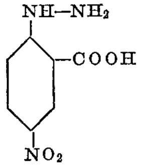 | do | 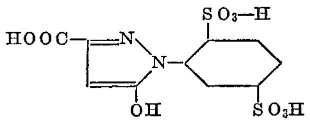 | Cu | 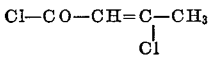 | Do. |
| 87 | Same as above | 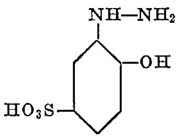 | do | Same as above | Cu | 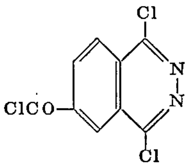 | Do. |
| 88 | 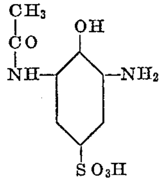 | 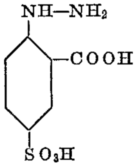 | 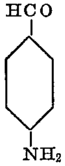 | 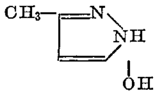 | Cu | 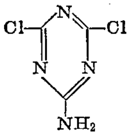 | Do. |
| 89 | 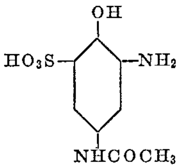 | Same as above | 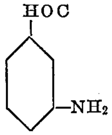 | 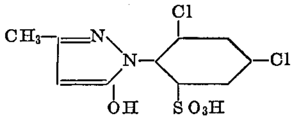 | Co | 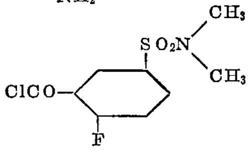 | Do. |

TABLE 6—Continued
| Number | Diazo component | Hydrazone from— Hydrazine component | Aldehyde component | Coupling component | Complex-forming metal | Acylating agent | Shade on cellulose |
|---|---|---|---|---|---|---|---|
| 90 | Same as above | 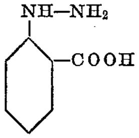 | 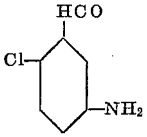 | 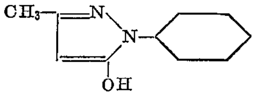 | Cu | Cl—CO—$CH_2$—$CH_2$—Cl | Olive green. |
| 91 | 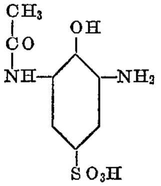 | 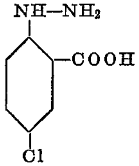 | Same as above | 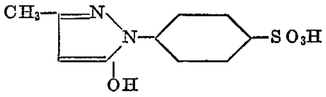 | Cu | 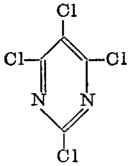 | Do. |
| 92 | Same as above | 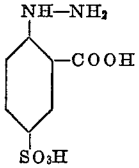 | 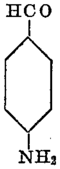 | 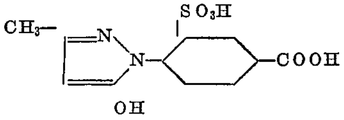 | Cu | Cl—CO—CH—$CH_2$ | Do. |
| 93 | do | Same as above | 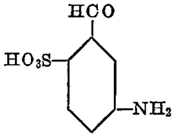 | 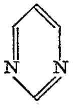 | Cu | 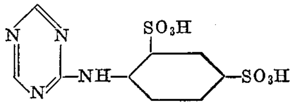 | Do. |
| 94 | do | do | 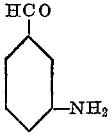 | 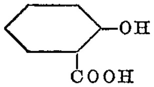 | Cu | 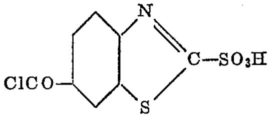 | Do. |
| 95 | do | 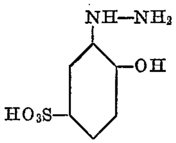 | Same as aaove | 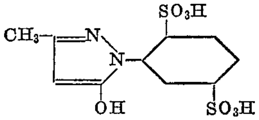 | Cu | 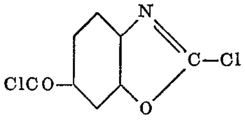 | Do. |
| 96 | 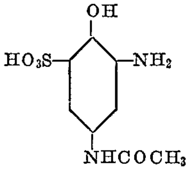 | 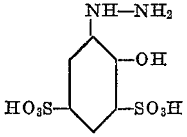 | do | Same as above | Cu | 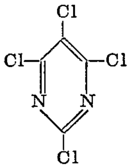 | Do. |

TABLE 6—Continued
| Number | Diazo component | Hydrazone from— Hydrazine component | Hydrazone from— Aldehyde component | Coupling component | Complex-forming metal | Acylating agent | Shade on cellulose |
|---|---|---|---|---|---|---|---|
| 97 | Same as above | 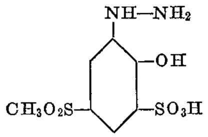 | Same as above | 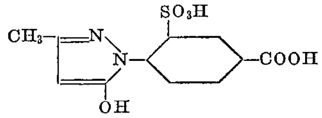 | Cu | 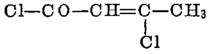 | Olive green. |
| 98 | 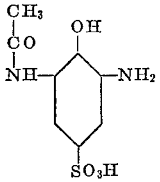 | 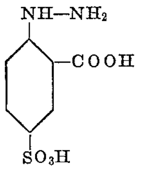 | do | 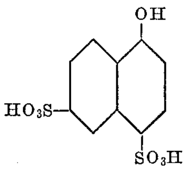 | Cu | 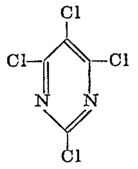 | Claret. |
| 99 | Same as above | Same as above | do | 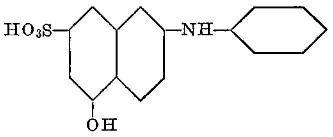 | Cu | 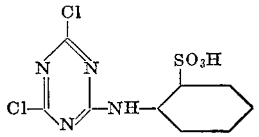 | Brown-violet. |
| 100 | 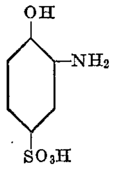 | do | do | 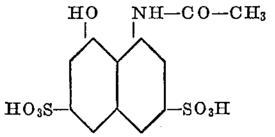 | Cu | 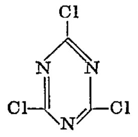 | Raisin. |
| 101 | 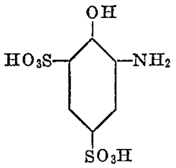 | do | do | 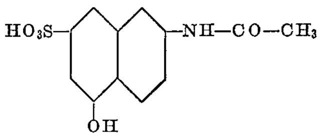 | Cu | 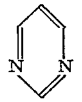 | Violet. |
| 102 | 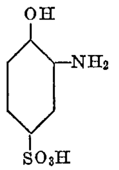 | 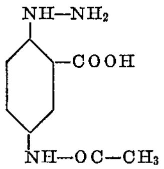 | do | 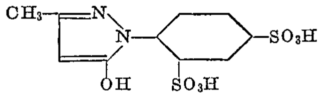 | Cu | 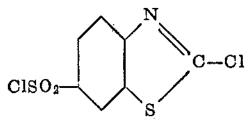 | Green. |

TABLE 6—Continued
| Number | Diazo component | Hydrazone from— Hydrazine component | Aldehyde component | Coupling component | Complex-forming metal | Acylating agent | Shade on cellulose |
|---|---|---|---|---|---|---|---|
| 103 | 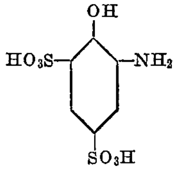 | Same as above | Same as above | 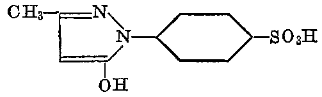 | Cu | 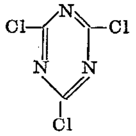 | Green. |
| 104 | Same as above | do | do | 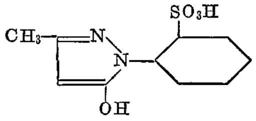 | Cu | 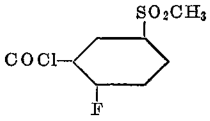 | Do. |
| 105 | 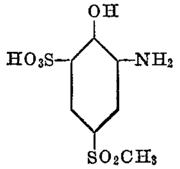 | do | do | 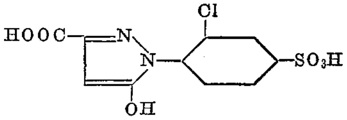 | Cu | 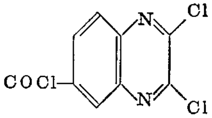 | Do. |
| 106 | 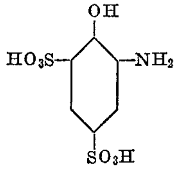 | do | do | 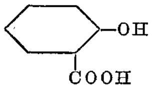 | Cu | 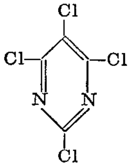 | Do. |
| 107 | Same as above | do | do | 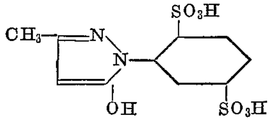 | Cu | 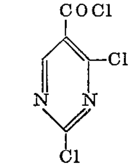 | Do. |
| 108 | do | do | 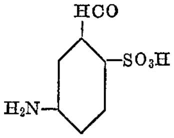 | Same as above | Cu | 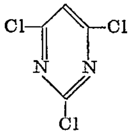 | Olive green. |

TABLE 6—Continued
| Number | Diazo component | Hydrazone from— Hydrazine component | Hydrazone from— Aldehyde component | Coupling component | Complex-forming metal | Acylating agent | Shade on cellulose |
|---|---|---|---|---|---|---|---|
| 109 | 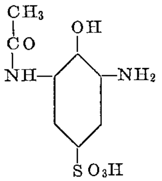 | 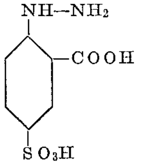 | 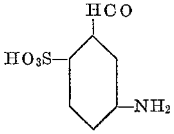 | 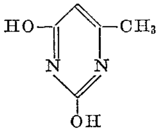 | Cu | 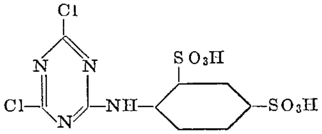 | Olive green. |
| 110 | Same as above | Same as above | 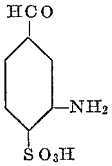 | 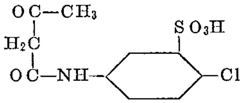 | Cu | 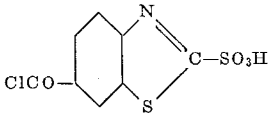 | Do. |
| 111 | do | 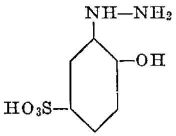 | Same as above | 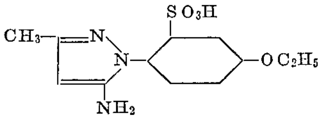 | Cu | 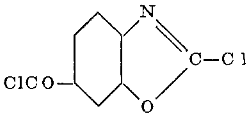 | Do. |
| 112 | do | 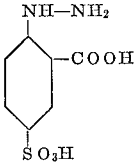 | 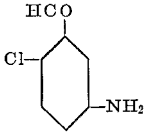 | 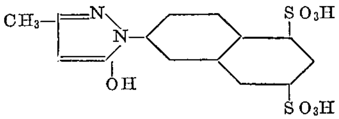 | Cu | Cl—CO—CH$_2$—CH$_2$—Cl | Do. |
| 113 | do | 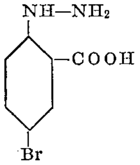 | Same as above | 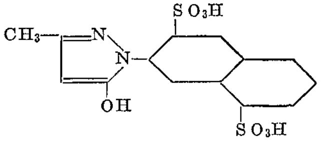 | Cu | 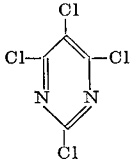 | Do. |
| 114 | 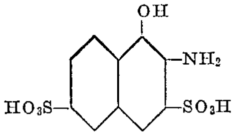 | 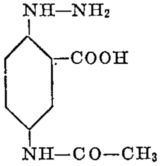 | do | 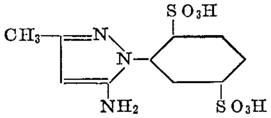 | Cu | 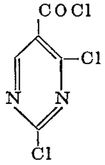 | Green. |

TABLE 6—Continued

| Number | Diazo component | Hydrazone from— Hydrazine component | Aldehyde component | Coupling component | Complex-forming metal | Acylating agent | Shade on cellulose |
|---|---|---|---|---|---|---|---|
| 115 | 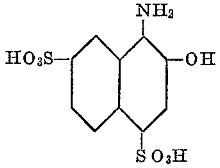 | Same as above | 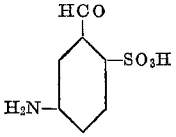 | Same as above | Cu | 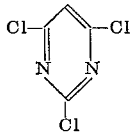 | Olive green. |

EXAMPLE 116

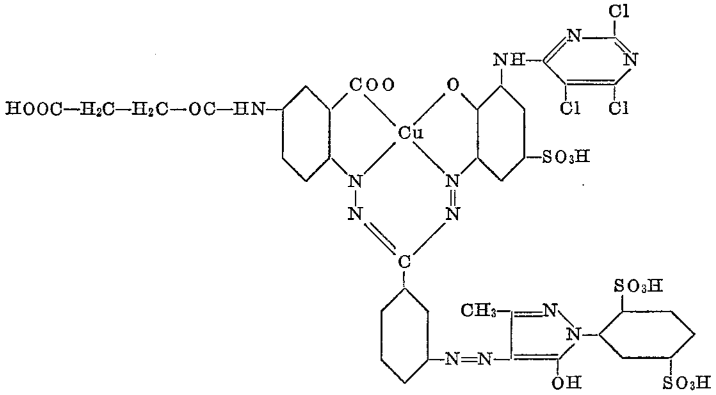

71.6 g. of the aryl hydrazone obtained by condensation of 2-carboxy-4-succinoylaminophenyl hydrazine with 4-(3''-formylphenylazo)-3-methylpyrazol - 5 - one - 1-phenyl-2',5'-disulphonic acid are slurried in 400 ml. of water and 30 g. of sodium bicarbonate are added. The diazo solution obtained by diazotisation of 24.6 g. of 1-amino-2-hydroxy-3-acetylaminobenzene-5-sulphonic acid and saponifying by the method described in "Friedlander" vol. 8, page 599, and also 100 ml. of a 1-molar aqueous copper sulphate solution are poured into this mixture within 1 hour. As soon as the coupling is complete, the copper complex dyestuff obtained is precipitated with sodium chloride, filtered off and washed with sodium chloride solution. The filter residue is then dissolved in 500 ml. of water. After the addition of 21.8 g. of tetrachloropyrimidine to the solution the whole is stirred for 2 hours at 60–65°, the pH of the reaction mixture being kept at 6.0–6.5 by the dropwise addition of 20% sodium carbonate solution. As soon as no more free amino groups can be traced, the reactive dyestuff obtained of the above formula is precipitated with sodium chloride, filtered off, washed with sodium chloride solution and dried in vacuo at 80°. It is a black powder which dissolves in water with a dark green colour. It dyes cellulose fibres in the presence of an acid binding agent in dark olive green shades which, on being soaped for 10 minutes, are very fast to wet and light.

Dyestuffs having similar properties are obtained if, instead of the components used in the example, equivalent amounts of the components given in the following Table 7 are used and otherwise the procedure given in the example is followed. The last column shows the shade of the dyeings obtained on cellulose fibres with the corresponding formazane azo dyestuffs.

TABLE 7

| Number | Diazo component | Hydrazone from— Hydrazine component | Aldehyde component | Coupling component | Complex-forming metal | Acylating agent | Shade on cellulose |
|---|---|---|---|---|---|---|---|
| 117 | 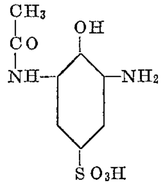 | 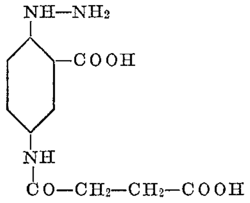 | 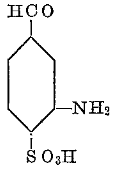 | 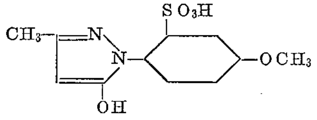 | Cu | 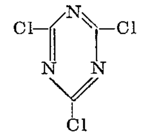 | Olive green. |

TABLE 7—Continued
| Number: | Diazo component | Hydrazone from— Hydrazine component | Hydrazone from— Aldehyde component | Coupling component | Complex-forming metal | Acylating agent | Shade on cellulose |
|---|---|---|---|---|---|---|---|
| 118 | Same as above | Same as above | Same as above | 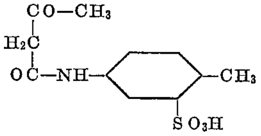 | Cu | 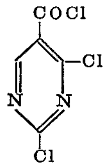 | Olive green. |
| 119 | do | do | 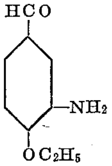 | 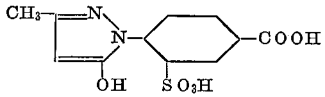 | Cu | 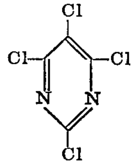 | Do. |
| 120 | do | 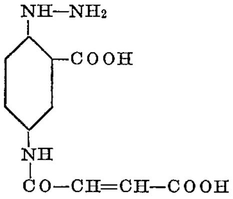 | 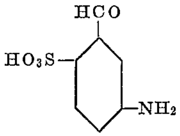 | 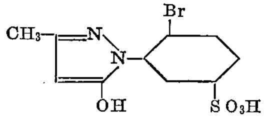 | Cu | 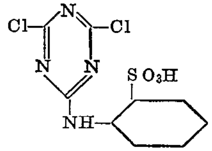 | Do. |
| 121 | do | Same as above | Same as above | 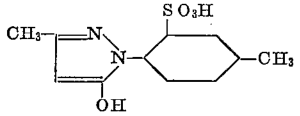 | Cu | 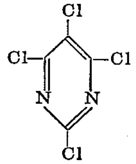 | Do. |
| 122 | do | 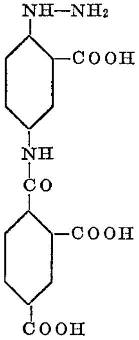 | 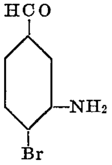 | 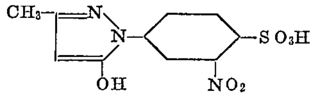 | Cu | 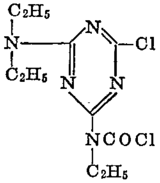 | Do. |

TABLE 7—Continued
| Number | Diazo component | Hydrazone from—Hydrazine component | Hydrazone from—Aldehyde component | Coupling component | Complex-forming metal | Acylating agent | Shade on cellulose |
|---|---|---|---|---|---|---|---|
| 123 | Same as above | 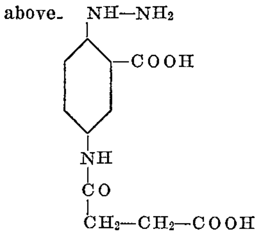 | 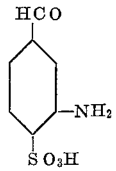 | 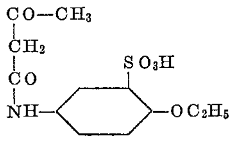 | Cu | 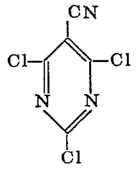 | Green. |
| 124 | do | Same as above | Same as above | 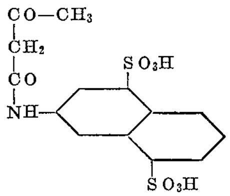 | Cu | 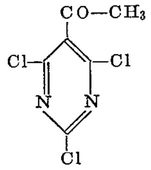 | Do. |
| 125 | do | 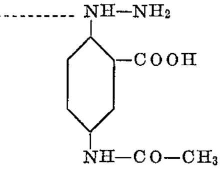 | do | 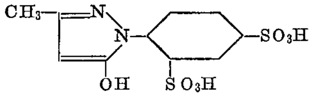 | Cu | 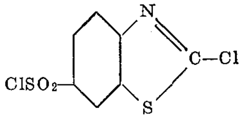 | Do. |
| 126 | do | 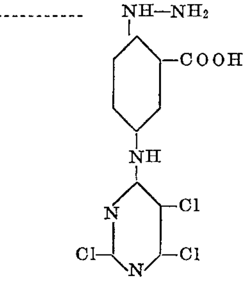 | do | 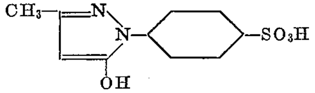 | Cu | 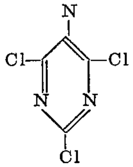 | Do. |
| 127 | do | Same as above | 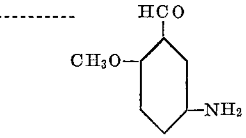 | 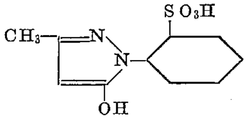 | Cu | 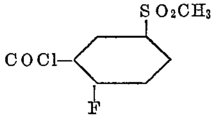 | Do. |

EXAMPLE 128

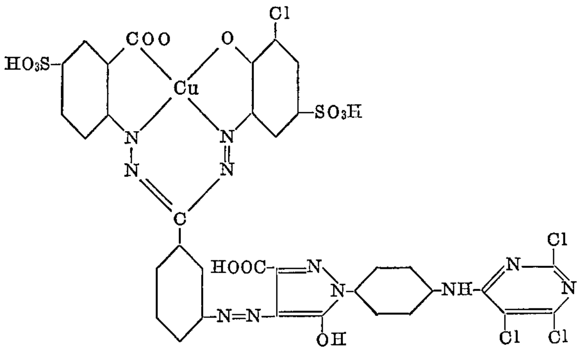

33.5 g. of the hydrazone obtained by condensation of 2-carboxy-4-sulphophenyl hydrazine and 3-aminobenzaldehyde are dissolved with a neutral reaction in 500 ml. of water and 40 g. of sodium acetate are added to the solution. 100 ml. of a 1-molar aqueous copper sulphate solution and also the diazo solution obtained by diazotisation of 22.4 g. of 1-amino-2-hydroxy-3-chlorobenzene-5-sulphonic acid are slowly poured into this solution simultaneously. As soon as the coupling is complete, 6.9 g. of sodium nitrite are added to the reaction mixture which is then added dropwise within one hour to a solution consisting of 25 ml. of hydrochloric acid and 200 g. of ice. After stirring for 1 hour at 0–5°, the diazotisation is complete. The pH of the diazo suspension is then adjusted to 4.5 by the dropwise addition of 20% sodium carbonate solution and, at 20–25°, it is added dropwise to a solution consisting of 24.9 g. of 1-(4'-nitrophenyl)-pyrazol-(5)-one-3-carboxylic acid and 20 g. of sodium carbonate in 200 ml. of water. On completion of the coupling the temperature of the reaction mixture is adjusted to 40–45° and the pH of the solution to 9.0 to 9.5 with concentrated aqueous sodium hydroxide solution, whereupon 19.5 g. of anhydrous sodium sulphide are added and the whole is stirred for 2 hours, i.e. until completion of the reduction, at 40–45°. In order to re-form the complex dyestuff which has become demetallised during the reduction, 100 ml. of 1-molar copper sulphate solution are added dropwise and the mixture is stirred for another 18 hours at 40–45°. The aminoformazane azo dyestuff formed is precipitated by the addition of sodium chloride, filtered off, washed with sodium chloride solution and the filter residue is dissolved with a neutral reaction in 500 ml. of 60–65° hot water. 21.8 g. of tetrachloropyrimidine are added and the whole is stirred for 2 hours at 60–65°, the pH of the reaction mixture being kept at 6.5–7.0 by the addition of aqueous sodium carbonate. The reactive dyestuff formed of the above formula is precipitated with sodium chloride, filtered off and dried in vacuo at 80°. It is a dark powder which dissolves in water with a dark green colour. It dyes cellulose fibres in the presence of an acid binding agent in dark olive shades which, after soaping, are very fast to wet and light.

The same dyestuff is obtained if, in the above example, instead of 1-(4'-nitrophenyl)-pyrazol - (5) - one-3-carboxylic acid the equivalent amount of 1-(4'-aminophenyl)-pyrazol - (5) - one-3-carboxylic acid is used and the amino formazane azo dyestuff so obtained is condensed direct with tetrachloropyrimidine.

Dyestuffs having similar properties are obtained if, instead of the components used in the example, equivalent amounts of the components given in the following Table 8 are used and otherwise the procedure given in the example is followed. The shades of the dyeings obtained on cellulose with the corresponding formazane azo dyestuffs are given in the last column.

TABLE 8

| Number | Diazo component | Hydrazone from— Hydrazine component | Hydrazone from— Aldehyde component | Coupling component | Complex-forming metal | Acylating agent | Shade on cellulose |
|---|---|---|---|---|---|---|---|
| 129 | 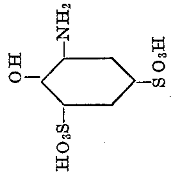 | 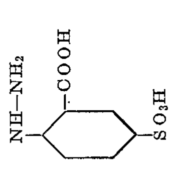 | 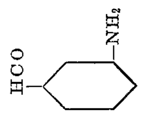 | 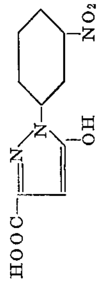 | Cu | 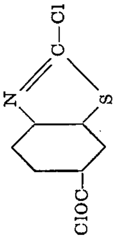 | Olive green. |
| 130 | Same as above | Same as above | 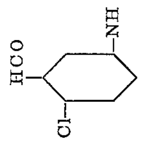 | Same as above | Cu | 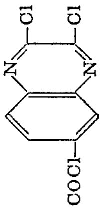 | Do. |
| 131 | 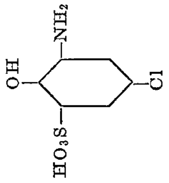 | 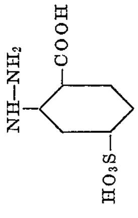 | 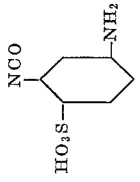 | 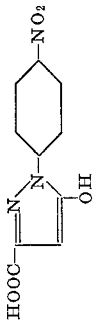 | Cu | 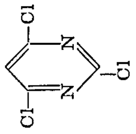 | Do. |

TABLE 8—Continued
| Number | Hydrazone from— Diazo component | Hydrazine component | Aldehyde component | Coupling component | Complex-forming metal | Acylating agent | Shade on cellulose |
|---|---|---|---|---|---|---|---|
| 132 | 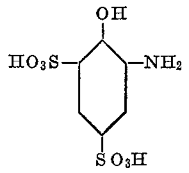 | 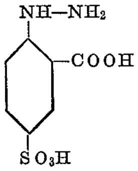 | 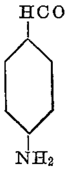 | 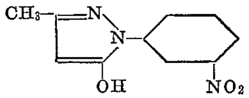 | Cu | 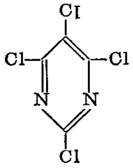 | Olive green. |
| 133 | Same as above | Same as above | Same as above | Same as above | Cu | 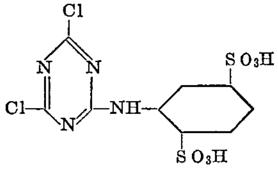 | Do. |
| 134 | do | do | 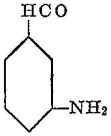 | 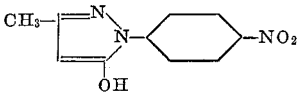 | Ni | 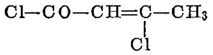 | Brown. |
| 135 | do | do | Same as above | Same as above | Cu | 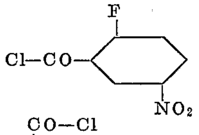 | Olive green. |
| 136 | do | do | do | 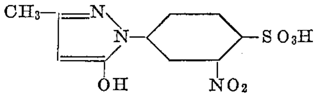 | Cu | 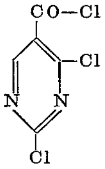 | Do. |
| 137 | do | 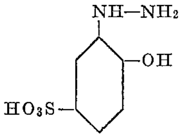 | do | 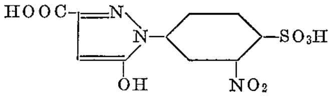 | Cu | Same as above | Do. |

TABLE 8—Continued
| Number: | Diazo component | Hydrazone from— Hydrazine component | Hydrazone from— Aldehyde component | Coupling component | Complex-forming metal | Acylating agent | Shade on cellulose |
|---|---|---|---|---|---|---|---|
| 138 | 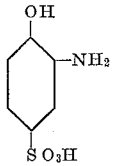 | 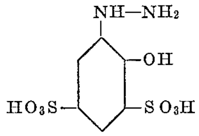 | Same as above | 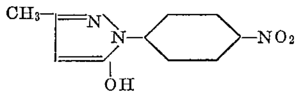 | Cu | 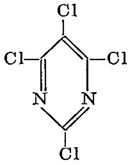 | Olive green. |
| 139 | 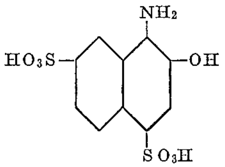 | 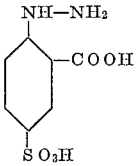 | 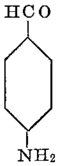 | 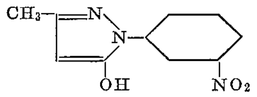 | Cu | 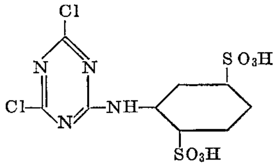 | Do. |
| 140 | 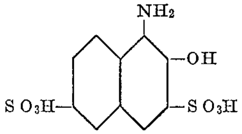 | Same as above | 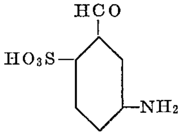 | 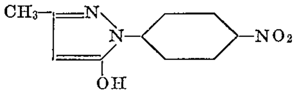 | Ni | 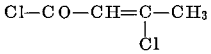 | Brown. |
| 141 | 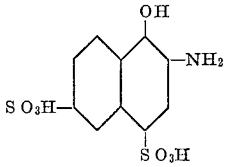 | do | 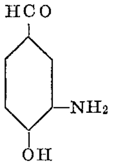 | Same as above | Cu | 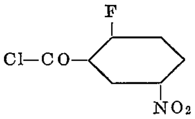 | Olive green. |
| 142 | 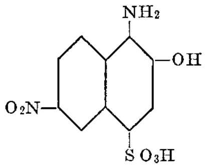 | do | 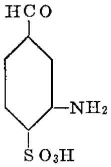 | 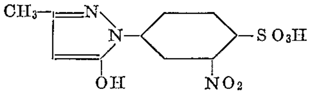 | Cu | 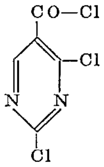 | Do. |

EXAMPLE 143

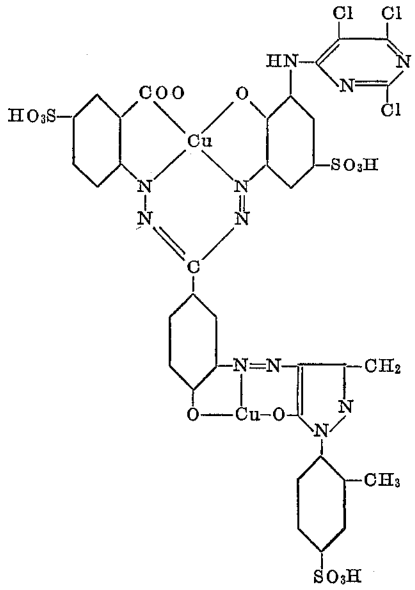

104 g. of the dyestuff obtained according to Example 84 are dissolved in 1500 ml. of water and, at 20–25°, 100 ml. of a 25% copper sulphate solution and 80 ml. of a 30% hydrogen peroxide solution are added, during which addition the pH is kept at 5 to 6 by the addition of sodium carbonate solution. As soon as no more starting dyestuff can be traced, the reactive dyestuff obtained of the above formula is precipitated by the addition of sodium chloride, filtered off, washed with a sodium chloride solution and dried in vacuo at 80°. It is a black powder which dissolves in water with a dark brown colour and, in the presence of acid binding agents, it dyes cellulose fibres in dark brown shades.

The dyestuff of the above formula is also obtained when, instead of a compound having the reactive radical in Formula 84, one is used which contains an acetyl group. The oxidative coppering is performed as described above, then the acetyl group is saponified under alkaline conditions and the free amino group is condensed with 2,4,5,6-tetrachloropyrimidine.

Instead of hydrogen peroxide also equivalent amounts of the salts of peroxy acids are used such as $Na_2S_2O_8$, $NaBO_3$ or $Na_2O_2$.

Other dyestuffs having similar properties are obtained on reacting the dyestuffs of Examples 60, 61, 63, 66, 72, 79 to 108 and 128 to 138 according to the process described above.

EXAMPLE 144

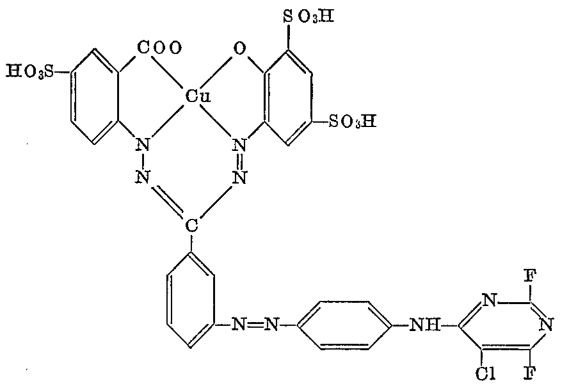

53.3 g. of the arylhydrazone, obtained by condensation of 2-carboxy-phenylhydrazine-4-sulphonic acid with 3'-formylazobenzene-4-amino - methane-sulphonic acid, are dissolved neutral in 500 ml. of water, and admixed with 30 g. of sodium bicarbonate. To this solution, the diazonium salt solution, obtained by diazotation of 26.9 g. of 1 - amino - 2 - hydroxybenzene - 3,5-disulphonic acid, together with 100 ml. of a one-molar aqueous copper sulphate solution, is allowed to flow in within one hour at 20–25°. As soon as the coupling is completed, the temperature is increased to 50–55°, and the solution of the copper-complex dye formed is admixed with a sufficient quantity of a concentrated aqueous sodium hydroxide solution to furnish an alkali-liquor concentration of 5%. Thereafter the mixture is stirred over 3 hours at 50–55° to saponify the amminomethanesulphonic acid group. Following to this, the aminoformazane dye formed is precipitated by addition of sodium chloride, filtered off and washed with sodium chloride solution. The filtered material is then dissolved in 500 ml. of water at 20–25°, and admixed with 16.9 g. of 2,4,6-trifluoro-5-chloro-pyrimidine. The reaction mixture is stirred over to 4 to 8 hours at 20–25°, whereby the pH value is always maintained at 6.5–7.0 by addition of a 20% sodium carbonate solution. The obtained reactive dye of the foregoing formula is then precipitated with sodium chloride, filtered off, thereafter washed with sodium chloride solution, and dried at 60° in the vacuum.

The product is a black powder which dissolves in water with dark-green colour. It dyes cotton or regenerated cellulose fibres from dilute dye liquor, in the presence of sodium carbonate as acid-binding agent, in dark-green tones. After hot treatment with a soap solution for 10 minutes, the green dyeings exhibit high fastness to light and wetting.

If the diazonium salt solution is dropped alone, i.e. without simultaneous addition of the aqueous copper sulphate solution, into the coupling solution at a pH value of ca. 11–13, there is formed the metal-free formazane dye which, as described in this example, may be salted out, isolated, then coppered in aqueous solution, saponified and reacted with 2,4,6-trifluoro-5-chloro-pyrimidine to form the dye of the above formula.

The same dye is likewise obtained if the hydrazone, obtained by coupling diazotized 1-amino-2-carboxybenzene - 4 - sulphonic acid with 3-(4'-aminophenylazo) phenylformylacetic acid ethylester, and saponifying the ester group after completed coupling, is thereafter coupled with diazotized 1 - amino - 2 - hydroxybenzene - 3,5-disulphonic acid in the presence of 1 equivalent of copper sulphate, and the aminoazoformazane dye obtained is reacted with 2,4,6-trifluoro-5-chloro-pyrimidine as described in Example 144.

Dyes exhibiting similar properties are obtained if, in the place of the diazo component used in this example, equivalent amounts of one of the diazo components listed up in the following Table 9, column II, are employed and, in the place of the arylhydrazone used in the example, equivalent amounts of one of the hydrazones quoted in column III are employed and, in the place of the metal complex-forming agent or the pyrimidine compound used in the example, equivalent amounts of respectively the complex-forming metals or pyrimidine compounds quoted in columns IV and V, respectively, are employed, and otherwise the process is carried out in a manner analogous to that described in Example 144. Column VI indicates the colour tone of dyeings obtained with the respective formazan dyes on cellulose fibres.

TABLE 9
| I | II | III | | IV | V | VI |
|---|---|---|---|---|---|---|
| | | Hydrazone from— | | | | |
| | Diazo component | Hydrazine component | Aldehyde component | Complex forming metal | Pyrimidine compound | Color tone on cellulose |
| Number: 145 | 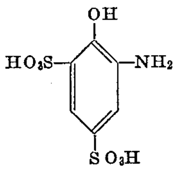 | 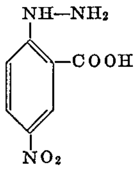 | 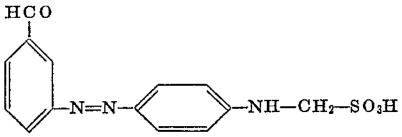 | Cu | 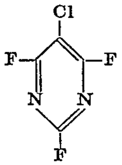 | Green. |
| 146 | 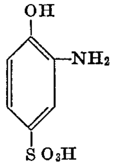 | 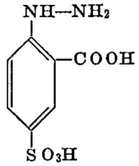 | 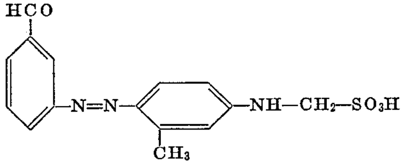 | Cu | 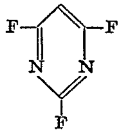 | Do. |
| 147 | 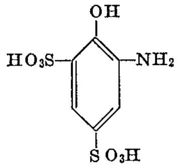 | Same as above | Same as above | Cu | 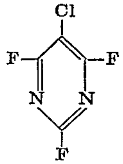 | Do. |
| 148 | 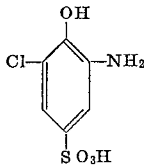 | do | 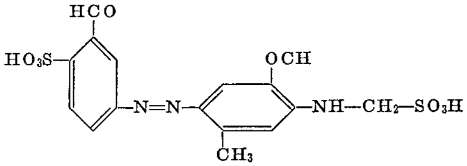 | Cu | Same as above | Do. |
| 149 | 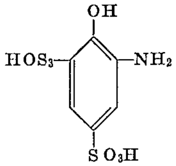 | 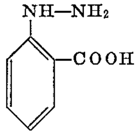 | 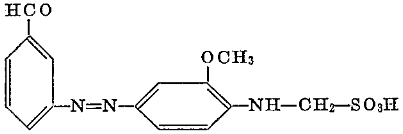 | Cu | do | Do. |
| 150 | Same as above | 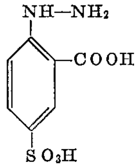 | 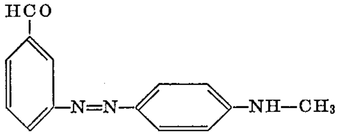 | Cu | do | Do. |

TABLE 9—Continued
| I | II | III | | IV | V | VI |
|---|---|---|---|---|---|---|
| | | Hydrazone from— | | | | |
| Number: | Diazo component | Hydrazine component | Aldehyde component | Complex forming metal | Pyrimidine compound | Color tone on cellulose |
| 151 | 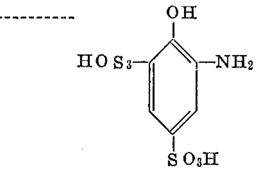 | 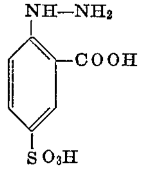 | 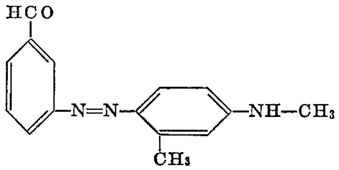 | Cu | 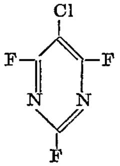 | Green. |
| 152 | do | Same as above | 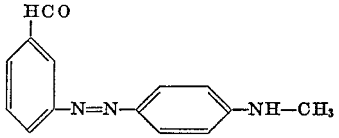 | Cu | 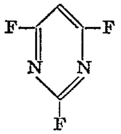 | Do. |
| 153 | do | do | 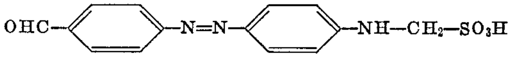 | Ni | 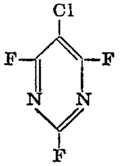 | Brown. |
| 154 | do | 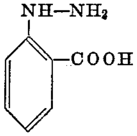 | 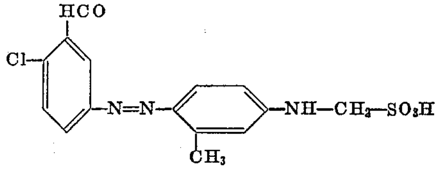 | Co | Same as above | Green. |
| 155 | 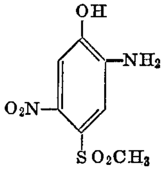 | 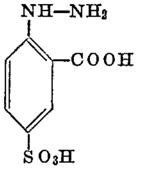 | 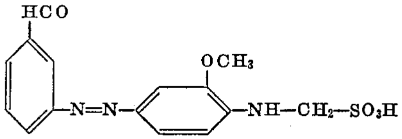 | Cu | do | Do. |
| 156 | 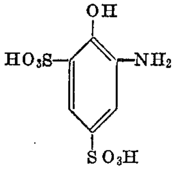 | 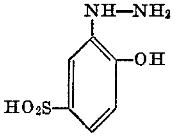 | 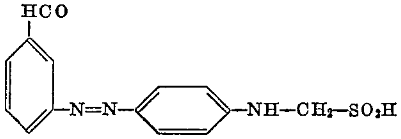 | Cu | do | Do. |

TABLE 9—Continued
| I | II | III | | IV | V | VI |
|---|---|---|---|---|---|---|
| | | Hydrazone from— | | | | |
| | Diazo component | Hydrazine component | Aldehyde component | Complex forming metal | Pyrimidine compound | Color tone on cellulose |
| Number: 157 | 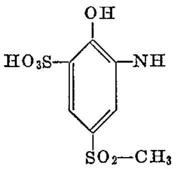 | 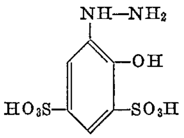 | 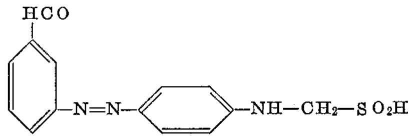 | Cu | 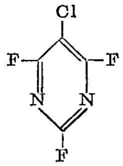 | Green. |
| 158 | 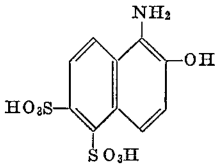 | 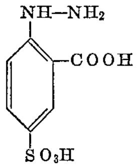 | Same as above | Cu | Same as above | Do. |
| 159 | 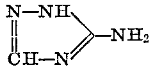 | 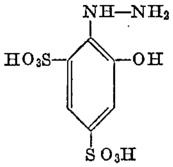 | do | Cu | do | Do. |
| 160 | 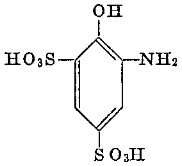 | 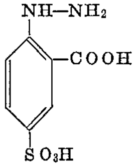 | 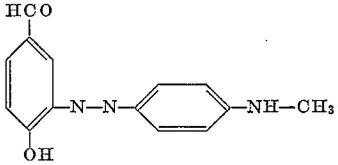 | Cu | do | Do. |
| 161 | 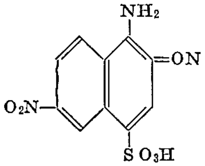 | Same as above | 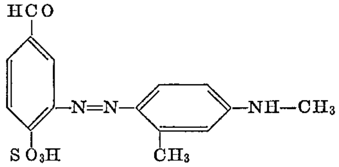 | Cu | do | Olive green. |

TABLE 9—Continued
| Number | II Diazo component | III Hydrazone from— Hydrazine component | III Hydrazone from— Aldehyde component | IV Complex forming metal | V Pyrimidine compound | VI Color tone on cellulose |
|---|---|---|---|---|---|---|
| 162 | 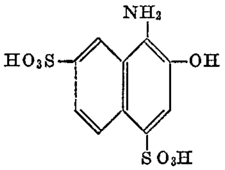 | 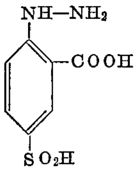 | 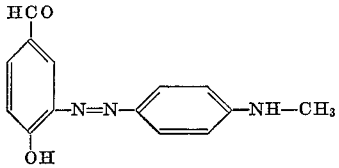 | Cu | Same as above | Olive green. |
| 163 | 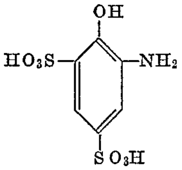 | Same as above | 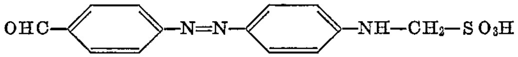 | Ni | Same as above | Brown. |
| 164 | Same as above | 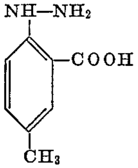 | 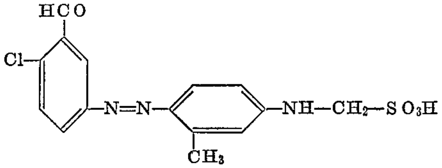 | Co | do | Green. |
| 165 | 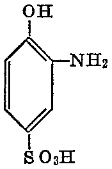 | 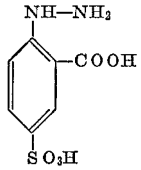 | 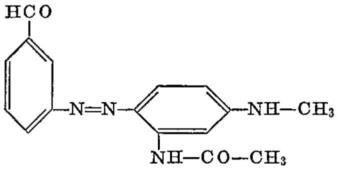 | Cu | do | Do. |
| 166 | 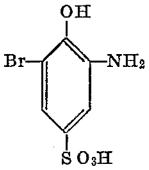 | Same as above | 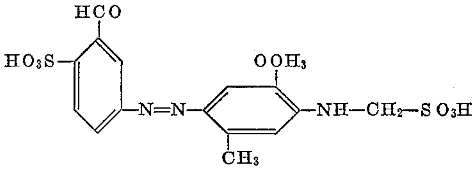 | Cu | do | Do. |
| 167 | 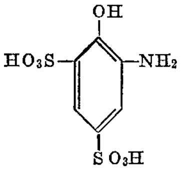 | 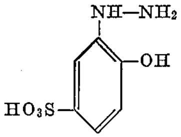 | 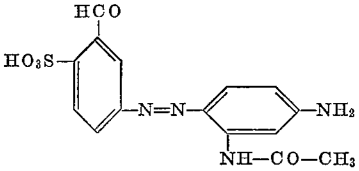 | Cu | do | Do. |

TABLE 9—Continued

| I | II | III | | IV | V | VI |
|---|---|---|---|---|---|---|
| | | Hydrazone from— | | | | |
| Number: | Diazo component | Hydrazine component | Aldehyde component | Complex forming metal | Pyrimidine compound | Color tone on cellulose |
| 168 | 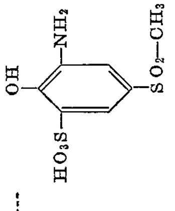 | 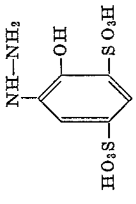 | 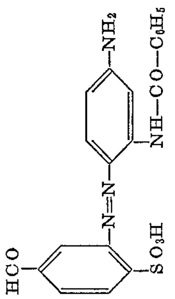 | Cu | Same as above | Green. |
| 169 | 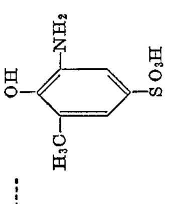 | 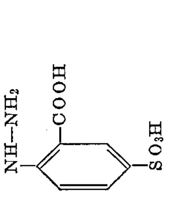 | 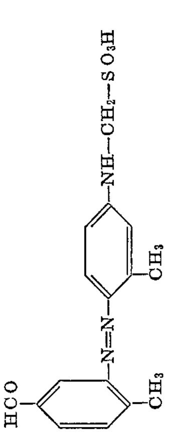 | Cu | 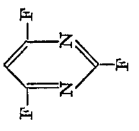 | Do. |

EXAMPLE 170

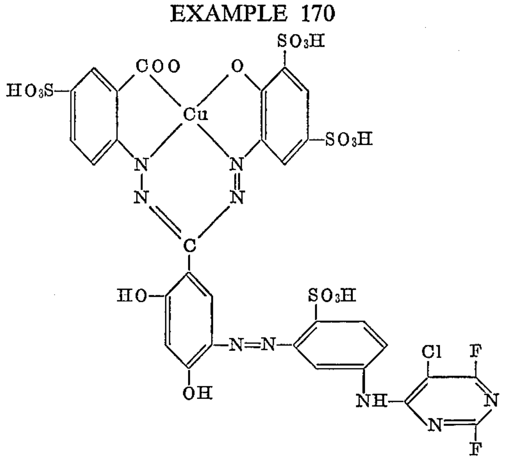

35.2 g. of the arylhydrazone, obtained by condensation of 2-carboxyphenylhydrazine-4-sulphonic acid with 2,4-dihydroxybenzaldehyde, are dissolved in 650 ml. of water. To this solution, the diazonium salt solution, obtained by diazotation of 23.0 g. of 1-amino-3-acetylamino-benzene-6-sulphonic acid, is allowed to flow in within one hour at 0–5°, whereby the pH value is maintained at 6–7 by addition of aqueous sodium carbonate solution. After stirring for one hour at 0–5°, the coupling is completed. To the solution of the azo dye obtained, the diazonium salt solution, obtained by diazotizing 26.9 g. of 1-amino-2-hydroxy-benzene-3,5-disulphonic acid, together with 100 ml. of a one-molar aqueous copper sulphate solution, is allowed to flow in within one hour, whereby the pH value is maintained at 5.5–6.5 by addition of an aqeuous sodium carbonate solution. As soon as the coupling is completed, the copper-complex dye is precipitated with sodium chloride, filtered off and washed with sodium chloride solution. The filtered material is introduced into 500 ml. of a 10% aqueous sodium hydroxide solution, and the mixture is stirred for 5 hours at 90–100° to saponify the acetylamino group. Following to this, the pH value of the solution is adjusted to 6 with hydrochloric acid, 16.9 g. of 2,4,6-trifluoro-5-chloro-pyrimidine are added to this solution at 30–35°, and the temperature is maintained at 30–35° and the pH is maintained at 6.0–6.5 by addition by 20% sodium carbonate solution until free amino groups are not any more detectable. The obtained reactive dye of the foregoing formula is precipitated with potassium chloride, filtered off, washed with potassium chloride solution, and dried at 60° in the vacuum. It is in the form of a black powder which dissolves in water with dark-blue colour. It dyes cellulose fibres, in the presence of sodium carbonate as acid-binding agent, in blue-gray tones which after soaping for 10 minutes exhibit high fastness to light and wetting.

The same dye is likewise obtained if 37.9 g. of the monoazo dye, prepared by coupling diazotized 1-amino-3-acetylaminobenzene-6-sulphonic acid with 2,4-dihydroxybenzaldehyde, are suspended in 800 ml. of water, admixed with 34.4 g. of 2-hydrazino-5-sulphobenzoic acid, and the reaction mixture is stirred out over a period of 12 hours at a pH of 4.5–5.5 and at a temperature of 40–45°. The hydrazone formed is thereupon reacted with diazotized 1-amino-2-hydroxybenzene-3,5-disulphonic acid and aqueous copper sulphate solution to form the copper-complex dye as described in the example, the formazan dye obtained is saponified and reacted with 2,4,6-trifluoro-5-chloro-pyrimidine as described in the example.

Dyes exhibiting similar properties are obtained by employing, in the place of the components used in Example 170, equivalent amounts of the components listed up in the following Table 10, and otherwise conducting the process as described in the example. In column VII of Table II, the colour tones of the dyeing obtained with the respective formazan dyes on cellulose fibres are set forth.

TABLE 10
| I | II Hydrazone from— | | III | IV | V | VI | VII |
|---|---|---|---|---|---|---|---|
| | Hydrazine component | Aldehyde component | 1st diazo component | 2d diazo component | Complex forming metal | Pyrimidine compound | Color tone on cellulose |
| Number: | | | | | | | |
| 171 | 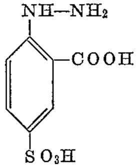 | 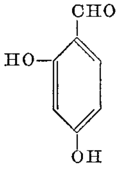 | 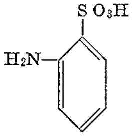 | 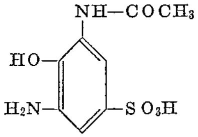 | Cu | 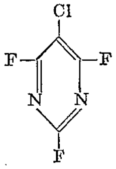 | Blue-green. |
| 172 | Same as above | 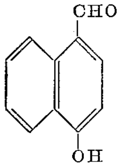 | 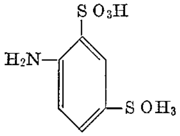 | Same as above | Cu | 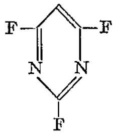 | Gray. |
| 173 | do | Same as above | 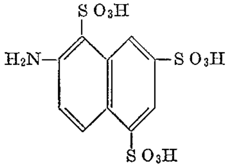 | do | Cu | Same as above | Do. |
| 174 | do | do | 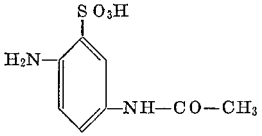 | 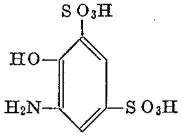 | Ni | 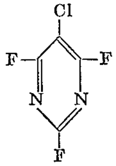 | Corinth. |
| 175 | do | 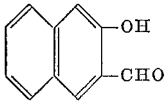 | 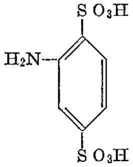 | 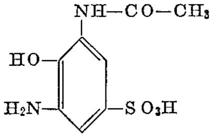 | Cu | Same as above | Gray. |
| 176 | 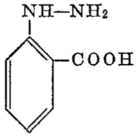 | 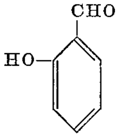 | 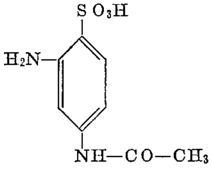 | 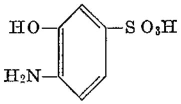 | Cu | do | Do. |

TABLE 10—Continued
| I | II Hydrazone from— | | III | IV | V | VI | VII |
|---|---|---|---|---|---|---|---|
| | Hydrazine component | Aldehyde component | 1st diazo component | 2d diazo component | Complex forming metal | Pyrimidine compound | Color tone on cellulose |
| Number | | | | | | | |
| 177 | 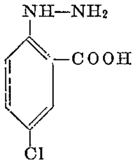 | Same as above | 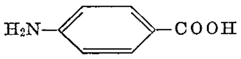 | 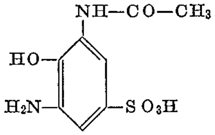 | Cu | Same as above | Gray. |
| 178 | 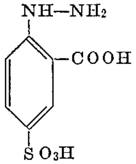 | 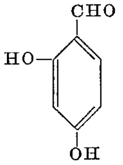 | 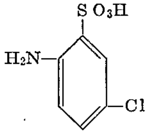 | Same as above | Cu | do | Do. |
| 179 | Same as above | Same as above | 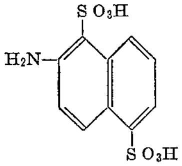 | do | Cu | do | Do. |
| 180 | do | do | 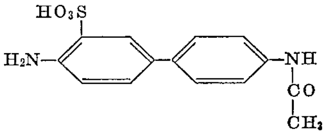 | 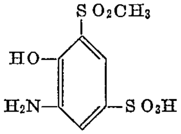 | Cu | 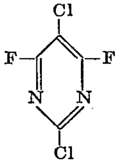 | Do. |
| 181 | do | do | Same as above | Same as above | Cu | 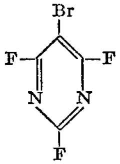 | Do. |

EXAMPLE 182

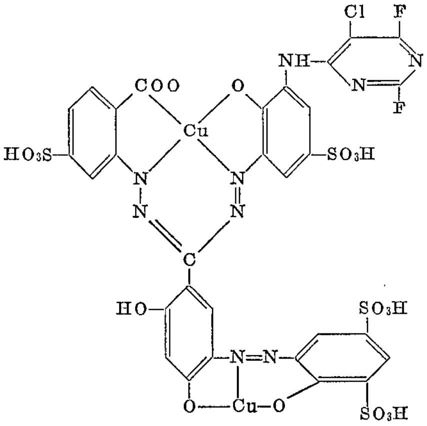

35.2 g. of the arylhydrazone, obtained by condensation of 2-carboxyphenylhydrazine-5-sulphonic acid with 2,4-dihydroxybenzaldehyde, are dissolved neutral in 650 ml. of water. To this solution, the diazonium salt solution, obtained by diazotizing 26.9 g. of 1-amino-2-hydroxybenzene-3,5-disulphonic acid, is allowed to flow in within half an hour at 0–5°. The pH of the solution is maintained at 7.5–8.5 by addition of 20% sodium carbonate solution. As soon as the coupling is completed, the azo dye formed is precipitated by addition of sodium chloride, filtered off and washed with sodium chloride solution. The filtered material thereafter is introduced into 600 ml. of water. To this, 200 ml. of a one-molar aqueous copper sulphate solution are allowed to flow in, whereby the pH is maintained at 4.0–4.5 by addition of sodium carbonate solution. After 30 minutes, the diazonium salt solution, obtained by diazotizing 24.6 g. of 1 - amino - 2 - hydroxy-3-acetylaminobenzene-5-sulphonic acid, is allowed to flow into this mixture within half an hour at pH 5.5–6.5. After completed coupling, the azoformazan dye formed is precipitated by addition of sodium chloride, filtered off, and washed with sodium chloride solution. The filtered material is introduced into 300 ml. of a 7.5% aqueous sodium hydroxide solution, and the solution so obtained is stirred at 95–100° for 5 hours. After cooling to 60°, the pH of the solution is adjusted to 6.0 by adding dropwise 20% hydrochloric acid, is admixed with 16.9 g. of 2,4,6-trifluoro-5-chloropyrimidine, and the mixture is stirred at 30–35°, with maintaining the pH at 6.0–6.5 by adding dropwise 20% sodium carbonate solution. As soon as no free amino groups are any more detectable, the obtained reactive dye of the foregoing formula is precipitated by addition of sodium chloride, and dried at 70° in the vacuum. The product is in the form of a black brown powder which dissolves in water with dark-brown colour. It dyes cellulose fibres, in the presence of acid-binding agents, in brown tones which after soaping for 10 minutes exhibit high fastness to light and wetting.

The same dye also is obtained by adding 30 g. of sodium acetate and 50 g. of copper sulphate to a solution of 63.2 g. of the arylhydrazone, obtained by condensation of 2 - carboxyphenylhydrazine-5-sulphonic acid with 2,4-dihydroxy - 5 - (2′ - hydroxy - 3′,5′ - disulphophenylazo) benzaldehyde in 600 ml. of water. As soon as a clear solution is present, a diazonium salt solution, obtained by diazotation of 24.6 g. of 1-amino - 2 - hydroxy-3-acetylaminobenzene-5-sulphonic acid and adjusted to pH 4.5 with aqueous sodium hydroxide, is allowed to flow into this solution within 15 minutes at 15–20°. The reaction mixture is stirred for 2 hours at 15–20° and pH 7.0. Then the dye is precipitated by addition of potassium- and sodium chloride, and filtered off. Saponification of the acetyl group as well as the condensation with 2,4,6-trifluoro - 5 - chloropyrimidine and the isolation of the dye of the foregoing formula are carried out as described in this example.

Dyes exhibiting similar properties are obtained by employing, in the place of the components used in Example 182, equivalent amounts of the components listed up in the following Table II, and otherwise conducting the process as described in this example. In column VII of Table III, the colour tones of the dyeings obtained with the respective formazan dyes on cellulose fibres are set forth.

TABLE 11

| | II | | III | IV | V | VI | VII |
|---|---|---|---|---|---|---|---|
| | Hydrazone from— | | | | | | |
| | Hydrazine component | Aldehyde component | 1st diazo component | 2d diazo component | Complex forming metal | Pryimidine compound | Color tone on cellulose |
| Number: | | | | | | | |
| 183 | 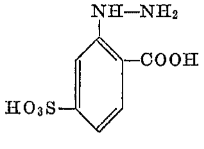 | 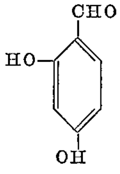 | 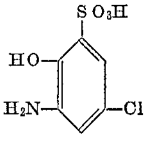 | 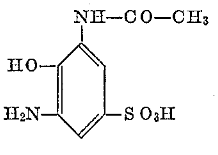 | Cu | 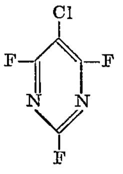 | Brown. |
| 184 | 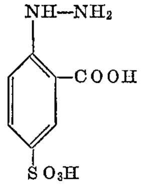 | 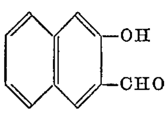 | 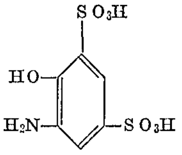 | Same as above | Cu | Same as above | Corinth. |
| 185 | 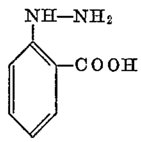 | 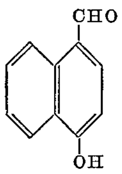 | Same as above | do | Cu | do | Do. |

TABLE 11—Continued

| Number | II Hydrazone from— Hydrazine component | II Hydrazone from— Aldehyde component | III 1st diazo component | IV 2d diazo component | V Complex forming metal | VI Pyrimidine compound | VII Color tone on cellulose |
|---|---|---|---|---|---|---|---|
| 186 | 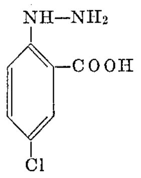 | 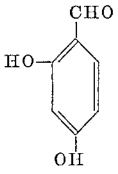 | 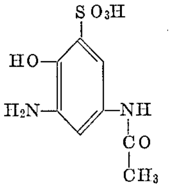 | 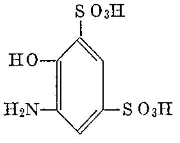 | Cu | Same as above | Brown. |
| 187 | 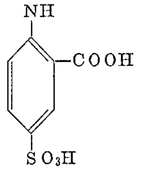 | Same as above | 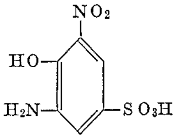 | 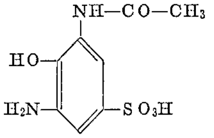 | Cu | Same as above | Do. |
| 188 | Same as above | do | 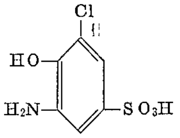 | Same as above | Cu | 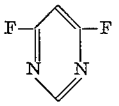 | Do. |
| 189 | do | do | 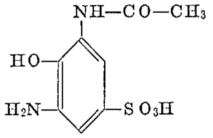 | 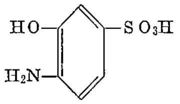 | Cu | Same as above | Do. |
| 190 | do | do | Same as above | 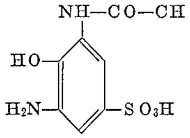 | Cu | do | Do. |

EXAMPLE 191

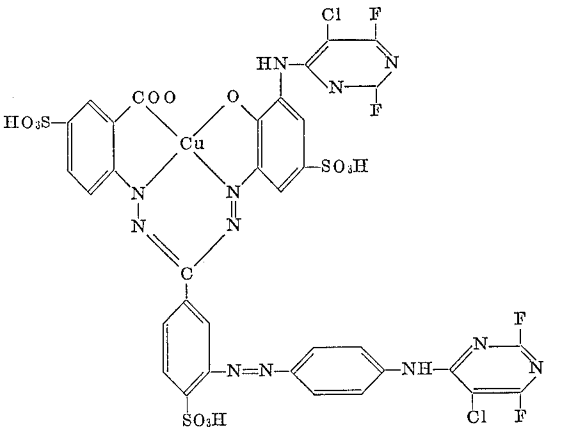

61.3 g. of the arylhydrazone, obtained by condensation of 2-carboxy-phenylhydrazine-4-sulphonic acid with 3'-formyl-6'-sulphoazobenzene - 4 - amino-methanesulphonic acid, are dissolved neutral in 500 ml. of water and admixed with 30 g. of sodium bicarbonate. To this solution, the diazonium salt solution, obtained by diazotizing 26.9 g. of 1-amino - 2 - hydroxybenzene-3-acetylamino-5-sulphonic acid, together with 100 ml. of an one-molar aqueous copper sulphate solution, is allowed to flow in within one hour at 20–25°. As soon as the coupling is completed, the temperature is increased to 90–95°, and the solution of the copper-complex dye formed is admixed with a sufficient quantity of a concentrated aqueous sodium hydroxide solution to furnish an alkaline-liquor concentration of 5%. Thereupon the mixture is stirred at 90–95° for 3 hours to saponify the acetylamino and the amino-methanesulphonic acid group. Thereafter the diamino-formazan dye formed is precipitated by addition of sodium chloride, filtered off and washed with sodium chloride solution. The filtered material is then dissolved in 500 ml. of water at 60–65°, and admixed with 34.0 g. of 2,4,6-trifluoro - 5 - chloro-pyrimidine. The reaction mixture is stirred at 30–35° for 4 to 8 hours, whereby the pH value is maintained at 6.0–6.5 by addition of a 20% sodium carbonate solution. The obtained reactive dye of the foregoing formula is precipitated with sodium chloride, filtered off, washed with sodium chloride solution and dried at 60° in the vacuum.

The product is a black powder which dissolves in water with dark-green colour. It dyes cotton and regenerated cellulose fibres from dilute dye liquor, in the presence of sodium carbonate as acid-binding agent, in dark-green tones. The green dyeings, after hot treatment with a soap solution for 10 minutes, exhibit high fastness to light and wetting.

Dyes exhibiting similar properties are obtained if equivalent amounts of one of the diazo components set forth in the following Table 12, column II, are employed in the place of the diazo component used in this example, and equivalent amounts of one of the hydrazones set forth in column III are employed in the place of the arylhydrazone used, and equivalent amounts of respectively the complex-forming metals and pyrimidine compounds set forth in columns IV and V, respectively, are employed in the place of respectively the complex-forming metal and the pyrimidine compound used, and otherwise the process is conducted in the manner described in this example. Column VI indicates the colour tone of dyeings obtained with the respective formazane dyes on cellulose fibres.

TABLE 12
| I | II | III | | IV | V | VI |
|---|---|---|---|---|---|---|
| | | Hydrazone from— | | | | |
| Number: | Diazo component | Hydrazine component | Aldehyde component | Complex forming metal | Pyrimidine compound | Color tone on cellulose |
| 192 | 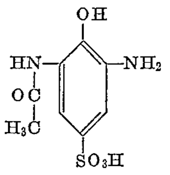 | 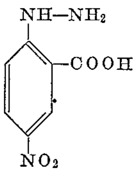 | 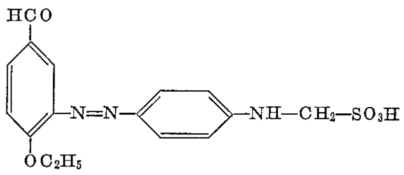 | Cu | 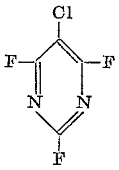 | Green. |
| 193 | 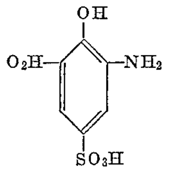 | 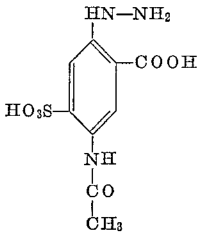 | 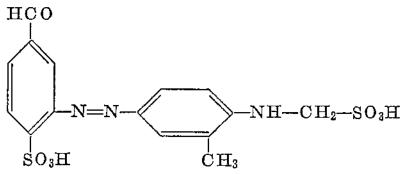 | Cu | Same as above | Do. |
| 194 | 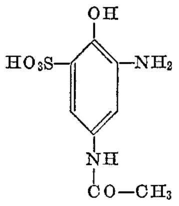 | 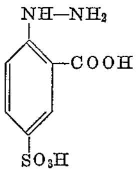 | 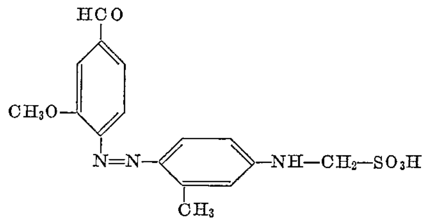 | Cu | do | Do. |
| 195 | 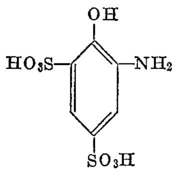 | 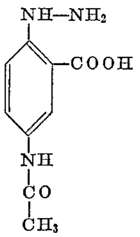 | 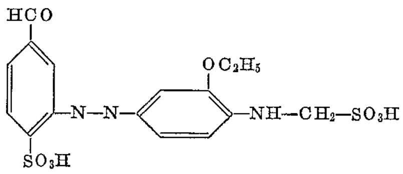 | Cu | do | Do. |

TABLE 12—Continued

| I | II | III | | IV | V | VI |
|---|---|---|---|---|---|---|
| | | Hydrazone from— | | | | |
| Number: | Diazo component | Hydrazine component | Aldehyde component | Complex forming metal | Pyrimidine compound | Color tone on cellulose |
| 196 | 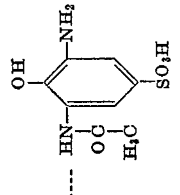 | 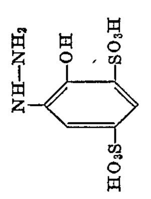 | 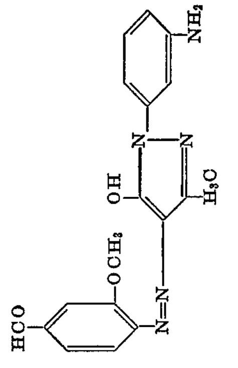 | Cu | Same as above | Olive-green. |

EXAMPLE 197

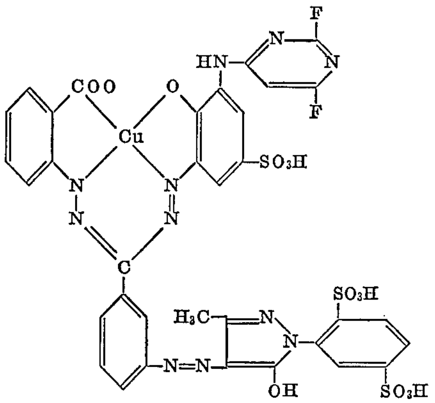

25.5 g. of the hydrazone, obtained by condensation of 2-carboxy-phenylhydrazine and 3-aminobenzaldehyde, are dissolved neutral in 400 ml. of water and diazotized with 50 ml. of 10 N hydrochloric acid and 50 ml. of 2 N sodium nitrite solution at 0–5°. The diazo suspension is stirred at 0–5° for one hour, whereupon the pH is adjusted to 5.0–6.0 by addition of sodium carbonate. Into this suspension, 33.4 g. of 1-phenyl-3-methylpyrazole-5-one-2',5'-disulphonic acid are interspersed within one hour. As soon as no diazonium compound is any more detectable, the coupling product obtained is precipitated by sodium chloride, filtered off, the residue is redissolved in 600 ml. of water at 20–25°, and admixed with 30 g. of sodium bicarbonate. To this there is added within one hour the diazo suspension which was obtained by diazotizing 38.6 g. of 1-amino-2-hydroxy-3-(2',6'-difluoro-pyrimidyl-4'-amino)benzene-5-sulphonic acid, as well as 100 ml. of an one-molar aqueous copper sulphate solution. After stirring for 2 hours the coupling is completed, whereafter the obtained reactive dye of the above formula is precipitated with sodium chloride, filtered off and washed with common salt solution. After drying at 80° in a vacuum, the product is a black powder which dissolves in water with dark-green colour.

EXAMPLE 198

25.5 g. of the arylhydrazone, obtained by condensation of 2 - carboxy - phenylhydrazine with 3 - aminobenzaldehyde, are suspended in 400 ml. of water and admixed with 30 g. of sodium bicarbonate. Into this mixture, the diazonium salt solution, obtained by diazotizing 24.6 g. of 1 - amino - 2 - hydroxy - 3 - acetylaminobenzene-5 - sulphonic acid, together with 100 ml. of an one-molar aqueous copper sulphate solution, is allowed to flow in within one hour. As soon as the coupling is completed, the copper-complex dye obtained is precipitated with sodium chloride, filtered off and washed with sodium chloride solution. The filtered material thereafter is dissolved in 500 ml. of water at 60–65°, admixed with 6.9 g. of sodium nitrite and dropped at 0–5° onto a solution comprising 25 ml. of 30% hydrochloric acid and 250 ml. of ice. After stirring of the mixture for one hour at 0–5°, the diazotation is completed. The pH of the reaction mixture is then set to 4.5 by adding dropwise 20% sodium carbonate solution, and the diazo suspension is added drop by drop, at 20–25° with stirring, to a solution comprising 33.4 g. of 1 - phenyl - 3 - methylpyrazole - (5)-one - 2',5' - disulphonic acid, 200 ml. of water and 20 g. of sodium carbonate. As soon as the coupling is completed, the temperature of the reaction mixture is increased to 95–98°, and the solution is admixed with 5% of the volume of sodium hydroxide. One stirs for a period of 5 hours at 95–98° and thereafter precipitates the dye by adding sodium chloride. After cooling to 20–25° with stirring, the dye is filtered off, washed with sodium chloride solution, and the residue is dissolved in 500 ml. of water at 20–25°. After addition of 13.5 g. of 2,4,6 - trifluoro - pyrimidine, stirring is performed for 2 hours at 60–65°, with maintaining the pH value of the reaction mixture at 6.0–6.5 by adding dropwise 20% sodium carbonate solution. As soon as no free amino groups are any more detectable, the reactive dye obtained is precipitated with sodium chloride, filtered off, washed with sodium chloride solution, and dried at 60° in a vacuum. The product is a black powder which dissolves in water with dark-green colour, and is identical with the dye obtained according to Example 197. It dyes cellulose fibres, in the presence of sodium chloride as acid-binding agent, in dark olive-green tones which after soaping for 10 minutes exhibit high fastness to light and wetting.

The same dye is obtained by condensing the formylazo dye—obtained by coupling diazotized 3 - aminobenzaldehyde with 1 - phenyl - 3 - methyl - pyrazole - (5) - one-2',5' - disulphonic acid—with 2 - carboxyphenylhydrazine, coupling the obtained hydrazone with the diazo compound of the 1 - amino - 2 - hydroxy - 3 - acetylaminobenzene - 5 - sulphonic acid in the presence of copper sulphate in accordance with Example 144, then saponifying the actylamino group and reacting the amino-formazan dye with 2,4,6 - trifluoro - pyrimidine.

The same dye likewise is obtained by using in the above example, in the place of the 100 ml. of one-molar aqueous copper sulphate solution, the same quantity of an one-molar aqueous magnesium sulphate solution, and thereafter heating the obtained magnesium complex of the amino-formazan dye with 100 ml. of an one-molar aqueous copper sulphate solution to 78-80° for 2 hours.

Dyes exhibiting similar properties are obtained if, in the place of the comopnents used in the example, equivalent amounts of the components set forth in the following Table 13 are employed, and otherwise the process is carried out as described in Example 198. Column VII of the same table indicates the colour tone of dyeings obtained with the respective formazan dyes on cellulose fibres.

TABLE 13

| I | II | III | | IV | V | VI | VII |
|---|---|---|---|---|---|---|---|
| | | Hydrazone from— | | | | | |
| | Diazo component | Hydrazine component | Aldehyde component | Coupling component | Complex-forming metal | Pyrimidine compound | Color tone on cellulose |
| Number: | | | | | | | |
| 199 | 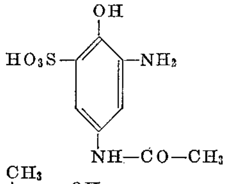 | 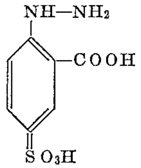 | 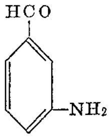 | 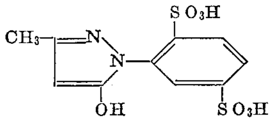 | Cu | 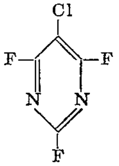 | Olive green. |
| 200 | 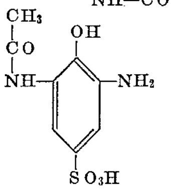 | Same as above | Same as above | Same as above | Cu | Same as above | Do. |
| 201 | Same as above | do | do | 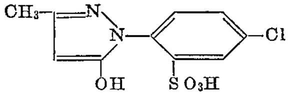 | Cu | do | Do. |
| 202 | do | 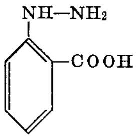 | do | 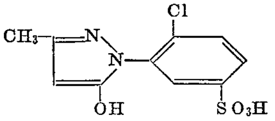 | Cu | do | Do. |
| 203 | do | 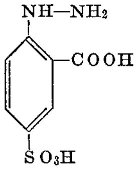 | do | 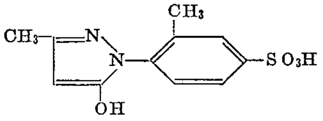 | Cu | do | Do. |

TABLE 13—Continued
| I | II | III | | IV | V | VI | VII |
|---|---|---|---|---|---|---|---|
| | | Hydrazone from— | | | | | |
| Number: | Diazo component | Hydrazine component | Aldehyde component | Coupling component | Complex-forming metal | Pyrimidine compound | Color tone on cellulose |
| 204 | Same as above | 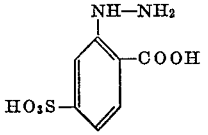 | Same as above | 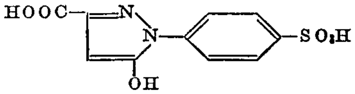 | Cu | Same as above | Olive green. |
| 205 | 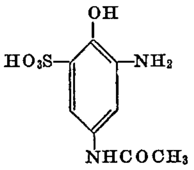 | 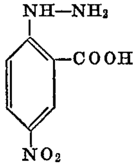 | do | 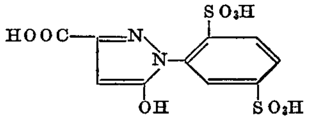 | Cu | do | Do. |
| 206 | Same as above | 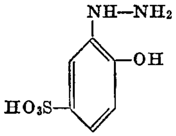 | do | Same as above | Cu | do | Do. |
| 207 | 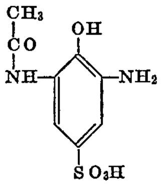 | 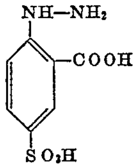 | 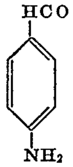 | 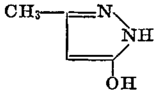 | Cu | do | Do. |
| 208 | 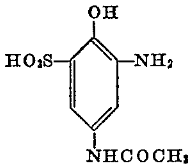 | Same as above | 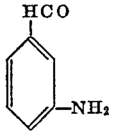 | 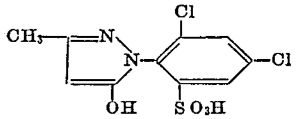 | Co | do | Do. |
| 209 | Same as above | 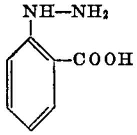 | 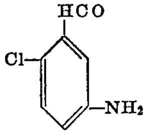 | 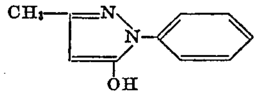 | Cu | do | Do. |

TABLE 13—Continued
| I | II | III | | IV | V | VI | VII |
|---|---|---|---|---|---|---|---|
| | | Hydrazone from— | | | | | |
| | Diazo component | Hydrazine component | Aldehyde component | Coupling component | Complex-forming metal | Pyrimidine compound | Color tone on cellulose |
| Number: | | | | | | | |
| 210 | 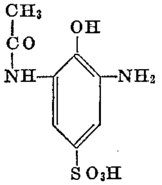 | 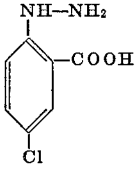 | Same as above | 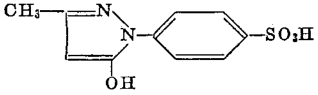 | Cr | Same as above | Olive green. |
| 211 | Same as above | 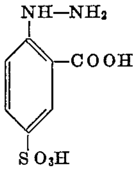 | 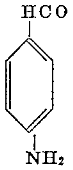 | 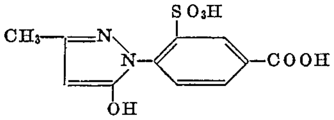 | Cu | do | Do. |
| 212 | do | Same as above | 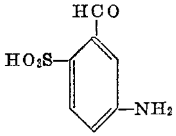 | 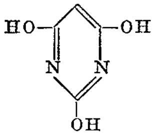 | Cu | do | Do. |
| 213 | do | do | 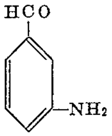 | 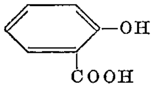 | Cu | do | Do. |
| 214 | do | 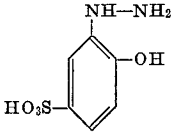 | Same as above | 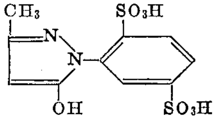 | Cu | do | Do. |
| 215 | 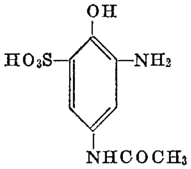 | 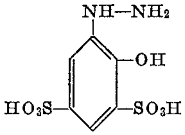 | do | Same as above | Cu | do | Do. |

TABLE 13—Continued

| I | II | III | | IV | V | VI | VII |
|---|---|---|---|---|---|---|---|
| | | Hydrazone from— | | | Complex-forming metal | Pyrimidine compound | Color tone on cellulose |
| Number: | Diazo component | Hydrazine component | Aldehyde component | Coupling component | | | |
| 216 | Same as above | 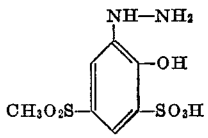 | Same as above | 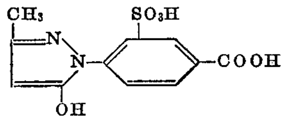 | Cu | Same as above | Olive green. |
| 217 | 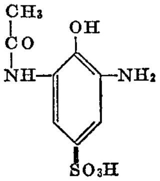 | 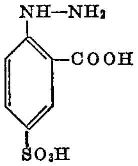 | do | 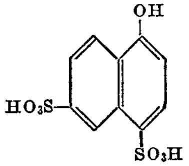 | Cu | do | Bordeaux |
| 218 | Same as above | Same as above | do | 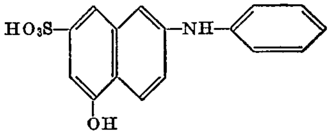 | Cu | do | Brown-violet. |
| 219 | 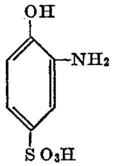 | do | do | 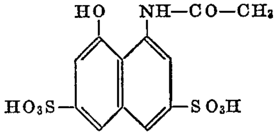 | Cu | do | Corinth. |
| 220 | 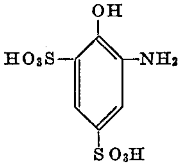 | do | do | 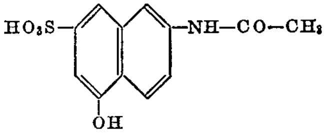 | Cu | do | Violet. |
| 221 | 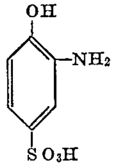 | 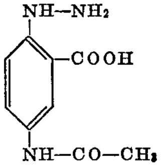 | do | 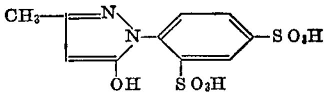 | Cu | do | Green. |

TABLE 13—Continued

| I | II | III | | IV | V | VI | VII |
|---|---|---|---|---|---|---|---|
| | | Hydrazone from— | | | | | |
| | Diazo component | Hydrazine component | Aldehyde component | Coupling component | Complex-forming metal | Pyrimidine compound | Color tone on cellulose |
| Number: | | | | | | | |
| 222 | 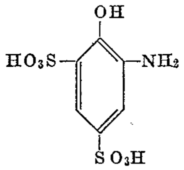 | Same as above | Same as above | 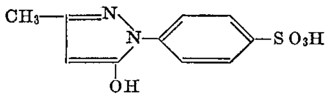 | Cu | Same as above | Green. |
| 223 | Same as above | do | do | 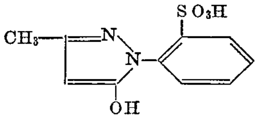 | Cu | do | Do. |
| 224 | 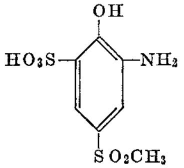 | do | do | 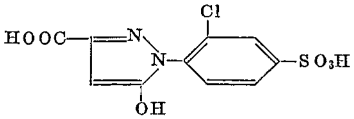 | Cu | do | Do. |
| 225 | 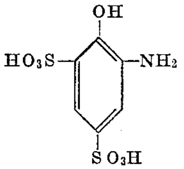 | do | do | 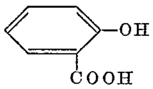 | Cu | do | Do. |
| 226 | Same as above | do | do | 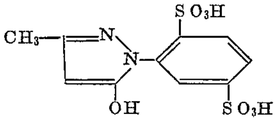 | Cu | do | Do. |
| 227 | do | do | 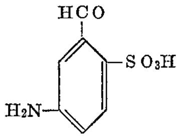 | Same as above | Cu | do | Olive-green. |

TABLE 13—Continued
| I | II | III | | IV | V | VI | VII |
|---|---|---|---|---|---|---|---|
| | | Hydrazone from— | | | | | |
| | Diazo component | Hydrazine component | Aldehyde component | Coupling component | Complex-forming metal | Pyrimidine compound | Color tone on cellulose |
| Number: 228 | 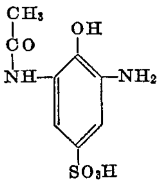 | 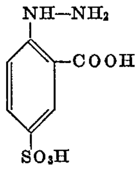 | 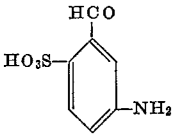 | 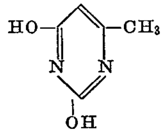 | Cu | Same as above | Do. |
| 229 | Same as above | Same as above | 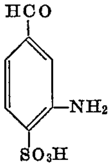 | 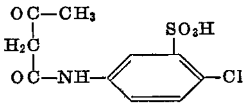 | Cu | do | Do |
| 230 | do | 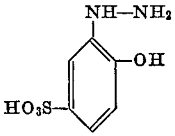 | 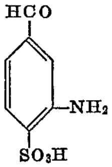 | 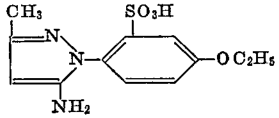 | Cu | do | Green. |
| 231 | do | 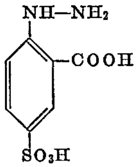 | 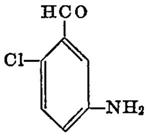 | 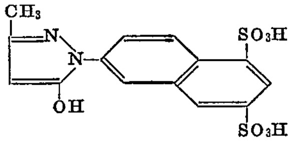 | Cu | do | Do. |
| 232 | do | 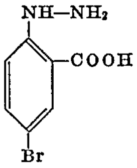 | Same as above | 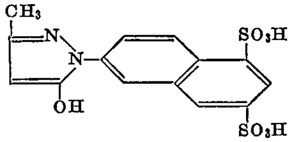 | Cu | do | Do. |
| 233 | 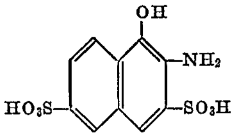 | 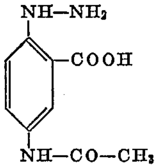 | do | 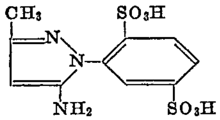 | Cu | do | Do. |

TABLE 13—Continued

| I | II | III | | IV | V | VI | VI |
|---|---|---|---|---|---|---|---|
| | | Hydrazone from— | | | | | |
| | Diazo component | Hydrazine component | Aldehyde component | Coupling component | Complex-forming metal | Pyrimidine compound | Color tone on cellulose |
| Number: 234 | 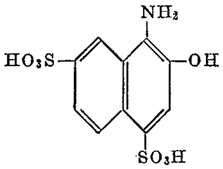 | Same as above | 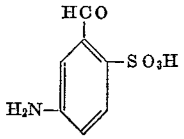 | Same as above | Cu | Same as above | Olive-green. |

EXAMPLE 235

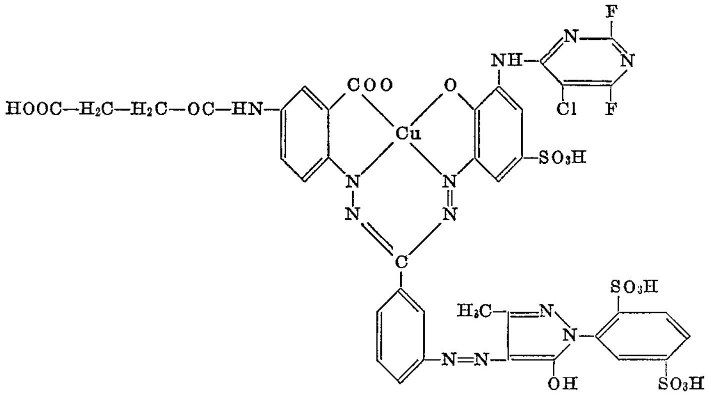

71.6 g. of the arylhydrazone, obtained by condensation of 2 - carboxy - 4 - succinoylamino-phenylhydrazine with 4-(3''-formyl - phenylazo) - 3 - methyl-pyrazole-5-one-1-phenyl-2',5'-disulphonic acid, are suspended in 400 ml. of water and admixed with 30 g. of sodium bicarbonate. Into this mixture, the diazonium salt solution, obtained by diazotizing 24.6 g. of 1-amino-2-hydroxy-3-acetylaminobenzene-5-sulphonic acid and saponifying the acetylamino group analogously to the method described in "Friedlander," vol. 8, page 599, together with 100 ml. of an one-molar aqueous copper sulphate solution, is allowed to flow in within one hour. As soon as the coupling is completed, the copper-complex dye obtained is precipitated with sodium chloride, filtered off and washed with sodium chloride solution. The filtered material thereafter is dissolved in 500 ml. of water. After addition of 16.9 g. of 2,4,6-trifluoro-5-chloro-pyrimidine, stirring is performed for 2 hours at 20 to 25°, with maintaining the pH value of the reaction mixture at 6.0–6.5 by adding dropwise 20% sodium carbonate solution. As soon as no free amino groups are any more detectable, the obtained reactive dye of the foregoing formula is precipitated with sodium chloride, filtered off, washed with sodium chloride solution, and dried at 80° in a vacuum. The product is a black powder which dissolves in water with dark-green colour. It dyes cellulose fibres, in the presence of an acid-binding agent, in dark olive-green tones which after soaping for 10 minutes exhibit high fastness to light and wetting.

Dyes exhibiting similar properties are obtained if, in the place of the components used in the example, equivalent amounts of the components set forth in columns II to VI of the following Table 14 are employed, and otherwise the process is carried out in a manner analogous to that described in Example 235. Column VII of the table indicates the colour tone of dyeings obtained with the respective formazan dyes on cellulose fibres.

TABLE 14
| I | II | III | | IV | V | VI | VII |
|---|---|---|---|---|---|---|---|
| | | Hydrazone from— | | | | | |
| | Diazo component | Hydrazine component | Aldehyde component | Coupling component | Complex forming metal | Pyrimidine compound | Color tone on cellulose |
| Number: | | | | | | | |
| 236 | 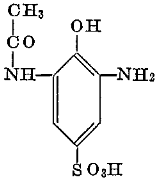 | 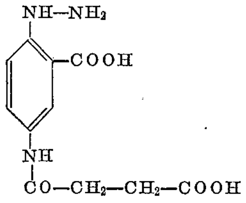 | 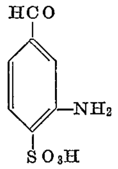 | 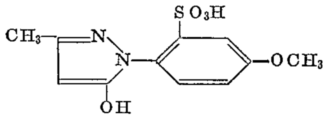 | Cu | 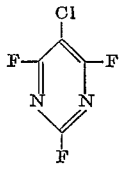 | Olive green. |
| 237 | Same as above | Same as above | Same as above | 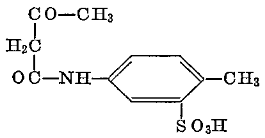 | Cu | Same as above | Do. |
| 238 | do | do | 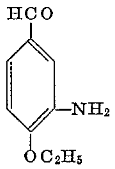 | 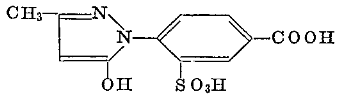 | Cu | do | Do. |
| 239 | do | 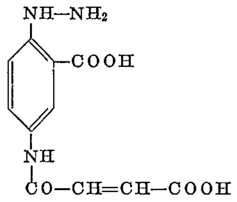 | 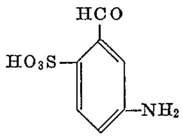 | 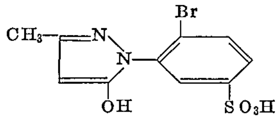 | Cu | do | Do. |
| 240 | do | Same as above | Same as above | 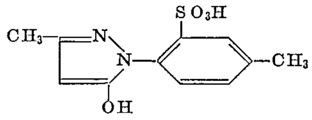 | Cu | do | Do. |

TABLE 14—Continued
| I | II | III | | IV | V | VI | VII |
|---|---|---|---|---|---|---|---|
| | | Hydrazone from— | | | | | |
| Number: | Diazo component | Hydrazine component | Aldehyde component | Coupling component | Complex forming metal | Pyrimidine compound | Color tone on cellulose |
| 241 | Same as above | 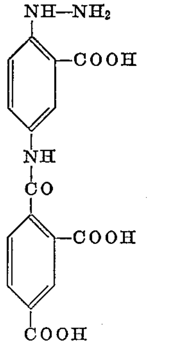 | 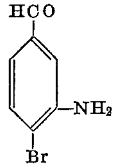 | 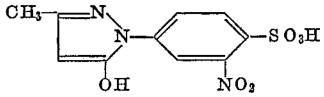 | Cu | Same as above | Olive green. |
| 242 | do | 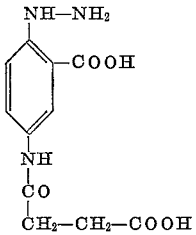 | 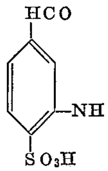 | 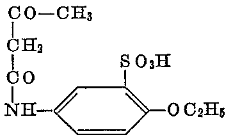 | Cu | do | Green. |
| 243 | do | Same as above | Same as above | 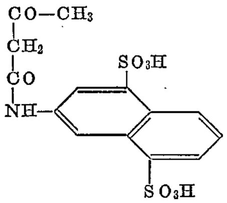 | Cu | do | Do. |
| 244 | do | 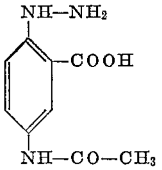 | do | 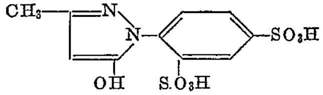 | Cu | do | Do. |

TABLE 14—Continued

| I | II | III | | IV | V | VI | VII |
|---|---|---|---|---|---|---|---|
| | | Hydrazone from— | | | | | |
| | Diazo component | Hydrazine component | Aldehyde component | Coupling component | Complex-forming metal | Pyrimidine compound | Color tone on cellulose |
| Number: | | | | | | | |
| 245 | Same as above | 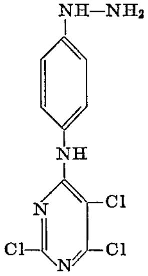 | Same as above | 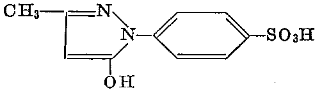 | Cu | Same as above | Green. |
| 246 | do | Same as above | 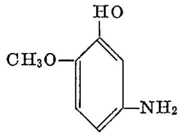 | 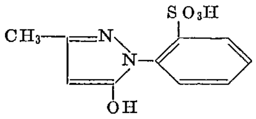 | Cu | do | Do. |

EXAMPLE 247

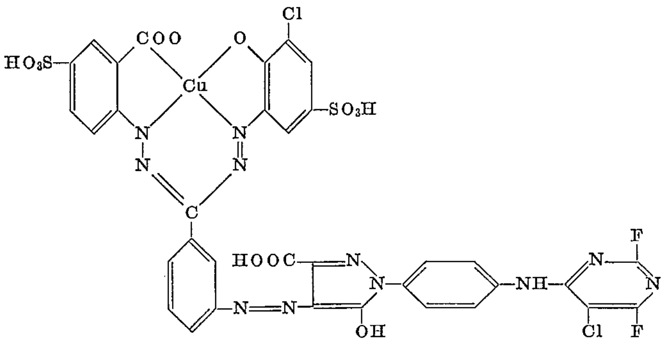

33.5 g. of the hydrazone obtained by condensation of 2-carboxy-4-sulphophenylhydrazine and 3-aminobenzaldehyde are dissolved neutral in 500 ml. of water, and the solution is admixed with 40 g. of sodium acetate. Into this solution, 100 ml. of an one-molar aqueous copper sulphate solution and the diazo solution, obtained by diazotizing 22.4 of 1-amino-2-hydroxy-3-chlorobenzene-5-sulphonic acid, are allowed simultaneously to flow in slowly. As soon as the coupling is completed, the reaction mixture is admixed with 6.9 g. of sodium nitrite and dropped, within one hour, onto a solution comprising 25 ml. of hydrochloric acid and 200 g. of ice. After stirring for one hour at 0–5°, the diazotation is completed; thereafter the pH value of the diazo suspension is set to 4.5 by adding dropwise 20% sodium carbonate solution, and the suspension is added drop by drops, at 20–25°, to a solution comprising 24.9 g. of 1-(4′-nitrophenyl)pyrazole-(5)-one-3-carboxylic acid and 20 g. of sodium carbonate in 200 ml. of water. After completed coupling, the temperature of the reaction mixture is adjusted to 40–45° and the pH value of the solution is set to 9.0 to 9.5 with concentrated aqueous sodium hydroxide solution, the solution is admixed with 19.5 g. of anhydrous sodium sulphide and stirred at 40–45° for 2 hours, i.e. until completion of the reduction. Then, in order to re-form the complex dye demetallized during the reduction, 100 ml. of one-molar copper sulphate solution are added drop by drop, and stirring of the mixture is continued for 18 hours at 40–45°. The aminoformazan dye formed is precipitated by adding sodium chloride, filtered off, washed with sodium chloride solution, and the suction-filtered material is dissolved neutral in 500 ml. of water at 20 to 25°, admixed with 16.9 g. of 3,4,6-trifluoro-5-chloro-pyrimidine and stirred for another 2 hours at 20–25°, with maintaining the pH value of the reaction mixture at 6.0–6.5 by adding aqueous sodium carbonate. The obtained reactive dye of the foregoing formula is precipitated with sodium chloride, filtered off and dried at 80° in a vacuum. The product is a dark powder which dissolves in water with dark-green colour. It dyes cellulose fibres, in the presence of an acid-binding agent, in dark, olive-coloured tones which after soaping exhibit high fastness to light and wetting.

The same dye is obtained if in the above example, in the place of the 1-(4′-nitrophenyl)pyrazole-(5)-one-3-carboxylic acid, the equivalent amount of 1-(4′-aminophenyl)pyrazole-(5)-one-3-carboxylic acid is employed, and the aminoformazan dye thus obtained is condensed directly with 2,4,6-trifluoro-5-chloropyrimidine.

Dyes exhibiting similar properties are obtained if, in the place of the components used in Example 247 equivalent amounts of the components set forth in columns II to VI of the following Table 15 are employed, and otherwise the process is carried out as described in this example. In column VII the colour tones of dyeings obtained with the respective formazan dyes on cellulose are indicated.

TABLE 15

| I | II | III | | IV | V | VI | VII |
|---|---|---|---|---|---|---|---|
| | | Hydrazone from— | | | | | |
| | Diazo component | Hydrazine component | Aldehyde component | Coupling component | Complex forming metal | Pyrimidine compound | Color tone on cellulose |
| Number: 248 | 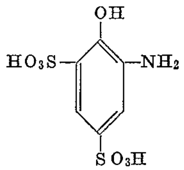 | 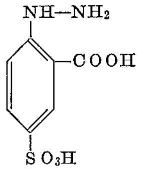 | 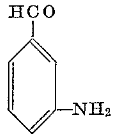 | 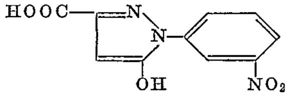 | Cu | 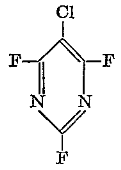 | Olive-green |
| 249 | Same as above | Same as above | 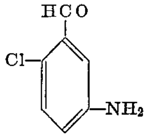 | Same as above | Cu | Same as above | Do. |
| 250 | 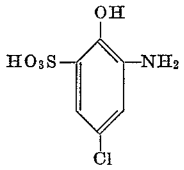 | 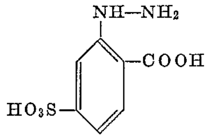 | 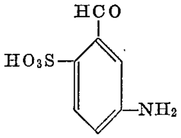 | 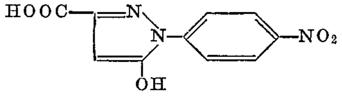 | Cu | do | Do. |
| 251 | 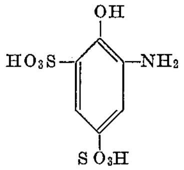 | 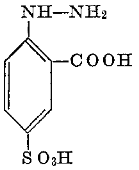 | 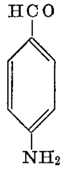 | 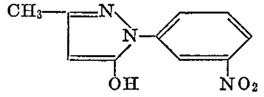 | Cu | do | Do. |
| 252 | Same as above | Same as above | 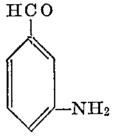 | 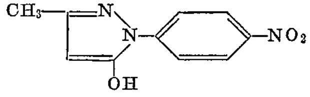 | Ni | do | Brown. |

TABLE 15—Continued
| I | II | III | | IV | V | VI | VII |
|---|---|---|---|---|---|---|---|
| | | Hydrazone from— | | | | | |
| | Diazo component | Hydrazine component | Aldehyde component | Coupling component | Complex forming metal | Pyrimidine compound | Color tone on cellulose |
| Number: 253 | Same as above | Same as above | Same as above | 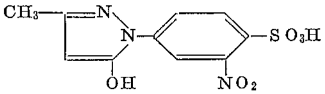 | Cu | Same as above | Olive-green. |
| 254 | do | 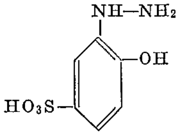 | do | 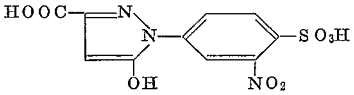 | Cu | do | Do. |
| 255 | 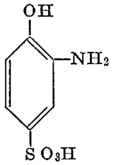 | 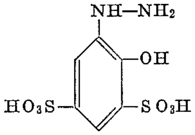 | do | 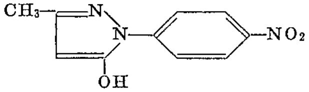 | Cu | do | Do. |
| 256 | 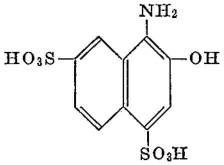 | 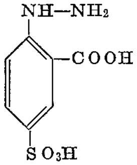 | 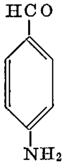 | 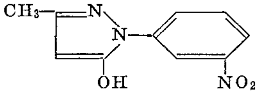 | Cu | do | Do. |
| 257 | 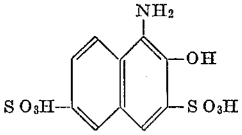 | Same as above | 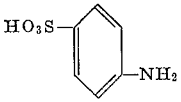 | 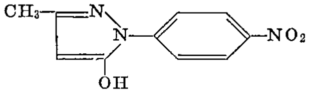 | Ni | do | Brown. |
| 258 | 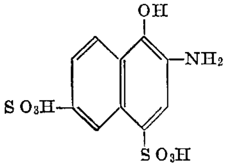 | do | 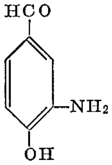 | Same as above | Cu | do | Olive-green. |

TABLE 15—Continued

| I | II | III | | IV | V | VI | VII |
|---|---|---|---|---|---|---|---|
| | | Hydrazone from— | | | | | |
| | Diazo component | Hydrazine component | Aldehyde component | Coupling component | Complex-forming metal | Pyrimidine compound | Color tone on cellulose |
| Number: | | | | | | | |
| 259 | 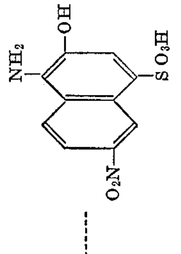 | Same as above | 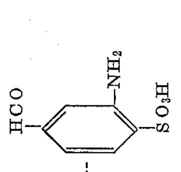 | 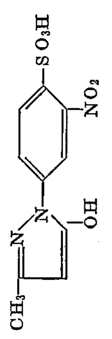 | Cu | Same as above | Olive green. |

EXAMPLE 260

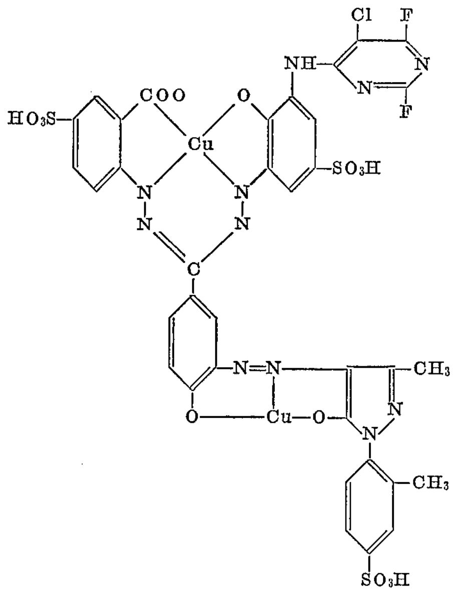

101.9 g. of the olive-green dye obtained in accordance with Example 203 of Table 13 are dissolved in 1500 ml. of water, and 100 ml. of a 25% copper sulphate solution and 80 ml. of a 30% hydrogen peroxide solution are added at 20–25°, with maintaining the pH value at 5–6 by addition of sodium carbonate solution. As soon as no starting dye is any more detectable, the obtained reactive dye of the foregoing formula is precipitated by addition of sodium chloride, filtered off, washed with a sodium chloride solution, and dried at 80° in a vacuum. The product is a black powder which dissolves in water with dark-brown colour and dyes cellulose fibres from aqueous solution, in the presence of sodium carbonate as acid-binding agent, in dark-brown tones.

The dye of the foregoing formula is also obtained by starting from a compound according to Example 203 of Table 13, which instead of the pyrimidyl radical carries an acetyl group, carrying out the oxidative coppering as described above, then saponifying the acetyl group with alkali, and condensing the free amino group with 2,4,6-trifluoro-5-chloro-pyrimidine.

Instead of hydrogen peroxide, also equivalent amounts of the salts of peroxy acids may be employed, such as e.g. $Na_2S_2O_8$, $NaBO_3$ or $Na_2O_2$.

Further dyes exhibiting similar properties are obtained by oxidatively coppering the dyes of Examples 197 and 247 as well as Examples 199 to 227 of Table 13 and 248 to 257 of Table 15 according to the above-described process.

EXAMPLE 261

When cotton is padded with a solution comprising 20 g. of the dye according to Example 197, 20 g. of sodium carbonate, 200 g. of urea and 1000 ml. of water, dried and thereafter subjected to dry heat of 140° for 5 minutes, one obtains a deep, dark-green dyeing which after soaping exhibits high fastness to light and wetting.

EXAMPLE 262

When cotton is padded with a solution containing 20 g. of the dye obtained according to Example 144, 20 g. of sodium carbonate and 50 g. of sodium chloride per 1000 ml. of water, rolling up the padded cotton, storing it for 4 hours, and thereafter soaping it with boiling for 10 minutes, one obtains a deep, pure, dark-green dyeing which after soaping exhibits very good fastness to light and wetting.

EXAMPLE 263

2 g. of the dye obtained in accordance with Example 247 are dissolved in 5000 ml. of water at 40°, and thereafter admixed with 0.5 g. of a condensation product from 25 mols of ethylene oxide and 1 mol of octadecyl alcohol or octadecylamine, 6 g. of acetic acid and finally with 0.5 g. of a polyquaternary ammonium compound, for example the condensation product from 11.5 g. of N,N',N''-pentamethyldiethylenetriamine and 14.3 g. of $\beta,\beta'$-dichlorodimethylether. 100 g. of wool are given into the dye bath so obtained, the bath is heated to boiling within 30 minutes, and dyeing is performed at this temperature for one hour. Thereafter rinsing is performed, with 60° warm water. One obtains without an alkaline aftertreatment a uniform dark-olive coloured dyeing which exhibits good fastenesses.

EXAMPLE 264

With a printing paste comprising: 30 g. of the dye according to Example 144, 200 g. of urea, 400 g. of water, 340 g. of a 5% aqueous solution of sodium alginate and 30 g. of sodium bicarbonate there is printed a cotton fabric, the printed fabric is steamed with saturated steam for 30 seconds at a temperature of ca. 105°, the fabric is first cold-washed and then hot-washed, rinsed for 15 minutes with a soap solution (5 g./l. of soap) at boiling temperature, hot- and cold-washed again, and dried.

One obtains a purely dark-green printed cotton fabric which exhibits a very good fastness to light and wetting.

If instead of the cotton fabric a staple rayon fabric is used, and the printed fabric is not steamed for 30 seconds, but fixing is performed during 1 minute at 110–150°, while otherwise the procedure is conducted in a manner analogous to that described in Example 264, one obtains a printed, dark-green staple rayon fabric which exhibits the same valuable properties.

We claim:

1. A formazane azo dye of the formula

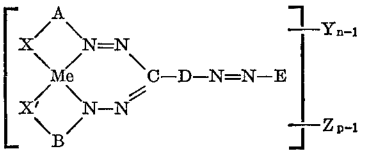

wherein:

A represents a benzene, naphthalene, benzothiazolyl-(5), benzopyrazolyl-(3), quinazolinyl-(6) or triazolyl-(5) radical, substituted in o-position to the azo bridge attached thereto by the radical X and otherwise unsubstituted or being further substituted by substituents selected from lower alkyl, lower alkylsulphonyl, phenylsulphonyl, chlorine, bromine, nitro, lower alkoxy, hydroxy and lower alkanoylamino, B represent a benzene or naphthalene radical substituted in o-position to the hydrazo bridge attached thereto, by the radical X' and otherwise unsubstituted or being further substituted by substituents selected from hydrogen, chlorine, bromine, lower alkyl, nitro, lower alkoxy, hydroxy, lower alkylsulphonyl or lower alkanoylamino, X represents —O— or —NH— or hydrogen, X' represents —O—, —COO—, —NH—, or

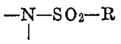

wherein R represents phenyl or lower alkyl,

D represents a radical of the benzene or naphthalene series, being either otherwise unsubstituted or being further substituted by substituents selected from hydrogen, chlorine, bromine, lower alkyl, lower alkoxy, nitro, hydroxy, lower alkylsulphonyl and lower alkanoylamino, E represents a benzene, naphthalene, pyrazolyl-(4), pyrimidinyl-(5), or an acetylacetamidophenyl radical, which radicals are either unsubstituted or substituted by substituents selected from lower alkyl, lower alkoxy, chlorine, bromine, lower alkylsulphonyloxy, hydroxyl, nitro, phenyl, acetylamido, benzoylamido, and lower alkylsulphonyl, Z represents $SO_3^{\ominus}M^{\oplus}$ or $COO^{\ominus}M^{\oplus}$ bound to A, B, D and/or E, wherein $M^{\oplus}$ represents a cation, Y represents a fiber reactive grouping bound to A, B or E by way of a bridging member selected from —NH— or

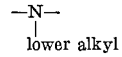

and selected from (a) a radical of the formula

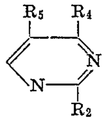

wherein each of $R_2$ and $R_4$ represents chlorine or bromine and $R_5$ represents hydrogen, chlorine, bromine, lower alkyl, cyano, lower alkanoyl, phenyl, nitro, phenylsulphonyl, acetyl or phenyl-iminocarbonyl, the phenyl moiety of which is either unsubstituted or substituted by sulphonic acid;

(b) a radical of one of the formulas

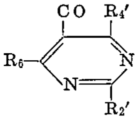 or 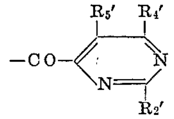

wherein each of $R_2'$ and $R_4'$ represents chlorine or bromine and $R_5'$ and $R_6$ represent hydrogen, lower alkyl or phenyl, or $R_4'$ represents lower alkoxy, phenoxy, amino, mono-lower-alkylamino, di-lower-alkylamino, phenylamino, sulphophenylamino or disulphophenylamino and $R_2'$ represents tri-lower alkylamino, or a group of the formula

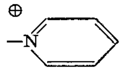

(c) a radical of the formula

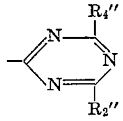

wherein $R_4''$ represents fluorine, chlorine or bromine, tri-lower alkyl-ammonio, or a group of the formula

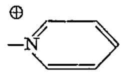

and $R_2''$ represents fluorine, chlorine, bromine, lower alkoxy, phenoxy, amino, mono-lower-alkylamino, di-lower-alkylamino or phenylamino, sulphophenylamino or di-sulphophenylamino;

(d) a radical of the formula

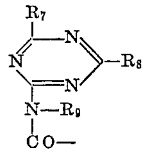

wherein:

$R_7$ is chlorine, $R_8$ is di-lower alkylamino and $R_9$ is lower alkyl;

(e) 2,3-dichloro-quinoxaline-6-carbonyl;
(f) 2,3-dichloro-quinoxaline-6-sulphonyl;
(g) 1,4-dichloro- or 1,4-dibromo-phthalazine-6-carbonyl;
(h) 2,4-dichloro-quinazoline-6- or -7-carbonyl;
(i) a heterocyclic radical of the formula

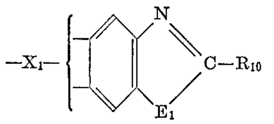

wherein:

$E_1$ represents sulphur or oxygen,
$X_1$ represents —CO— or —$SO_2$— and
$R_{10}$ represents chlorine, bromine or $SO_3H$;

(j) a radical of the formula

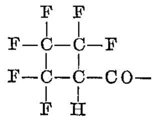

(k) a radical of the formula

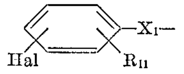

wherein:

$X_1$ represents —CO— or —$SO_2$—,
Hal represents fluorine or chlorine in o- or p-position to $X_1$, and
$R_{11}$ represents nitro, lower alkylsulphonyl or N,N-di-lower alkyl-sulphamoyl;

(l) lower alkanoyl;
(m) α-chloro- or -bromo-lower alkanoyl;
(n) β-chloro- or -bromo-lower alkanoyl;
(o) α,β-dichloro- or -bromo-lower alkanoyl;
(p) α,β-dichloro- or -bromo-lower alkenoyl;
(q) α- or β-chloro- or -bromo-lower alkenoyl or
(r) lower alkinoyl;

Me represents a heavy metal of an atomic number of from 24 to 30;
$n$ represents a positive whole number of at most 3, and
$p$ represents a positive whole number of at most 6.

2. A dye as defined in claim 1, wherein the moiety A is substituted, apart from any Y or Z, by substituents selected from hydrogen, bromine, chlorine, lower alkyl, lower alkoxy, nitro, and lower alkyl sulfonyl.

3. A dye as defined in claim 1, wherein the moiety D is a benzene or naphthalene radical substituted, apart from any Z, by substituents selected from hydrogen, chlorine, bromine, hydroxy, lower alkyl and lower alkoxy.

4. A dye as defined in claim 3, wherein the moiety E is a benzene, naphthalene, 5-amino-pyrazolyl-(4), 5-hydroxy-pyrazolyl-(4), acylacetamidophenyl or malonyl urea radical.

5. A dye as defined in claim 4, wherein the moiety E is a benzene radical which is substituted, apart from any Y and Z, by substituents selected from among hydrogen, hydroxyl, lower alkyl, lower alkoxy, chlorine, bromine, nitro, lower alkanoylamino, mesyl, lower alkylsulfonyl, and benzoylamino whose benzene nucleus is unsubstituted or substituted by substituents selected from chlorine, bromine, lower alkyl, lower alkoxy, nitro, hydroxy, lower alkyl sulphonyl, lower alkanoylamino, sulphonic acid, phenylsulphonyl, sulphamoyl, lower alkyl-substituted sulphamoyl,

6. A formazane dye of the formula

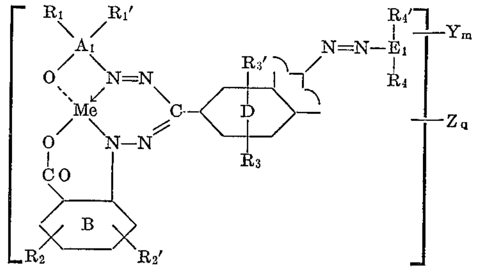

wherein:

$A_1$ represents phenylene or naphthylene, the adjacent azo bridge and the —O . . . bridge being linked to $A_1$ in o-position relative to each other,
$E_1$ represents phenyl, naphthyl, 1-phenyl- or 1-naphthyl-5-amino-pyrazolyl-(4), 1-phenyl- or 1-naphthyl-5-hydroxy-pyrazolyl-(4), acetoacetic phenylamide or acetoacetic naphthylamide, the 3-position of the pyrazolyl radicals being substituted by methyl or carboxy,
each of $R_1$ and $R_2$ represents hydrogen, chlorine, bromine, lower alkyl, nitro, lower alkanoylamino, benzoylamino, lower alkylsulphonyl, phenylsulphonyl, sulphamoy or N-lower alklsubstituted sulphamoyl,
each of $R_1'$ and $R_2'$ represents hydrogen, chlorine, bromine or lower alkyl;
and each of $R_2$ and $R_2'$ can also be lower alkoxy with the proviso that if ring B contains a substituent Y, $R_2$ and $R_2'$ are both hydrogen,
each of $R_3$ and $R_3'$ represents hydrogen, chlorine, bromine, lower alkoxy, lower alkyl or hydroxy,
each of $R_4$ and $R_4'$ represents hydrogen, chlorine, bromine, lower alkyl, lower alkoxy, nitro, lower alkanoylamino, benzoylamino, lower alkylsulphonyloxy, phenylsulphonyl, sulphamoyl or N-lower alkyl-substituted sulphamoyl, hydroxy, mesyloxy or tosyloxy,
each of $R_4$ and $R_4'$ being linked to a carbon atom which is a ring member of a benzene or naphthyl nucleus in $E_1$,
$m$ represents 1 or 2,
Y represents a fiber reactive grouping bound to $A_1$, B or $E_1$ by way of a bridging member selected from —NH— or

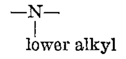

and selected from (a) a radical of the formula

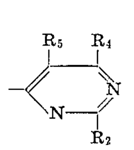

wherein each of $R_2$ and $R_4$ represents chlorine or bromine and $R_5$ represents hydrogen, chlorine, bromine, lower alkyl, cyano, lower alkanoyl, phenyl, nitro, phenylsulphonyl, acetyl or phenyl-imino-carbonyl, the phenyl moiety of which is either unsubstituted or substituted by sulphonic acid;

(b) a radical of one of the formulas

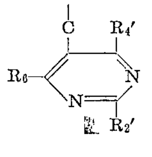

and

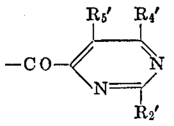

wherein each of $R_2'$ and $R_4'$ represents chlorine or bromine and $R_5'$ and $R_6$ represent hydrogen, lower alkyl or phenyl, or $R_4'$ represents lower alkoxy, phenoxy, amino, mono-lower-alklylamino, di-lower-alkylamino, phenylamino, sulphophenylamino or disulphophenylamino and $R_2'$ represents tri-lower alkylamino, or a group of the formula

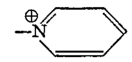

(c) a radical of the formula

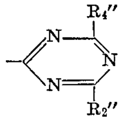

wherein $R_4''$ represents fluorine, chlorine or bromine, tri-lower alkyl-ammonio, or a group of the formula

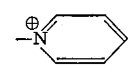

and $R_2''$ represents fluorine, chlorine, bromine, lower alkoxy, phenoxy, amino, mono-lower-alkyl-amino, di-lower-alkyl-amino or phenylamino, sulphophenylamino, or di-sulphophenylamino;

(d) a radical of the formula

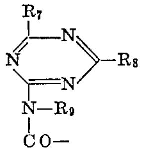

wherein:

$R_7$ is chlorine, $R_8$ is di-lower alkylamino and $R_9$ is lower alkyl;

(e) 2,3-dichloro-quinoxaline-6-carbonyl;

(f) 2,3-dichloro-quinoxaline-6-sulphonyl;

(g) 1,4-dichloro- or 1,4-dibromo-phthalazine-6-carbonyl;

(h) 2,4-dichloro-quinazoline-6- or -7-carbonyl;

(i) a heterocyclic radical of the formula

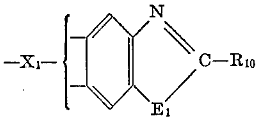

wherein:

$E_1$ represents sulphur or oxygen, $X_1$ represents —CO— or —$SO_2$— and $R_{10}$ represents chlorine, bromine or $SO_3H$;

(j) α-chloro- or -bromo-lower alkanoyl;

(k) β-chloro- or -bromo-lower alkanoyl;

(l) α-chloro or -bromo-lower alkenoyl;

(m) β-chloro- or -bromo-lower alkenoyl;

wherein the alkanoyl or alkenoyl groups contain up to 3 carbon atoms, $q$ represents a number ranging from 2 to 5, and Z represents —$SO_3^{\ominus}M^{\oplus}$ or —$COO^{\ominus}M^{\oplus}$, at least two Z's being $SO_3^{\ominus}M^{\oplus}$, and Me represents a metal atom of one of atomic numbers 24 to 30.

7. A formazane dye of the formula

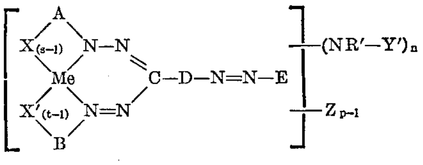

wherein:

A represents a benzene, naphthalene, benzothiazolyl-(5), benzopyrazolyl-(3), quinazolinyl-(6) or triazolyl-(5) radical, substituted in o-position to the hydrazo bridge attached thereto by the radical X and otherwise unsubstituted or being further substituted by substituents selected from lower alkyl, lower alkylsulphonyl, phenylsulphonyl, chlorine, bromine, nitro, lower alkoxy, hydroxy and lower alkanoylamino, B represents a benzene or naphthalene radical substituted in o-position to the azo bridge attached thereto, by the radical X' and otherwise unsubstituted or being further substituted by substituents selected from hydrogen, chlorine, bromine, lower alkyl, nitro, lower alkoxy, hydroxy, lower alkylsulphonyl or lower alkanoylamino, X represents —O— or —NH— or hydrogen, X' represents —O—, —COO—, —NH—, or

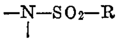

wherein R represents phenyl or lower alkyl,

D represents a radical of the benzene or naphthalene series, being either otherwise unsubstituted or being further substituted by substituents selected from hydrogen, chlorine, bromine, lower alkyl, lower alkoxy, nitro, hydroxy, lower alkylsulphonyl and lower alkanoylamino, E represents a benzene, naphthalene, pyrazolyl-(4), pyrimidinyl-(5), or an acetylacetamidophenyl radical, which radicals are either unsubstituted or substituted by substitutents selected from lower alkyl, lower alkoxy, chlorine, bromine, lower alkylsulphonyloxy, hydroxyl, nitro, phenyl, acetylamido, benzoylamido, and lower alkylsulphonyl, Z represents $SO_3^{\ominus}M^{\oplus}$ or $COO^{\ominus}M^{\oplus}$ bound to A, B, D and/or E, wherein $M^{\oplus}$ represents a cation, Y' represents a fiber-reactive grouping of the formula

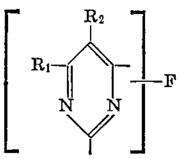

wherein:

$R_1$ is a substituent selected from hydrogen, fluorine, chlorine, bromine, lower alkyl, chloro-lower alkyl, bromo-lower-alkyl, phenyl, carbamoyl, lower carboxylic acid ester or cyano, and $R_2$ is a substituent selected from hydrogen, fluorine, chlorine, bromine, lower alkyl, chloro-lower alkyl, bromo-lower alkyl, phenyl, carbamoyl, lower carboxylic acid ester, cyano, sulphonic acid amide, lower alkylsulphonyl or nitro, and wherein:

$(NR'-Y')_n$ is bound to the aromatic structure of A, B or E wherein R' denotes hydrogen or lower alkyl, and $s$ and $t$ denote 1 or 2 with the proviso that the sum of $s+t$ is at least 3 and $n$ denotes the numbers 1 or 2, Me represents a heavy metal of an atomic number of from 24 to 30, and $p$ represents a positive whole number of at most 6.

8. A dyestuff as defined in claim 7, wherein $s$ and $t$ each denote the number 2, $n$ denotes the number 1 and the radicals A, B, D and E altogether contain 2 to 5 sulfonic acid groups as Z.

9. A dye as defined in claim 6, which is of the formula

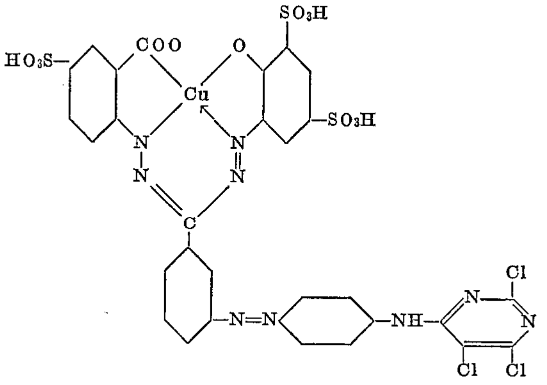

10. A dye as defined in claim 6, which is of the formula

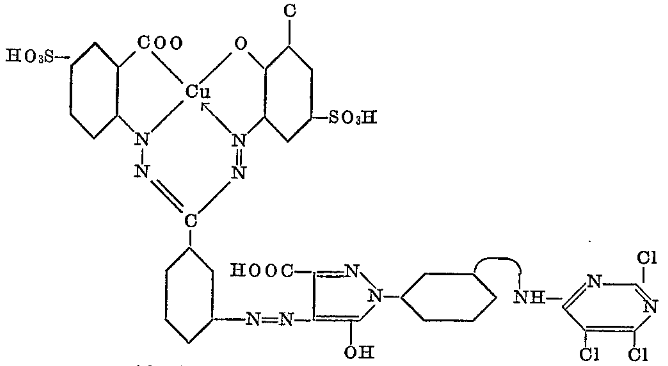

11. A dye as defined in claim 6, which is of the formula

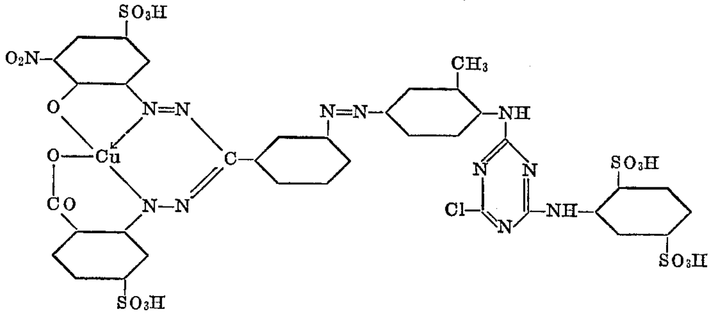

12. A dye as defined in claim 6, which is of the formula

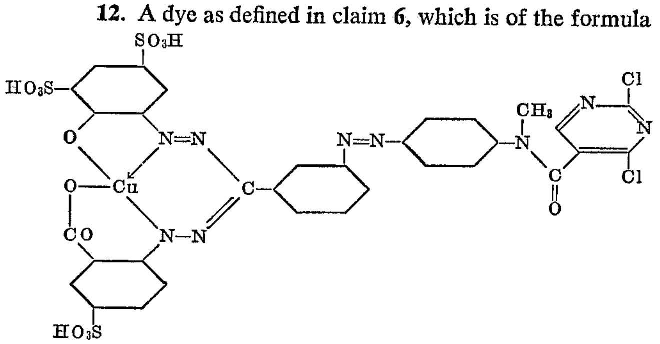

13. A dye as defined in claim 6, which is of the formula

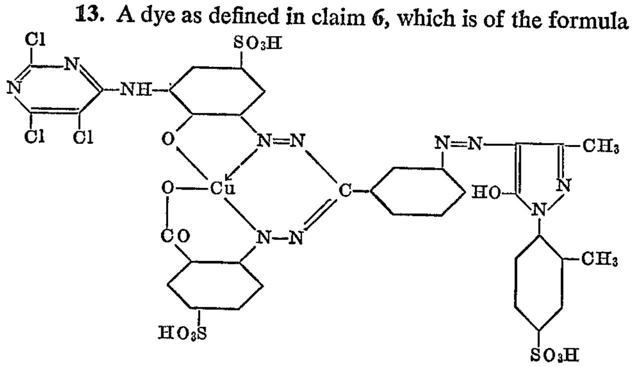

14. A dye as defined in claim 1, which is of the formula

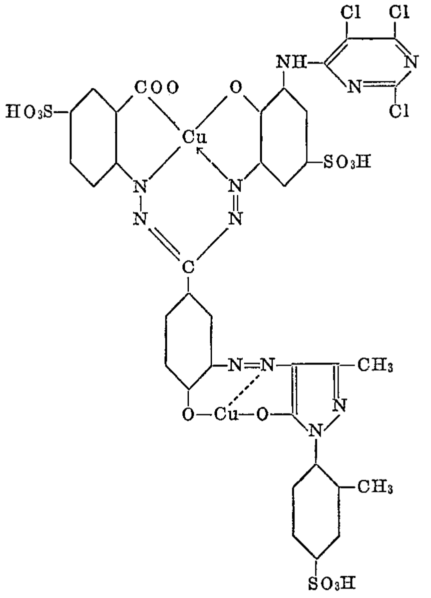

15. A dye as defined in claim 1, which is of the formula

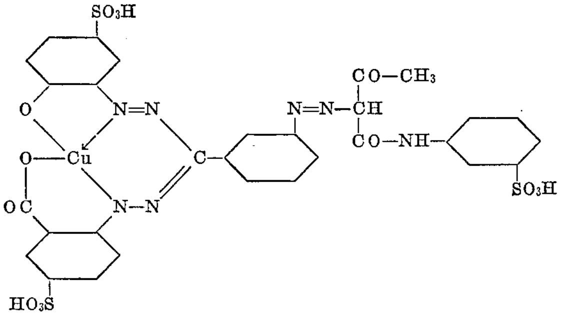

16. A dyestuff as defined in claim 7, wherein Y' represents the grouping

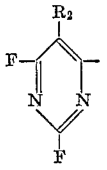

wherein:

$R_2$ is selected from hydrogen, chlorine or bromine.

17. A dyestuff as defined in claim 7 which is of the formula

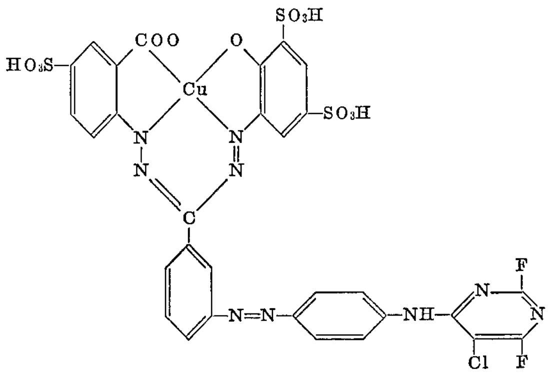

18. A dyestuff as defined in claim 7 which is of the formula

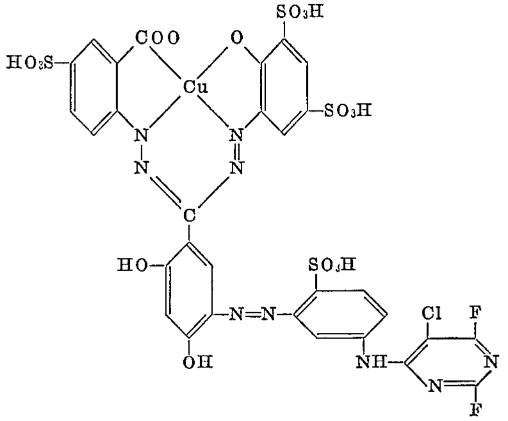

19. A dyestuff as defined in claim 7 which is of the formula

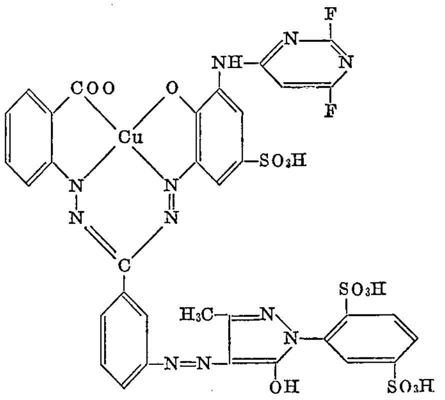

References Cited

UNITED STATES PATENTS

| | | | |
|---|---|---|---|
| 3,202,649 | 8/1965 | Steinemann | 260—146 |
| 3,202,650 | 8/1965 | Steinemann | 260—146 |
| 3,244,690 | 4/1966 | Steinemann | 260—146 |
| 3,375,240 | 3/1968 | Beffa | 260—145 |

FOREIGN PATENTS

| | | | |
|---|---|---|---|
| 950,861 | 2/1964 | Great Britain | 260—148 |

FLOYD DALE HIGEL, Primary Examiner

U.S. Cl. X.R.

8—4, 7, 13, 42, 43; 106—288; 117—138.8, 142, 143, 154; 260—37, 146, 148, 149, 150, 151, 153, 154, 156, 157, 158, 160, 176